(12) United States Patent
Evans et al.

(10) Patent No.: US 8,865,029 B2
(45) Date of Patent: Oct. 21, 2014

(54) PHOTOCHROMIC POLYMER AND COMPOSITION COMPRISING PHOTOCHROMIC POLYMER

(75) Inventors: Richard Alexander Evans, Glen Waverley (AU); Nino Malic, Ferntree Gully (AU); Mark Robert York, Frankston South (AU); Abdelselam Saeed Ali, Endeavour Hills (AU); Jonathan Andrew Campbell, Magill (AU)

(73) Assignee: Vivimed Labs Europe Ltd., Huddersfield (GB)

( * ) Notice: Subject to any disclaimer, the term of this patent is extended or adjusted under 35 U.S.C. 154(b) by 451 days.

(21) Appl. No.: 12/996,054

(22) PCT Filed: Jun. 5, 2009

(86) PCT No.: PCT/AU2009/000717
§ 371 (c)(1),
(2), (4) Date: Feb. 28, 2011

(87) PCT Pub. No.: WO2009/146509
PCT Pub. Date: Dec. 10, 2009

(65) Prior Publication Data
US 2011/0147681 A1 Jun. 23, 2011

Related U.S. Application Data

(60) Provisional application No. 61/129,128, filed on Jun. 5, 2008.

(51) Int. Cl.
| | | |
|---|---|---|
| *F21V 9/00* | (2006.01) |
| *G02B 5/23* | (2006.01) |
| *C08L 69/00* | (2006.01) |
| *C08G 77/26* | (2006.01) |
| *C08L 31/04* | (2006.01) |
| *C08G 77/388* | (2006.01) |
| *C08G 77/46* | (2006.01) |
| *C08L 75/04* | (2006.01) |
| *C08G 77/38* | (2006.01) |
| *C08L 29/04* | (2006.01) |
| *C08L 33/08* | (2006.01) |
| *C08L 67/02* | (2006.01) |
| *C08L 25/12* | (2006.01) |
| *C08G 77/14* | (2006.01) |
| *C08L 25/06* | (2006.01) |
| *C08L 27/08* | (2006.01) |
| *C08L 29/14* | (2006.01) |
| *C08L 27/06* | (2006.01) |
| *C08L 83/06* | (2006.01) |
| *C08L 83/08* | (2006.01) |
| *C08L 83/04* | (2006.01) |

(52) U.S. Cl.
CPC ............. *C08G 77/38* (2013.01); *C08L 69/00* (2013.01); *C08G 77/26* (2013.01); *C08L 31/04* (2013.01); *C08L 83/06* (2013.01); *C08G 77/388* (2013.01); *C08G 77/46* (2013.01); *C08L 75/04* (2013.01); *C08L 29/04* (2013.01); *C08L 33/08* (2013.01); *C08L 67/02* (2013.01); *C08L 25/12* (2013.01); *C08G 77/14* (2013.01); *C08L 25/06* (2013.01); *C08L 27/08* (2013.01); *C08L 29/14* (2013.01); *C08L 83/08* (2013.01); *C08L 27/06* (2013.01); *C08L 83/04* (2013.01)
USPC .......................................... 252/582; 252/586

(58) Field of Classification Search
USPC .................................. 252/582, 586; 526/260
See application file for complete search history.

(56) References Cited

U.S. PATENT DOCUMENTS

| | | |
|---|---|---|
| 5,322,945 A | 6/1994 | Krongauz |
| 5,905,148 A | 5/1999 | Krongauz |
| 2005/0254003 A1 | 11/2005 | Jani |
| 2007/0187656 A1* | 8/2007 | Evans et al. .................. 252/582 |

FOREIGN PATENT DOCUMENTS

| | | |
|---|---|---|
| WO | 2004041961 | 5/2004 |
| WO | 2005105874 | 11/2005 |
| WO | 2005105875 | 11/2005 |
| WO | 2006024099 | 3/2006 |

OTHER PUBLICATIONS

International Search Report received in PCT/AU2009/000717 mailed Jul. 17, 2009.

* cited by examiner

*Primary Examiner* — Monique Peets
(74) *Attorney, Agent, or Firm* — LeClairRyan, a Professional Corporation

(57) ABSTRACT

A photochromic polymer comprising at least one siloxane oligomer and at least two photochromic groups covalently linked to one or both terminuses of the siloxane oligomer and compositions containing photochromic siloxane polymers with narrow polydispersity. The photochromic polymer enhances switching speed in rigid host polymers.

20 Claims, 9 Drawing Sheets

Haze test. Compounds 10 F1 (left) and 4 F1 (right) incorporated within standard industrial lens formulation, both at an effective dye concentration of $1.975 \times 10^{-5}$ mol/g.

PHOTOCHROMIC POLYMER AND COMPOSITION COMPRISING PHOTOCHROMIC POLYMER

This application is a 371 national phase entry of PCT/AU2009/000717 and claims the benefit of U.S. Patent Application Ser. No. 61/129,128, filed 5 Jun. 2008, both of which are herein incorporated by reference in their entirety.

FIELD

The present invention relates to a photochromic polymer, to a composition containing the photochromic polymer and a method for preparing the photochromic polymer and composition.

BACKGROUND

Photochromism is a property which has been used in the manufacture of light transmissible articles for many years. A compound is said to be photochromic if it changes colour when irradiated and reverts to its original colour when irradiation ceases. The use of photochromics in the manufacture of spectacle lenses is a particular benefit as it enables the efficiency with which radiation is filtered to be varied with the intensity of radiation. Photochromics also have potential for use in a range of other polymeric compositions in products or in applications such as architectural, automotive and aircraft windows and transparencies; inks, paints and coating compositions; optical sensors, filters, switches and data storage devices; and for security and UV exposure sensing applications.

Despite the successful use of photochromic compounds in applications such as lenses there remain limitations which reduce the versatility and potential of this technology.

It is advantageous to control the rate at which photochromic polymeric compositions colour when exposed to radiation and fade on cessation of this exposure. In many situations, it is important to provide rapid colouring and fading kinetics particularly for lenses and spectacles. In some, however, the rate of coloration and fade is slow so that a compromise needs to be made in the components and properties of the substrate to enhance the rate of coloration and fade. For example, many photochromics colour and fade more rapidly in soft materials and yet, for applications such as spectacles, abrasion resistance and hardness are important. This trade off between rate of transformation and hardness produces a dilemma for manufacturers between toughness and photochromic efficiency. In polymeric lenses many photochromics exhibit a slower rate of fade than is desirable. In order to fix photochromics into a matrix it is possible to functionalise a photochromic with an unsaturated group. This results in the photochromic being tethered to the matrix. However, unless the matrix is relatively soft, the rate of fade is adversely affected. Hu et al. Pure Appln. Chem. AA(6) pp 803-810 (1996) also reported that tethering of the photochromic leads to decolouration rate remaining almost constant with increasing dye concentration.

In order to achieve attractive colouring of lenses and/or achieve a good UV barrier photochromic compounds are frequently used in combination. The variation in fade speed between various photochromics makes it difficult to achieve a uniform colour change. As a result the combination of photochromics tends to produce an unattractive colour change on transition to and from the coloured forms. It is desirable to be able to more closely match the fade speed of photochromics.

Our U.S. Pat. No. 7,247,262 describes a photochromic composition containing a photochromic compound and a host matrix. The photochromic compound has a photochromic moiety functionalised to contain one or more pendant oligomer groups. The oligomer groups were believed to provide a nanoenvironment to produce a significant increase in the rate of fade.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY

We have now found that the photochromic properties of photochromic dyes in a polymeric substrate can be enhanced by using a photochromic polymer comprising at least one siloxane oligomer and at least two photochromic moieties covalently linked to the siloxane oligomer, at least one photochromic moiety covalently linked to at least one terminus of the siloxane oligomer.

Accordingly, we provide in one embodiment a photochromic polymer comprising at least one siloxane oligomer and at least two photochromic moieties covalently linked to the siloxane oligomer, at least one photochromic moiety covalently linked to at least one terminus of the siloxane oligomer. Thus the at least two photochromic groups may be covalently linked to the same or different ends of the siloxane oligomer. The siloxane oligomer may be linear, branched, a star type or dendritic polymer. In the case of a branched, star or dendritic polymer a photochromic moiety may be present at the end of one, two, three or more branch or dendrite terminals.

In a further embodiment we provide a photochromic composition comprising a host matrix and a photochromic polymer comprising at least one siloxane oligomer and at least two photochromic moieties covalently linked, at least one photochromic moiety covalently linked to each end of the siloxane oligomer.

In another embodiment the invention comprises a method for preparing a photochromic polymer comprising providing a siloxane oligomer, reacting the siloxane oligomer with a photochromic moiety to provide at least two photochromic moieties covalently linked, at least one photochromic moiety to at least one end of the siloxane oligomer.

In one aspect the invention provides a process for tuning the switching speed of a photochromic group comprising providing a polysiloxane polymer and reacting the polysiloxane polymer with a photochromic compound to provide a photochromic polymer and wherein the process comprises separating the polysiloxane polymer, prior to or after reaction with the photochromic, into two or more molecular weight ranges and incorporating a photochromic polymer of a portion of the molecular weight ranges into a host polymer wherein the portion is chosen based on the required extent of increase in switching speed wherein the photochromic polymer of greater molecular weight switches more rapidly. In one set of examples of this embodiment the photochromic polymer comprising a siloxane group may be a photochromic described in our International publication WO 2004/041961 the contents of which are herein incorporated by reference. In one set of embodiments the photochromic polymer is of the type described above.

Throughout the description and the claims of this specification the word "comprise" and variations of the word, such as "comprising" and "comprises" is not intended to exclude other additives, components, integers or steps.

DETAILED DESCRIPTION

In one set of embodiments the photochromic polymer is of formula I:

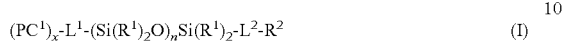

wherein:

$L^1$ and $L^2$ are independently selected from a bond and linker groups;

$R^2$ is selected from the group consisting of $(PC^2)_y$, hydrogen, $C_1$ to $C_{20}$alkyl, substituted $C_1$ to $C_{20}$ alkyl, poly($C_2$ to $C_4$alkylene) oligomers, poly(substituted $C_2$ to $C_4$ alkylene) oligomers, $C_1$ to $C_{20}$alkoxy, $C_1$ to $C_{20}$ haloalkyl, hydroxy, $C_1$ to $C_{20}$ haloalkoxy, optionally substituted amino, optionally substituted aryl carboxylic acid and derivatives thereof and optionally substituted ($C_1$ to $C_{20}$ alkyl)carboxylic and derivatives thereof;

n is from 2 to 80 such as from 4 to 370 or from 4 to 60 such as 4 to 50;

x is at least 1; y is independently selected from 0 to 10 and wherein x plus y is at least 2 and wherein when x and or y is at least two the groups $PC^1$ and/or $PC^2$ may be the same or different at each occurrence and may be attached to the linker via a discrete bond; and $R^1$ is selected from $C_1$ to $C_6$ alkyl (such as methyl, ethyl, propyl and butyl), aryl such as phenyl and mixtures thereof.

In one embodiment the photochromic oligomer is of formula I:

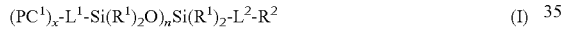

wherein:

$L^1$ and $L^2$ are independently selected from a bond and linker groups;

$R^2$ is selected from the group consisting of hydrogen, $C_1$ to $C_{20}$ alkyl, substituted $C_1$ to $C_{20}$ alkyl, poly($C_2$ to $C_4$alkylene) oligomers, poly(substituted $C_2$ to $C_4$ alkylene)oligomers, $C_1$ to $C_{20}$alkoxy, $C_1$ to $C_{20}$ haloalkyl, hydroxy, $C_1$ to $C_{20}$ haloalkoxy, optionally substituted amino, optionally substituted ($C_1$ to $C_{10}$ alkyl)carboxylic and derivatives thereof optionally substituted aryl carboxylic acid and derivatives thereof;

n is from 2 to 80 such as from 4 to 70 or from 4 to 60 such as 4 to 50;

x is at least 2 (for example from 2 to 10 such as 1, 2 or 3);

$R^1$ is selected from $C_1$ to $C_6$ alkyl (such as methyl, ethyl, propyl and butyl), aryl such as phenyl and mixtures thereof; and $(PC^1)$ is a photochromic group.

In another embodiment the photochromic oligomer is of formula II

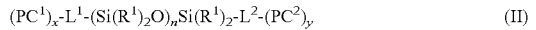

wherein:

$L^1$ and $L^2$ are independently selected from a bond and linker groups;

$PC^1$ and $PC^2$ are independently selected photochromic groups;

n is from 2 to 80 such as from 4 to 70 or from 4 to 60 such as 4 to 50;

x is at least 1 (such as from 1 to 10, 1 to 5, 1 to 2 and 1);

y is at least 1 (such as from 1 to 10, 1 to 5, 1 to 2 and 1); and $R^1$ is selected from $C_1$ to $C_6$ alkyl (such as methyl, ethyl, propyl and butyl), aryl such as phenyl and mixtures thereof.

In an embodiment of the invention the photochromic oligomer is of formula: IIa

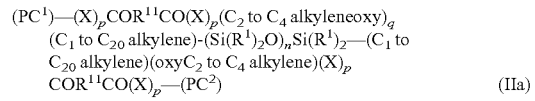

$L^1$ and $L^2$ are independently selected from a bond and linker groups. The linker groups may be selected from hetero atoms such as oxygen, sulfur, amino and substituted amino such as mono $C_1$ to $C_6$ alkylamino, substituted alkylene and poly(substituted alkylene) and the polyradical comprising at least one of the groups of formula IIIa through to IIIp:

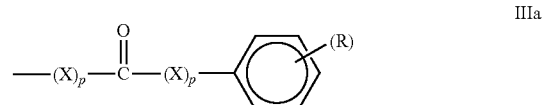
IIIa

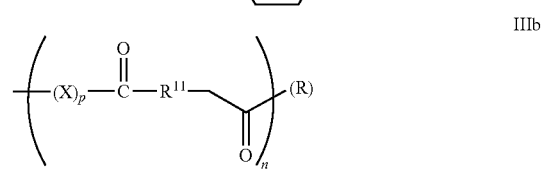
IIIb

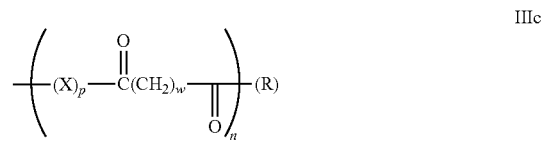
IIIc

IIId

IIIe

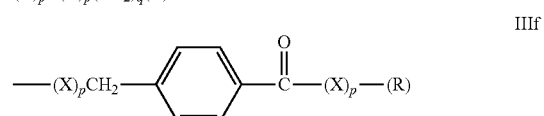
IIIf

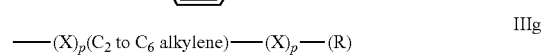
IIIg

IIIh

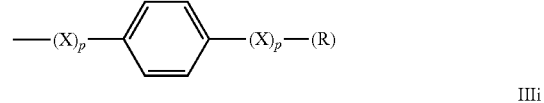
IIIi

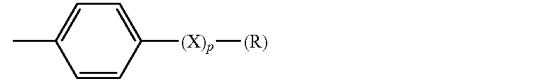
IIIj

IIIk

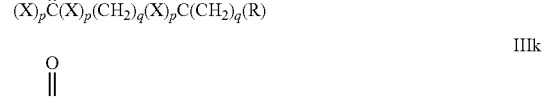
IIIl

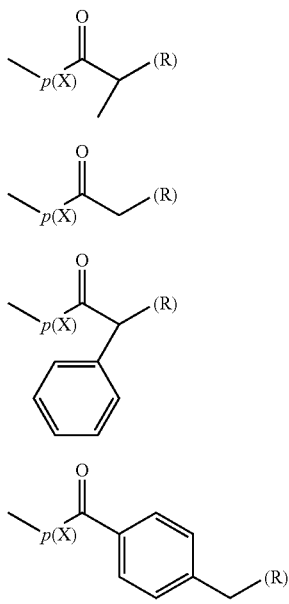

wherein in the formula IIIa to IIIp:

X which may be the same or different is selected from the group consisting of oxygen, sulphur, NH, N-alkyl and N-aryl;

R" is selected from the group consisting of hydroxy, alkoxy, amino and substituted amino such as alkyl amino;

$R^{11}$ is selected from the group consisting of $C_2$ to $C_4$ alkylene, ($C_1$ to $C_4$ alkylene)oxy($C_1$ to $C_4$ alkylene and phenylene, preferably 0-phenylene;

n is an integer from 1 to 3;

w is an integer from 1 to 4;

q, which when there is more than one may be the same or different, is an integer from 0 to 15;

p which when there is more than one may be the same or different is 0 or 1; and (R) shows the radial for attachment of siloxane oligomer R.

In one embodiment the linker is of formula:

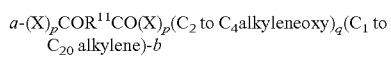

wherein:

a is the photochromic bonded end of the linker; and b is the siloxane oligomer bonded end of the linker;

p, at each occurrence, is independently selected from 0 or 1;

X is selected from the group consisting of oxygen, sulfur, NH, N-alkyl and N-aryl; and q is from 0 to 5; and $R^{11}$ is selected from $C_2$ to $C_4$ aliphatic (preferably $C_2$ to $C_4$ alkylene and $C_1$ to $C_2$ alkylene(oxy)$C_2$ to $C_4$ alkylene.

The linker of the photochromic oligomer may comprise poly(substituted alkylene) oligomer groups. Examples of preferred poly(substituted $C_2$ to $C_4$ alkylene) include units of formula IV:

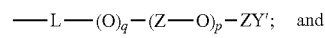

wherein:

$R^4$ is selected from the group consisting of hydrogen, halogen, alkyl, hydroxy, hydroxy alkyl, nitrile and alkoxy;

$R^3$ is selected from the group consisting of halogen, hydroxy, alkoxy, aryl, aryloxy, heterocyclic, arylalkyl, alkylaryl, carboxyl, nitrile, alkoxycarbonyl, substituted alkoxycarbonyl, carbamoyl, N-alkylcarbamoyl, N,N-dialkylcarbamoyl, carbaniloyl, alkylphenylaminocarbonyl, alkoxyphenylaminocarbonyl, acyl, substituted acyl and the groups of formula:

$$—L—(O)_q—(Z—O)_p—ZY'; \text{ and}$$

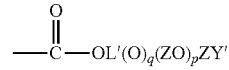

wherein:

p is the number of (ZO) units and is preferably from 1 to 20 and more preferably 2 to 15;

q is 0 or 1;

Z is selected from the group consisting of $C_2$-$C_4$ alkylene, dialkylsilyl, diarylsilyl and diaryloxysilyl and the group ($PC^3$) where ($PC^3$) is a photochromic group;

L' is a bond or a linking group such as $C_1$ to $C_6$ alkylene, aryl, alkylaryl and arylalkyl; and Y' is a terminal group selected from the group consisting of hydrogen, alkyl, hydroxyl and alkoxy, alkoxyalkoxy, hydroxyalkoxy and aryloxy, tri-($C_1$ to $C_6$ alkyl)silane, di($C_1$ to $C_6$ alkyl)phenyl silane;

$R^{4'}$ is hydrogen or halogen;

$R^{3'}$ is hydrogen or halogen and $R^3$ and $R^{3'}$ may together form a group of formula:

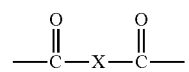

wherein:

X is selected from the group consisting of oxygen and the group $NR^5R^6$ wherein $R^5$ and $R^6$ are independently selected from the group of hydrogen, alkyl, aryl, substituted alkyl and substituted aryl.

The poly(substituted alkylene) oligomer type linker may be a homopolymer or copolymer where the polymer is a copolymer it may be a copolymer of two or more units or a copolymer of at least one unit of formula I with an unsaturated monomer other than of formula III. Where the polymer is a copolymer suitable comonomer units may include one or more distinct units of formula IV or comonomers of formula:

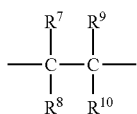

V wherein $R^7$, $R^8$, $R^9$ and $R^{10}$ are independently selected from the group consisting of hydrogen, halogen, alkyl and haloalkyl. The copolymer may be a random or block copolymer.

Examples the substituted alkylene derived linking oligomers include oligomers of formula VI

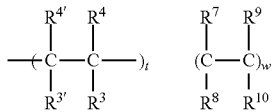

VI wherein:

t is from 2 to 500 preferably from 2 to 200 more preferably from 2 to 100 and most preferably from 5 to 50; and w is from 0 to 500 preferably from 0 to 200 more preferably from 0 to 100 and most preferably from 0 to 50.

When the polymer is a copolymer the distinct units may be present as blocks or randomly distributed.

Particularly preferred examples of the poly(substituted alkylene) include those formed from a dye monomer of formula VIIa to VIIf:

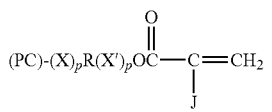

VIIa

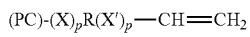

VIIb $$Z—L^1(Si(R^1)_2O)_nSi(R^1)_2—L^2—R^2$$

VIIIa

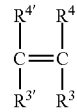

IXa

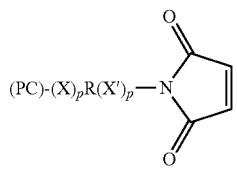

VIIc

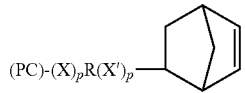

VIId $(PC)-(X)_pR(X')_p(YH)_w$

VIIe $(PC)-(X)_pR(X')_p(NR'R'')_w$

VIIf wherein:

X is a linking group for the oligomer;

X' is bond or attachment group for the one more reactive groups and is preferably selected from the group consisting of $C_1$ to $C_4$ alkylene;

where Y is oxygen or sulphur;

w is the number of hydroxy or thiol groups at the terminal end of the oligomer and is preferably 1 to 3;

p is independently selected from 0 and 1;

PC is a photochromic moiety;

J is hydrogen or $C_1$ to $C_4$ alkyl (preferably hydrogen or methyl);

R is an oligomer such as a poly$C_1$ to $C_4$ alkyleneoxy or polysiloxane of from 3 to 20 and preferable 3 to 15 monomer units;

R' is hydrogen, $C_1$ to $C_6$ alkyl or substituted ($C_1$ to $C_6$) alkyl; and

R'' is hydrogen, ($C_1$ to $C_6$) alkyl or substituted ($C_1$ to $C_6$) alkyl.

Accordingly, compounds of formula I include siloxane oligomers functionalized at one or both ends with dye functionalized monomeric units.

Examples of such compounds may be formed by living free radical polymerization such as by reacting siloxane polymer substituted at one end (VIIIa) or at both ends (VIIIb) by a living free radical control group with an olefin of formula IXb or mixture of IXa and IXb to provide a photochromic polymer having photochromic groups $PC^1$ covalently linked to one or both ends of the siloxane polymer.

$$Z—L^1—(Si(R^1)_2O)—Si(R^1)_2—L^2—Z$$

VIIIb

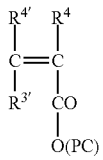

IXb

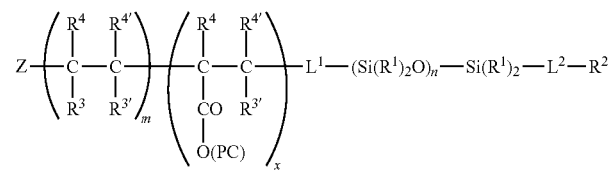

Xa

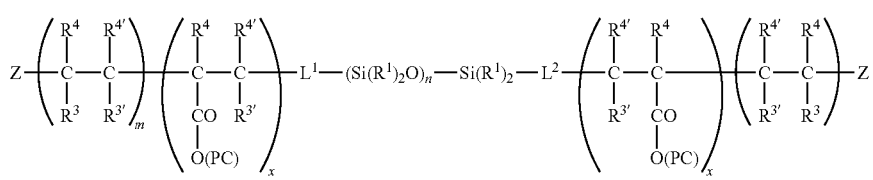

wherein
Z is a living free radical polymerization control group such as an ATRP or RAFT control group;
m is from 0 to 80, preferably from 0 to 40 and more preferably from 1 to 20;
x is an integer from 1 to 80, preferably from 1 to 40 and more preferably from 1 to 20; and
the groups $R^1$, $L^1$, $L^2$ and the integer n are as hereinbefore defined with reference to formulas I and II.

The groups $L^1$ and $L^2$ covalently join the oligomer(s) to the at least two photochromic moieties ($PC^1$) and ($PC^2$). A linking group (i.e. where $L^1$ and $L^2$ are other than a bond) may be preferred when the siloxane oligomer has a terminal functional group or groups that cannot be used directly to join to the dye. The linking group may in some cases be available as part of the oligomer.

The compounds of the present invention comprise siloxane oligomer groups wherein the total number of monomeric units is as least 3, preferably at least 5 and more preferably at least 7.

The photochromic compound of the invention may posses a functional group reactive with a host polymer with which it is incorporated so the photochromic compound becomes covalently tethered to a host matrix during curing of a host matrix in which the photochromic is incorporated. This group may arise directly from the polymeric substituent preparation process (i.e. when an polymeric substituent is grown from the dye.) or may be attached in a separate process. This group may be an active hydrogen containing group such as one or more alcohol, acid or amine groups (for reaction for example with an isocyanate in a polyurethane host or acid in a polyester host) isocyanate for incorporation in a urethane matrix), a thiol for incorporation by thiol-ene reaction or an unsaturated terminal group for copolymerization with an unsaturated host. This group may also be a living free radical group such as a RAFT or iniferter type group such as dithioester, trithiocarbonate, dithiocarbamate or xanthate, an ATRP group such as a halogen or alkoxyamine for the polymeric substituent grown by a living free radical method. Where a group $L^2$ is formed at least in part by living free radical polymerization these groups may themselves be converted to other groups using standard chemistry to provide a suitable terminal group $R^2$. RAFT agents can be converted to thiols or hydrogen and ATRP end groups may be converted to hydrogen and amines etc.

Where the photochromic compound comprises a reactive functional group such as a reactive $R^2$ it may be reacted with a cured or partly cured host resin formed from a monomer composition. The resin may for example be a thermoplastic resin and the photochromic may be incorporated in the resin type, during or after moulding under condition which lead to reaction between the cured or partly cured resin at the photochromic monomer.

Throughout the specification and claims terms are used in the definition of chemical groups and substituents which unless a contrary intent is indicated have the meanings referred to below.

"Acyl" means an R—C(=O)— group in which the R group may be an alkyl, cycloalkyl, heterocycloalkyl, aryl or heteroaryl group as defined herein. Examples of acyl include acetyl and benzoyl. The group may be a terminal group or a bridging group. If the group is a terminal group it is bonded to the remainder of the molecule through the carbonyl carbon.

"Acylamino" means an R—C(=O)—NH— group in which the R group may be an alkyl, cycloalkyl, heterocycloalkyl, aryl or heteroaryl group as defined herein. The group may be a terminal group or a bridging group. If the group is a terminal group it is bonded to the remainder of the molecule through the nitrogen atom.

"Alkenyl" as a group or part of a group denotes an aliphatic hydrocarbon group containing at least one carbon-carbon double bond and which may be straight or branched preferably having 2-12 carbon atoms, more preferably 2-10 carbon atoms, most preferably 2-6 carbon atoms, in the normal chain. The group may contain a plurality of double bonds in the normal chain and the orientation about each is independently E or Z. Exemplary alkenyl groups include, but are not limited to, ethenyl, propenyl, butenyl, pentenyl, hexenyl, heptenyl, octenyl and nonenyl. The group may be a terminal group or a bridging group.

"Alkyl" as a group or part of a group refers to a straight or branched aliphatic hydrocarbon group, of for example one to twenty carbon atoms, preferably a $C_1$-$C_{12}$ alkyl, more preferably a $C_1$-$C_{10}$ alkyl, most preferably $C_1$-$C_6$ alkyl unless otherwise noted. Examples of suitable straight and branched $C_1$-$C_6$ alkyl substituents include methyl, ethyl, n-propyl, 2-propyl, n-butyl, sec-butyl, t-butyl, hexyl, and the like. The group may be a terminal group or a bridging group.

"Alkylamino" includes both mono-alkylamino and dialkylamino, unless specified. "Mono-alkylamino" means an Alkyl-NH— group, in which alkyl is as defined herein. "Dialkylamino" means an (alkyl)$_2$N— group, in which each alkyl may be the same or different and are each as defined herein for alkyl. The alkyl group is preferably a $C_1$-$C_6$ alkyl group. The group may be a terminal group or a bridging group. If the group is a terminal group it is bonded to the remainder of the molecule through the nitrogen atom.

"Alkylene" refers to diradical linking groups comprising at least one double bond such as ethylene, n-propylene, isopropylene.

"Alkyloxy" and alkoxy refer to an alkyl-O— group in which alkyl is as defined herein. Preferably the alkoxy is a $C_1$ to $C_6$ alkoxy. Examples include, but are not limited to, methoxy and ethoxy. The group may be a terminal group or a bridging group.

"Aryl" as a group or part of a group denotes (i) an optionally substituted monocyclic, or fused polycyclic, aromatic carbocycle (ring structure having ring atoms that are all carbon) preferably having from 5 to 12 atoms per ring. Examples of aryl groups include phenyl, naphthyl, and the like; (ii) an optionally substituted partially saturated bicyclic aromatic carbocyclic moiety in which a phenyl and a $C_{5-7}$ cycloalkyl or $C_{5-7}$ cycloalkenyl group are fused together to form a cyclic structure, such as tetrahydronaphthyl, indenyl or indanyl. The group may be a terminal group or a bridging group. Typically an aryl group is a $C_6$-$C_8$ aryl group and most preferably is phenyl.

"Arylalkyl" means an aryl-alkyl-group in which the aryl and alkyl moieties are as defined herein. Preferred arylalkyl groups contain a $C_1$ to $C_6$ alkyl moiety. Exemplary arylalkyl groups include benzyl, phenethyl, 1-naphthalenemethyl and 2-naphthalenemethyl. The group may be a terminal group or a bridging group. If the group is a terminal group it is bonded to the remainder of the molecule through the alkyl group.

A "bond" is a linkage between atoms in a compound or molecule. The bond may be a single bond, a double bond, or a triple bond.

"Halogen" or "halo" represents chlorine, fluorine, bromine or iodine and most preferably fluorine or chlorine.

"Heteroaryl" either alone or part of a group refers to groups containing an aromatic ring (preferably a 5 or 6 membered aromatic ring) having one or more heteroatoms as ring atoms in the aromatic ring with the remainder of the ring atoms being carbon atoms. Suitable heteroatoms include nitrogen, oxygen and sulphur. Examples of heteroaryl include thiophene, benzothiophene, benzofuran, benzimidazole, benzoxazole, benzothiazole, benzisothiazole, naphtho[2,3-bi]thiophene, furan, isoindolizine, xantholene, phenoxatine, pyrrole, imidazole, pyrazole, pyridine, pyrazine, pyrimidine, pyridazine, tetrazole, indole, isoindole, 1H-indazole, purine, quinoline, isoquinoline, phthalazine, naphthyridine, quinoxaline, cinnoline, carbazole, phenanthridine, acridine, phenazine, thiazole, isothiazole, phenothiazine, oxazole, isooxazole, furazane, phenoxazine, 2-, 3- or 4-pyridyl, 2-, 3-, 4-, 5-, or 8-quinolyl, 1-, 3-, 4-, or 5-isoquinolinyl 1-, Z-, or 3-indolyl, and 2-, or 3-thienyl. A heteroaryl group is typically a $C_1$-$C_{18}$ heteroaryl group. The group may be a terminal group or a bridging group.

"Heterocyclic" refers to saturated, partially unsaturated or fully unsaturated monocyclic, bicyclic or polycyclic ring system containing at least one heteroatom selected from the group consisting of nitrogen, sulfur and oxygen as a ring atom.

The term "optionally substituted" as used throughout the specification denotes that the group may or may not be further substituted or fused (so as to form a condensed polycyclic system), with one or more non-hydrogen substituent groups. In certain embodiments the substituent groups are one or more groups independently selected from the group consisting of halogen, =O, =S, —CN, —$NO_2$, —$CF_3$, —$OCF_3$, alkyl, alkenyl, alkynyl, haloalkyl, haloalkenyl, haloalkynyl, heteroalkyl, cycloalkyl, cycloalkenyl, heterocycloalkyl, heterocycloalkenyl, aryl, heteroaryl, cycloalkylalkyl, heterocycloalkylalkyl, heteroarylalkyl, arylalkyl, cycloalkylalkenyl, heterocycloalkylalkenyl, arylalkenyl, heteroarylalkenyl, cycloalkylheteroalkyl, heterocycloalkylheteroalkyl, arylheteroalkyl, heteroarylheteroalkyl, hydroxy, hydroxyalkyl, alkyloxy, alkyloxyalkyl, alkyloxycycloalkyl, alkyloxyheterocycloalkyl, alkyloxyaryl, alkyloxyheteroaryl, alkyloxycarbonyl, alkylaminocarbonyl, alkenyloxy, alkynyloxy, cycloalkyloxy, cycloalkenyloxy, heterocycloalkyloxy, heterocycloalkenyloxy, aryloxy, phenoxy, benzyloxy, heteroaryloxy, arylalkyloxy, amino, alkylamino, acylamino, aminoalkyl, arylamino and sulfonylamino, sulfinylamino, sulfonyl, alkylsulfonyl, arylsulfonyl, aminosulfonyl, sulfinyl, alkylsulfinyl and arylsulfinyl. Specific examples of optional substituents include halogen, alkyl. hydroxyl, amino, alkylamino Examples of heterocyclic moieties include heterocycloalkyl, heterocycloalkenyl and heteroaryl.

The term switching speed refers to the speed of colouration when a photochromic is exposed to light and also to the speed of fade when a coloured photochromic is removed from the light. Generally the photochromic polymers exhibit more rapid colouration and more rapid fade when compared with corresponding photochromics in the absence of siloxane polymer.

The group $R^2$ may in one set of embodiments be selected from aryl carboxylic acids and derivatives thereof ($C_1$ to $C_{10}$ alkyl)carboxylic. Examples of aryl carboxylic acids include benzoic acid. Examples of derivatives include the optionally substituted $C_1$ to $C_{10}$ alkyl esters and optionally substituted $C_1$ to $C_{10}$ alkyl amides thereof.

Photochromic polymer in accordance with the invention may comprise two or more photochromic moieties selected from the group consisting of:

chromenes such as those selected from the group consisting of naphthopyrans, benzopyrans, indenonaphthopyrans and phenanthropyrans;

spiropyrans such as those selected from the group consisting of spiro(benzindoline) naphthopyrans, spiro(indoline) benzopyrans, spiro(indoline)-naphthopyrans, spiroquinopyrans, spiro(indoline)pyrans and spirodihydroindolizines;

spiro-oxazines such as those selected from the group consisting of spiro(indoline)naphthoxazines, spiro(indoline)pyridobenzoxazines, spiro(benzindoline)pyridobenzoxazines, spiro(benzindoline)naphthoxazines and spiro(indoline)benzoxazines;

fulgides, fulgimides;

anils;

perimidinespirocyclohexadienones;

stilbenes;

thioindigoids;

azo dyes; and diarylethenes.

Examples of photochromic moieties may be selected from the group consisting of fulgide photochromic compounds, chromene photochromic compounds and spiro-oxazine photochromic compounds. A wide range of photochromic compounds of each of the classes referred to above have been described in the prior art and having regard to the teaching herein the skilled addressee will have no difficulty in preparing a wide range of photochromic oligomer adducts. Examples of chromene photochromic compounds, fulgide photochromic compounds and spiro-oxazine photochromic compounds are described in U.S. Pat. No. 5,776,376.

The most preferred photochromic moieties are the chromenes and spiro-oxazines, specifically spiroindolene aroxazines.

Spiro-oxazines such as spiroindoline naphthoxazines depicted below are clear but in the presence of light undergo ring opening to give a coloured form as shown:

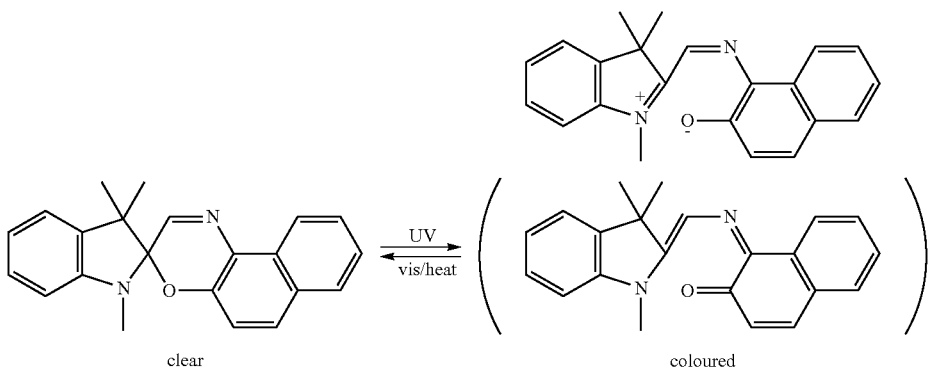

clear ⇌ (UV / vis/heat) coloured

A further embodiment of the invention is a photochromic compound of formula:

wherein (PC$^1$) and (PC$^2$) are photochromic moieties particularly a spirooxazine of formula VIII, chromenes, fulgide/fulgimide or an azo dye and L$^1$, L$^2$, R$^1$, x and n are as hereinbefore defined.

Preferred spiro-oxazines of the general formula VIII can be suitably used.

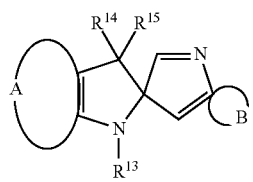

VIII

In the general formula VIII, R$^{13}$, R$^{14}$ and R$^{15}$ may be the same or different and are each an alkyl group, a cycloalkyl group, a cycloarylalkyl group, an alkoxy group, an alklyleneoxyalkyl group, an alkoxycarbonyl group, a cyano, an alkoxycarbonylalkyl group, an aryl group, an arylalkyl group, an aryloxy group, an alkylenethioalkyl group, an acyl group, an acyloxy group or an amino group, R$^4$ and R$^5$ may together form a ring, and R$^3$, R$^4$ and R$^5$ may optionally each have a substituent(s). The substituent(s) can include, besides the above-mentioned groups, halogen atom, nitro group, heterocyclic group, etc. The group represented by moiety VIIIa:

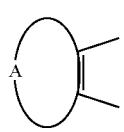

VIIIa is a substituted or unsubstituted bivalent aromatic hydrocarbon group or a substituted or unsubstituted bivalent unsaturated heterocyclic group. The group represented by moiety VIIIb:

VIIIb is a substituted or unsubstituted bivalent aromatic hydrocarbon group or a substituted or unsubstituted bivalent unsaturated heterocyclic group. Specific examples of the bivalent aromatic hydrocarbon group are groups of 6 to 14 carbon atoms derived from benzene ring, naphthalene ring, phenanthrene ring, anthracene ring or the like. Specific examples of the bivalent unsaturated heterocyclic group are groups of 4 to 9 carbon atoms derived from furan ring, benzofuran ring, pyridine ring, quinoline ring, isoquinoline ring, pyrrole ring, thiophene ring, thiophene ring, benzothiophene ring or the like.

The substituents can be the same groups as mentioned above with respect to R$^{13}$, R$^{14}$ and R$^{15}$. In particular, a group represented by:

(wherein R$^{16}$ and R$^{17}$ are each an alkyl group, an alkoxy group, an allyl group or the like, each of which may be substituted; and R$^{16}$ and R$^{17}$ may be bonded and cyclized with each other to form a nitrogen-containing heterocyclic ring) is preferable from the standpoint of high density of its developed colour in the initial photochromic performance.

In an embodiment the photochromic compounds of the invention are of formula IX:

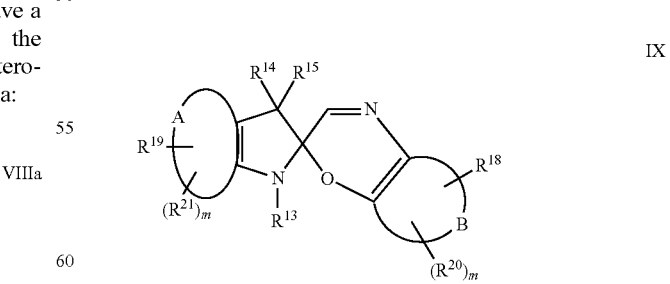

IX wherein R$^{13}$, R$^{14}$, R$^{15}$, R$^{18}$ R$^{19}$, R$^{20}$ and R$^{21}$ are independently selected from the group consisting of hydrogen, alkyl, halo, haloalkyl, cycloalkyl, cycloarylalkyl, hydroxy, alkoxy, alkyleneoxyalkyl, alkoxycarbonyl, aryl, arylalkyl, aryloxy, alkylenethioalkyl, acyl, acyloxy, amino, NR$^{16}$R$^{17}$, cyano and the group wherein $L^1$ and/or $L^2$ in the compound of formula I is attached to one of $R^{13}$, $R^{18}$ and $R^{19}$. The subscript m is an integer and may be 0, 1 or 2 wherein m is 2 the groups may be independently selected.

In the compound of formula IV the total of the number of monomer units in oligomer substituents, $(R)_n$, is at least 3, more preferably at least 5 and most preferably at least 7.

More preferably, the substituents $R^{13}$ is selected from the group consisting of alkyl, cycloalkyl, cycloarylalkyl, alkyleneoxyalkyl, aryl, arylalkyl alkylenethioalkyl, and the bond to $L^1$ and/or $L^2$ more preferably $R^3$ is selected from alkyl, cycloalkyl, cycloarylalkyl, alkenyloxyalkyl, aryl, arylalkyl, and the point of attachment of $L^1$ and/or $L^2$ and preferably $R^4$ and $R^5$ are independently selected from alkyl, cycloalkyl and aryl.

$R^{18}$ and $R^{19}$ are independently selected from hydrogen and the point of attachment of $L^1$ and/or $L^2$; $R^{20}$ and $R^{21}$ are independently selected from the group consisting alkyl, cycloalkyl, cycloarylalkyl, alkoxy, —$NR^{16}R^{17}$, cyano, alkyleneoxyalkyl, alkoxycarbonyl, aryl, arylalkyl, aryloxy, alkylenethioalkyl, aryl aryloxy and amino and most preferably $R^{20}$ and $R^{21}$ are independently selected from alkyl, cycloalkyl, alkoxy, $NR^{16}R^{17}$ and cyano; and m is 0 or 1.

Examples of the preferred fused aromatic ring groups of formula VIIIa include VIIIa(i);

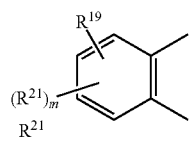

VIIIa(i)

wherein $R^9$ and $R^{21}$ are as hereinbefore defined.

Examples of the preferred fused aromatic ring group of formula VIIIb include VIIIb(i), VIIIb(ii), VIIIb(iii) and VIIIb(iv).

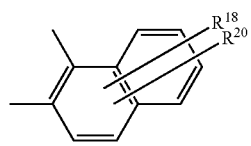

VIIIb(i)

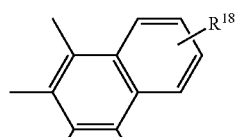

VIIIb(ii)

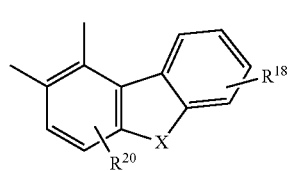

VIIIb(iii)

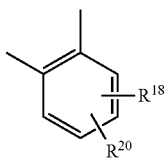

VIIIb(iv)

Specific examples of the group of formula IIIa(i) include:

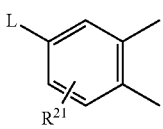

VIIIa(ia)

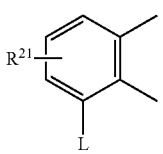

VIIIa(ib)

where L is the point of attachment of the groups $L^1$ or $L^2$ of formula I.

Specific examples of the group of formula IIIb include

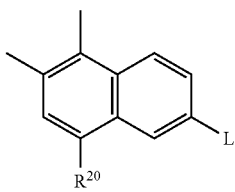

VIIIb(ia)

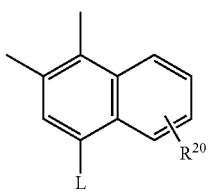

VIIIa(ib)

One particularly preferred embodiment of the compounds of formula IV has the formula IVa:

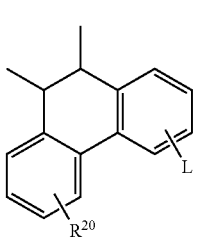

VIIIb(iia)

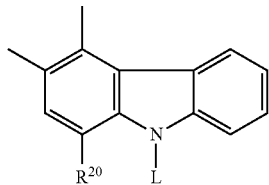

One of the preferred groups of photochromics are the spiropyrans. Examples of spiropyrans include compounds of formula XX:

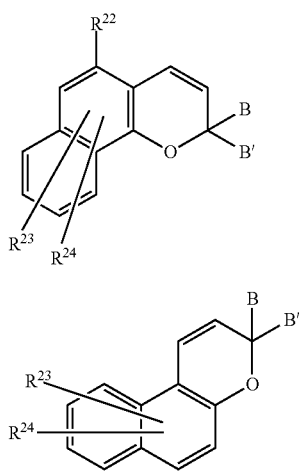

wherein

B and B' are optionally substituted aryl and heteroaryl; and $R^{22}$, $R^{23}$ and $R^{24}$ are independently selected from hydrogen; halogen; $C_1$ to $C_3$ alkyl; attachment of the group $L^1$ or $L^2$; and the group of formula COW wherein W is $OR^{25}$, $NR^{26}R^{27}$, piperidino or morpholino wherein $R^{25}$ is selected from the group consisting of $C_1$ to $C_6$ alkyl, phenyl, ($C_1$ to $C_6$ alkyl) phenyl, $C_1$ to $C_6$ alkoxyphenyl, phenyl $C_1$ to $C_6$ alkyl ($C_1$ to $C_6$ alkoxy)phenyl, $C_1$ to $C_6$ alkoxy $C_2$ to $C_4$ alkyl and the group $L(R)_n$; $R^{26}$ and $R^{27}$ are each selected from the group consisting of $C_1$ to $C_6$ alkyl, $C_5$ to $C_7$ cycloalkyl, phenyl, phenyl substituted with one or two groups selected from $C_1$ to $C_6$ alkyl and $C_1$ to $C_6$ alkoxy and the group $L(R)_n$; $R^{22}$ and $R^{23}$ may optionally from a carboxylic ring of 5 or 6 ring members optionally fused with an optionally substituted benzene and wherein at least one of the substituents selected from the group of substituents consisting of B and B', $R^{22}$, $R^{23}$, $R^{24}$, $R^{25}$, $R^{26}$ and $R^{27}$ is the group $L(R)_n$.

When $R^{22}$ and $R^{23}$ are carbocyclic a preferred compound is of formula XX(d)

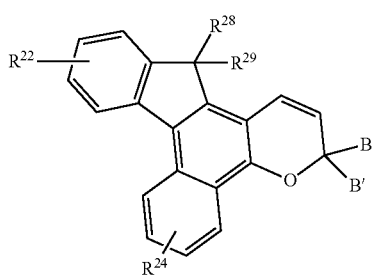

where $R^{22}$, $R^{28}$ and $R^{29}$ are as defined for $R^{22}$ above.

Preferably B and B' are independently selected from the group consisting of aryl optionally substituted with from 1 to 3 substituents, heteroaryl optionally substituted with from 1 to 3 substituents. The substituents where present are preferably selected from the group consisting of hydroxy, aryl, ($C_1$ to $C_6$) alkoxyaryl, ($C_1$ to $C_6$) alkylaryl, chloroaryl ($C_3$ to $C_7$) cycloalkylaryl, ($C_3$ to $C_7$) cycloalkyl, ($C_3$ to $C_7$) cycloalkoxy, ($C_3$ to $C_7$) cycloalkoxy, ($C_1$ to $C_6$) alkyl, aryl ($C_1$ to $C_6$) alkyl, aryl ($C_1$ to $C_6$) alkoxy, aryloxy, aryloxyalkyl, aryloxy ($C_1$ to $C_6$) alkoxy, ($C_1$ to $C_6$) alkylaryl, ($C_1$ to $C_6$) alkyl, ($C_1$ to $C_6$)) alkoxyaryl, ($C_1$ to $C_6$) alkyl, ($C_1$ to $C_6$) alkoxyaryl, ($C_1$ to $C_6$) alkyl, ($C_1$ to $C_6$) alkoxyaryl, ($C_1$ to $C_6$) alkoxy, amino, N—($C_1$ to $C_6$) alkyl piperazino, N-aryl piperazino, indolino, piperidino, aryl pipersillins, morpholino, thiomorpholino, tetrahydro quinolino.

$NR^{29}R^{30}$ wherein $R^{29}$ and $R^{30}$ are independently selected from the group selected from $C_1$ to $C_6$ alkyl, phenyl, $C_5$ to $C_7$ cycloalkyl and the group wherein $R^{29}$ and $R^{30}$ form a linking group of 4 or 5 linking groups comprising methylene groups and optionally containing one or two hetero atoms and optionally further substituted by $C_1$ to $C_3$ alkyl and the attachment of $L^1$ and/or $L^2$ in the compound of formula I.

$R^{22}$ is selected from the group consisting of hydrogen, $C_1$ to $C_6$ alkyl; COW where W is $OR^{25}$ wherein $R^{25}$ $C_1$ to $C_6$ alkyl; and the group $NR^{26}R^{27}$; wherein $R^{26}$ and $R^{27}$ are independently $C_1$ to $C_6$ alkyl; and part of attachment of $L^1$ and/or $L^2$ in the compound of formula I.

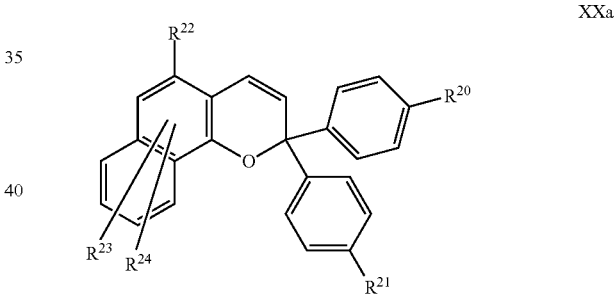

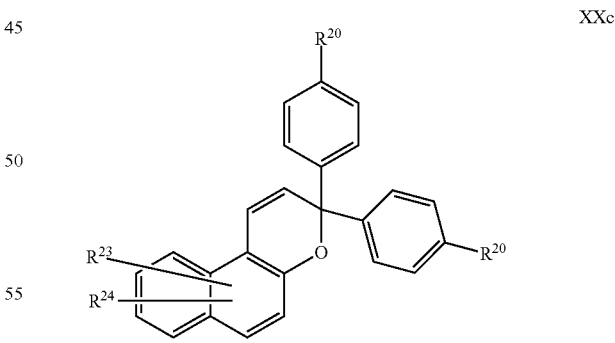

Particularly preferred naphthopyran compounds are of formula XX(a) and XX(c) wherein $R^{20}$ and $R^{21}$ are independently selected from the group consisting of hydrogen, hydroxy, alkoxy, amino, alkylamino, dialkylamino and the point of attachment of $L^1$ and/or $L^2$ in the compound of formula I;

$R^{22}$ is the group COW where W is $C_1$ to $C_6$ alkoxy or the point of attachment of $L^1$ and/or $L^2$ in the compound of formula I;

$R^{23}$ is selected from the group consisting of hydrogen and $NR^{26}R^{27}$ where $R^{26}$ are independently selected from the group consisting of $C_1$ to $C_6$ alkyl and where $R^{26}$ and $R^{27}$ may together form an alkylene group of 4 to 6 carbon atoms;

$R^{24}$ is hydrogen or the part of attachment of $L^1$ and/or $L^2$ in the compound of formula I; and wherein at least one of $R^{22}$ and $R^{24}$ is the point of attachment of $L^1$ and/or $L^2$ in the compound of formula I.

The photochromics ($PC^1$) and ($PC^2$) may be the same or different. Different photochromics may be chosen to provide a blend of dye colours to control the overall photochromic shade.

In another embodiment $PC^1$ and $PC^2$ are the same so that two equivalents of any one of the above photochromic moieties attached are to each of $L^1$ and $L^2$.

The compounds of the invention may be prepared by a range of synthetic approaches.

In one embodiment the compounds of the invention are prepared from a siloxane oligomer having at least two functional groups for reaction with photochromic compounds or lining groups attached or for subsequent attachment to photochromics Examples of suitable polyfunctional siloxane oligomers include:

A. Polyunsaturated silicone oligomers such as the compounds of formula XXX, XXXI and XXXII:

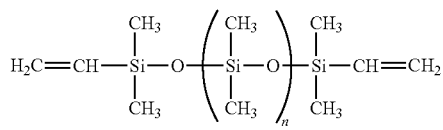

XXX wherein n 0 or more such as 0 to 80, preferably at least 1, preferably from 1 to 80 and more preferably 3 to 70;

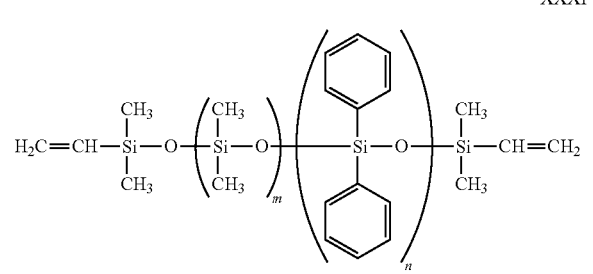

XXXI wherein at least one of n and m is at least one and n+m is from 1 to 80 and preferably from 3 to 70;

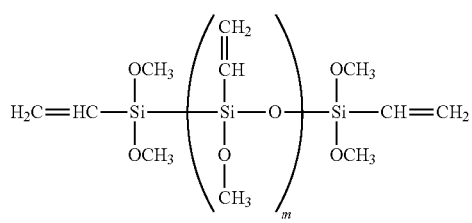

XXXII wherein m is at least 1, preferably from 1 to 80 and more preferably from 3 to 70.

B. Reactive hydride groups such as compounds of formula XXXIV and XXXV:

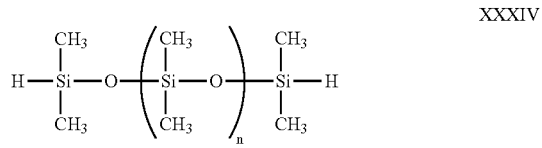

XXXIV wherein n is 0 or more such as 0 to 80, preferably at least 1, more preferably from 1 to 80 and still more preferably from 3 to 70;

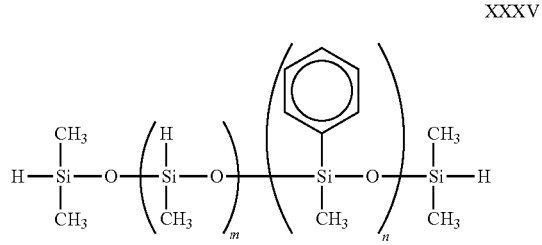

XXXV wherein n is at least one and n+m is from 1 to 80, preferably from 3 to 70.

C. Silanol functionalised siloxanes such as compounds of formula XXXVI, XXXVIII and XXXIX;

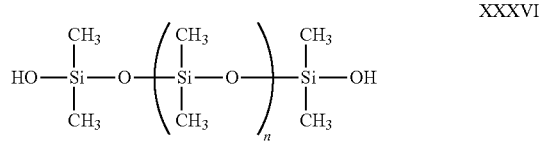

XXXVI wherein n is 0 or more such as 0 to 80, preferably at least 1, more preferably from 1 to 80 and still more preferably from 3 to 70;

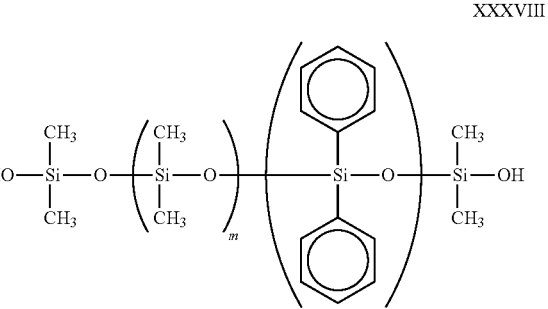

XXXVIII wherein n is at least one and n+m is at least 1, preferably n+m is from 1 to 80 and more preferably from 1 to 70;

XXXIX

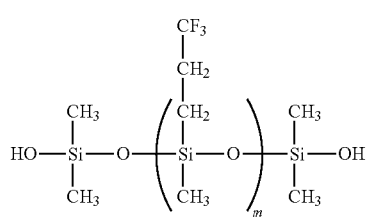

wherein m is at least 1, preferably from 1 to 80 and more preferably from 3 to 70.

D. Amine functional groups such as compounds of formula XL, XLIa and XXXIb;

XL

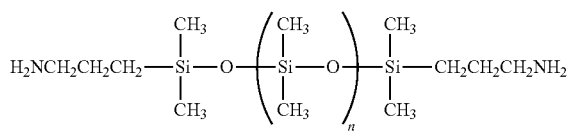

wherein n is 0 or more such as 0 to 80, preferably at least 1, more preferably from 1 to 80 and still more preferably from 3 to 70;

XLIa

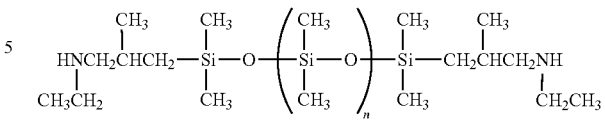

wherein n is 0 or more such as 0 to 80, preferably at least 1, more preferably from 1 to 80 and still more preferably from 3 to 70;

XLIb

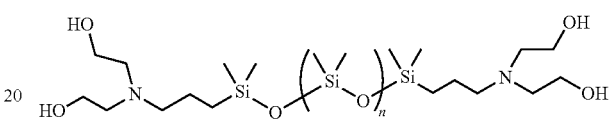

wherein n is 0 or more such as 0 to 80, preferably at least 1, more preferably from 1 to 80 and still more preferably from 3 to 70.

E. Epoxide substituted siloxane oligomers such as compounds of formula XLII:

XLII $$\underset{H_2C}{\overset{O}{\triangle}}-CHCH_2O(CH_2)_3-\underset{CH_3}{\overset{CH_3}{\underset{|}{Si}}}-O\left(\underset{CH_3}{\overset{CH_3}{\underset{|}{Si}}}-O\right)_n\underset{CH_3}{\overset{CH_3}{\underset{|}{Si}}}-(CH_2)_3OCH_2\overset{O}{\overset{\triangle}{CH}}-CH_2$$

wherein n is 0 or more such as 0 to 80, preferably at least 1, more preferably from 1 to 80 and still more preferably from 3 to 70;

F. Anhydride substituted siloxane oligomers and dicarboxylic acid terminated siloxanes such as succinic anhydride terminated siloxanes of formula XLIII:

DMS-Z21

XLIII

wherein n is 0 or more such as 0 to 80, preferably at least 1, more preferably from 1 to 80 and still more preferably from 3 to 70;

G. Carbanol substituted siloxane oligomers such as the compounds of formula XLIIIa and XLIV;

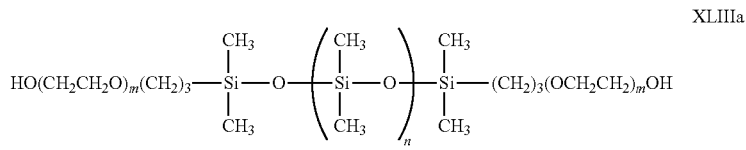

XLIIIa wherein n is 0 or more such as 0 to 80, preferably at least 1, more preferably from 1 to 80 and still more preferably from 3 to 70;
and each m is independently from 0 to 20 and preferably 0 to 10;

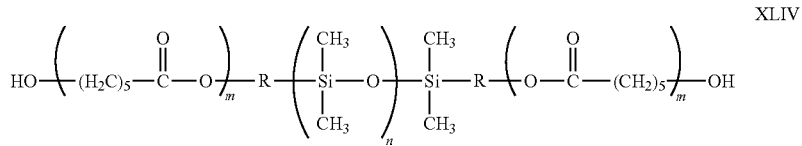

XLIV wherein each R is independently selected alkyl, each m is from 0 to 2 and wherein n is 0 or more such as 0 to 80, preferably at least 1, more preferably from 1 to 80 and still more preferably from 3 to 70 and m is from 0 to 20 and preferably 0 to 10;

H. The unsaturated siloxane oligomers also include acryloxy($C_1$ to $C_6$ alkyl) and methacryloxy($C_1$ to $C_6$ alkyl) terminated siloxanes such as compounds of formula XLV;

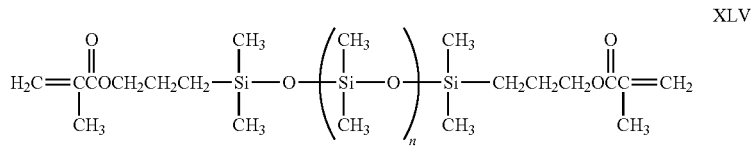

XLV wherein n is 0 or more such as 0 to 80, preferably at least 1, more preferably from 1 to 80 and still more preferably from 3 to 70;

I. Acryloxy and methacryloxy terminal groups linked to a siloxane oligomer portion via alkyleneoxyalkyl, polyalkyleneoxyalkyl or substituted alkyleneoxyalkyl (wherein alkylene is generally $C_2$ to $C_4$ alkylene and alkyl is generally $C_1$ to $C_{20}$ alkyl such as in the compound of formula q XLVI

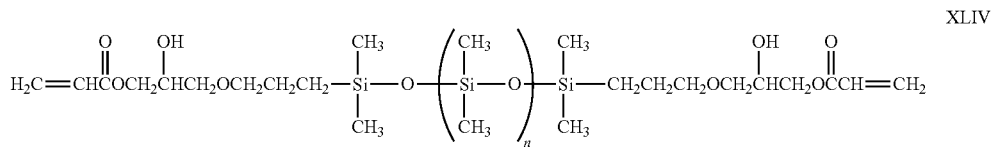

XLIV wherein n is 0 or more such as 0 to 80, preferably at least 1, more preferably from 1 to 80 and still more preferably from 3 to 70.

J. The carboxy substituted siloxane oligomers such as the compounds of formula, L, LI and LII;

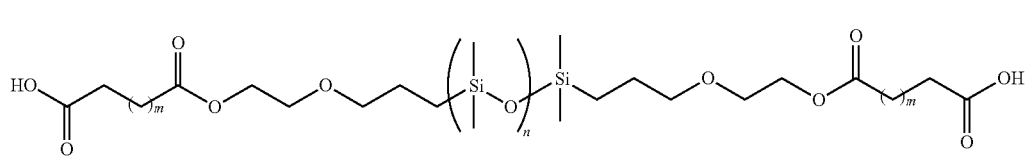

L wherein each m is from 0 to 5 and wherein n is from 1 to 80

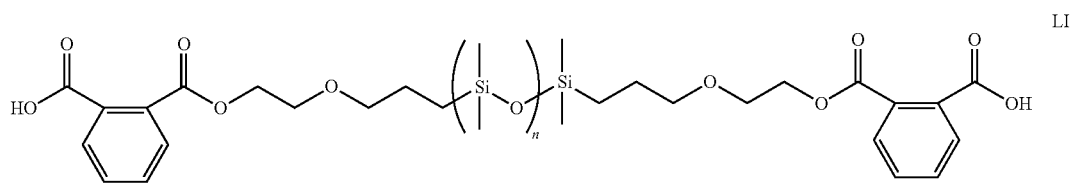

LI wherein n is from 1 to 80

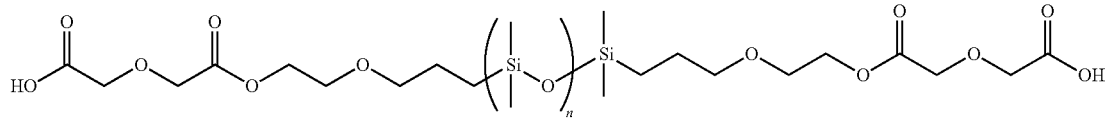

LII wherein n is from 1 to 80.

These may be made from available hydroxyl terminated siloxanes by the reaction of a suitable anhydride such as but not limited to succinic anhydride, phthalic anhydride and glycolyl anhydride.

As previously mentioned such compounds may be reacted directly with appropriately functionalised photochromics or the functionalised siloxane oligomer and/or photochromic may be further functionalised with reactive portions which form at least part of the linker groups L¹ and L².

For example, siloxane oligomers terminated with a nucleophilic group such as an alcohol or amine may be reacted with an anhydride to provide a terminal acid from which may be activated to nucleophilic attack of a electrophilic substituent of a photochromic (such as hydroxyl or primary or secondary amine) by, for example formation of an acid chloride or anhydride. Reaction of the siloxane with one or two equivalents of appropriately functionalized photochromic may then provide a siloxane having one or two terminal photochromic groups. If reaction conditions are appropriately controlled it may be possible to provide two distinct photochromic moieties one at each end of the siloxane or both at the same end.

Photochromics may be prepared from anhydride terminated siloxane oligomers by reaction with an amine or alcohol and subsequent reaction of the resulting free acid (or derivative thereof comprising a substituent, such as an acid chloride, activated to nucleophilic elimination) with a nucleophilic substituent of a photochromic. The reaction scheme may be summarised as follows:

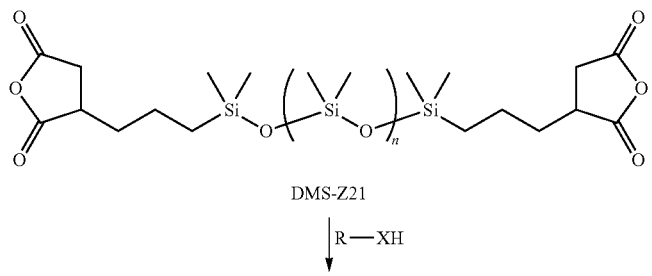

DMS-Z21

↓ R—XH

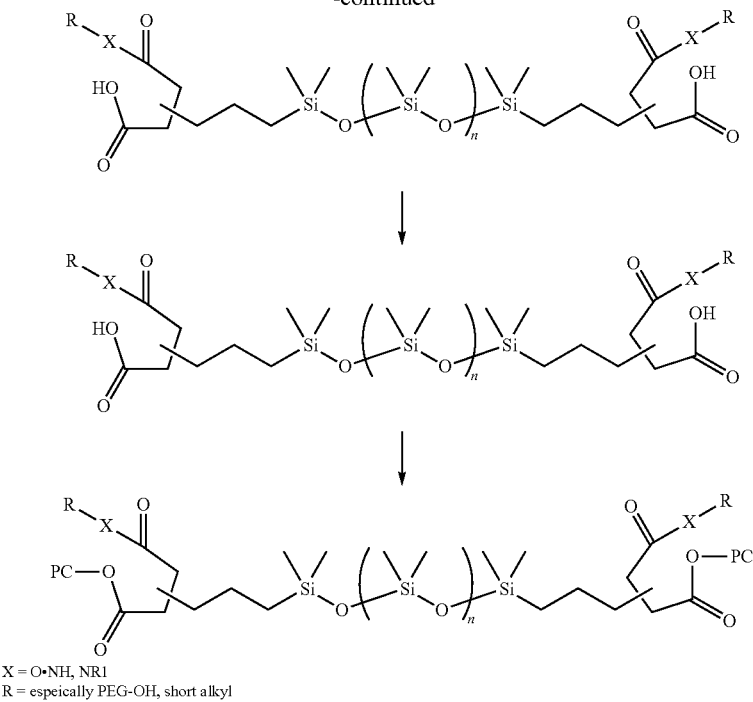

X = O•NH, NR1
R = espeically PEG-OH, short alkyl

The compounds of the invention wherein $PC^1$ and $PC^2$ are the same or similar may be used to provide a fade speed of the photochromic which is quicker without changing its colour when compared with the parent photochromic from which it is derived. Thus it allows the tuning of fade speed for different coloured dyes. This is important to get a consistent colour when fading occurs. Thus, if a blue dye of a particular speed is needed, modification can be made to include a siloxane oligomer of an appropriate length. Alternatively by including different dyes, for example one at each end of the siloxane chain a distinct photochromic change may be induced from the covalent attachment of distinct photochromic moieties.

We have found that the compounds of the invention are a more efficient use of siloxane oligomer. For a given molecular weight of PDMS the compounds of the invention have at least double the amount of photochromic dye as compared to earlier compounds with a single dye on only one end of a PDMS oligomer.

Compounds of the inventions show less phase separation than those of the prior art. In particular, less siloxane per dye molecule is required to achieve equal and sometimes better switching speeds than previous technology. This gives greater solubility of the compounds of the invention and higher loadings. This is particularly advantageous in coatings where loading have to be much higher as the photoactive layer is relatively thin.

In one embodiment the photochromic is incorporated into a polymer resin or polymer resin precursor. The photochromic polymer may be incorporated into a polymer matrix under a range of curing conditions which will be readily appreciated by those skilled in the art having regard to the compositions disclosed above. Typical curing conditions may involve the use of suitable catalysts and or sensitisers. Examples of curing conditions include thermal curing and photopolymerisation. Monomer compositions of the present invention may be applied to a substrate to be rendered photochromic by coating (and subsequent curing) or the compositions may be shaped, for example by casting before thermal or radiation curing. Solvents or carriers may be used to facilitate application of the monomer composition as a coating. Typically the VOC (volatile organic solvent component) will comprise from 0 to 50% by weight of the composition.

The polymerisable composition according to the present invention may include a polymerisation curing agent.

The polymerisation curing agent may be selected from one or more of a UV curable (photo) initiator, radical heat cationic or radical initiator. UV photoinitiation and thermal initiation are preferred. The compositions may be cured by a combination of UV radiation and heat.

The amount of curing agent may vary with the monomers selected. It has been possible to operate with a relatively low level of curing agent of between approximately 0.05 and 4%, preferably 0.05% to 3.0% by weight.

Suitable curing agents may be selected from the group consisting of azodiisobutyronitrile, AIBN (azo radical heat initiator), 2,2'-azobis(N,N'-dimethyleneisobutyramidine)dihydrochloride, 2,2'-azobis(2-amidinopropane)-dihydrochloride, 2,2'-azobis(N,N'-dimethyleneisobutyramidine), 4,4'-azobis(4-cyanopentanoic acid), 2,2'-azobis{2-methyl-N-[1,1-bis(hydroxymethyl)-2-hydroxyethyl]propionamide}, 2,2'-azobis{2-methyl-N-[1,1-bis(hydroxymethyl)-ethyl] propionamide}, 2,2'-azobis[2-methyl-N-(2-hydroxyethyl) propionamide], 2,2'-azobis(isobutyramide)dihydrate, 2,2'-azobis(4-methoxy-2,4-dimethylvaleronitrile), 2,2'-azobis(2,4-dimethylvaleronitrile), 2,2'-azobisisobutyronitrile, dimethyl 2,2'-azobis-isobutyrate, 2,2'-azobis(2-methyl-butyronitrile), 1,1'-azobis(1-cyclohexanecarbonitrile), 2-(carbamoylazo)-isobutyronitrile, 2,2'-azobis(2,4,4-trimethylpentane), 2-phenylazo-2,4-dimethyl-4-methoxyvaleronitrile, 2,2'-azobis(2-methylpropane), Trigonox TX-29 (dialkyl peroxide radical heat initiator), 1,1-di-(-butyl peroxy-3,3,5-trimethyl cyclohexane), TBPEH (alkyl perester radical heat initiator), t-butyl per-2-ethylhexanoate (diacyl peroxide radical heat initiator), benzoyl peroxide, (peroxy dicarbonate radical heat initiator), ethyl hexyl percarbonate (ketone peroxide radical heat initiator), methyl ethyl ketone peroxide, "Cyracure UV1-6974" (cationic photoinitiator), triaryl sulfonium hexafluoroantimonate, Lucirin TPO (radical photoinitiator), 2,4,6-trimethylbenzoyidiphenylphosphine oxide, Irgacure 819, bis(2,4,6-trimethylbenzoyl)-phenyl-phosphine oxide, 1-bis(2,6-dimethoxybenzoyl)-2,4,4-trimethylpentyl phosphineoxide, Vicure 55 (radical photoinitiator), methyl phenylglycoxylate, bis(t-butylperoxide)-diisopropylbenzene, t-butyl perbenzoate, t-butyl peroxy neodecanoate, Amicure DBU, Amicure BDMA, DABCO, polycat SA-1, polycat SA-102, polycat SA-610/50, aluminium acetyl acetonate, dibutyltin dilaurate, dibutyltin oxide, Darocur 1173, Irgacure 184, Irgacure 500, Irgacure 1800 and Irgacure 1850.

The initiator may be a single component or combination of initiator components.

Other additives may be present which are conventionally used in coating compositions such as inhibitors, surfactants, UV absorbers, stabilisers and materials capable of modifying refractive index. Such additives may be selected from the group consisting of levelling agents including 3M FC 430 and 3M FC 431.

Examples of surfactants include, fluorinated surfactants or polydimethyl siloxane surfactants such as FC430, FC431 made by 3M, BYK300, BYK371 made by Mallinckrodt, SF-1066, SF-1141 and SF-1188 made by General Electric Company, L-540, L-538 sold by Union Carbide and DC-190 sold by Dow Corning.

Examples of UV absorbers include Ciba Tinuvin P-2(2'-hydroxy-5' methyl phenyl)benzotriazole, Cyanamid Cyasorb UV 531-2-hydroxy-4-n-octoxybenzophenone, Cyanamid Cyasorb UV5411-2(2-hydroxy-5-t-octylphenyl)-benzotriazole, Cyanamid UV 2098-2 hydroxy-4-(2-acryloyloxyethoxy) benzophenone, National Starch and Chemicals Permasorb MA-2 hydroxy-4-(2 hydroxy-3-methacryloxy)propoxy benzophenone, Cyanamid UV24-2,2'-dihydroxy-4-methoxy-benzophenone, BASF UVINUL 400-2,4 dihydroxy-benzophenone, BASF UVINUL D-49-2,2'-dihydroxy-4,4' dimethoxy-benzophenone, BASF UVINUL D-50-2,2', 4,4'tetrahydroxy benzophenone, BASF UVINUL D-35-ethyl-2-cyano-3,3-diphenyl acrylate, BASF UVINUL N-539-2-ethylhexyl-2-cyano-3,3-diphenyl acrylate, Ciba Geigy Tinuvin 213;

Examples of stabilisers include hydroquinone, coating Solution Stabilizers, nitroso compounds such as Q1301 and Q1300 from Wako Hindered Amine Light Stabilisers (HALS), Including, Ciba Tinuvin765/292bis(1,2,2,6,6)pentamethyl-4-piperidyl)sebacate, Ciba Tinuvin 770-bis(2,2,6, 6-tetramethyl-4-piperidinyl)-sebacate.

Examples of antioxidants include Ciba Irganox 245-triethylene glycol-bis-3-(3-tertbutyl-4-hydroxy-5-methyl phenyl) propionate, Irganox 1010-2,2-bis[[3-[3,4-bis(1,1-dimethylethyl)-4-hydroxyphenyl[-1-oxopropoxy]methyl]-1,3-propanediyl 3,5-bis(1,1-dimethyl ethyl)-4-hydroxy benzene propanoate, Irganox 1076-octadecyl 3-(3',5'-di-tert-butyl(-4'-hydroxyphenyl)propionate, hydroquinone, BHT, TBC, MEHQ (4-methoxyphenone), 2-ethoxy-5-(propenyl)phenol, Isoeugenol, 2-allyl phenol, butylated hydroxyanisole;

Examples of anticolouring agents include 10 dihydro-9-oxa-10-phosphaphenanthrene-1-oxide;

Examples of cure modifiers include dodecyl mercaptan, butyl mercaptan, thiophenol;

Examples of nitroso compounds include Q1301 from Wako Nofiner from Nippon Oils and Fats.

Other additives can be present such as viscosity modifiers, and include monomers such as methacrylic acid, vinyl silanes, and other functional monomers. Other monomeric additives may be included to improve processing and/or material properties, these include:

methacrylic acid, maleic anhydride, acrylic acid dye-enhancing, pH-adjusting monomers like Alcolac SIPOMER 2MIM a charge-reducing cationic monomer to render the material more antistatic, example Sipomer Q5-80 or Q9-75.

The composition according to the present invention may be utilised in the preparation of a coated optical article or may be used in casting optical articles.

In a preferred aspect the cured composition exhibits improved scratch resistance when compared with corresponding photochromic articles of comparable fade speed.

The composition of an optical coating may be tailored so that its refractive index substantially matches that of the optical article. The coating may have a thickness in the range of approximately 0.1 to 100 micron (μm).

When the primer coating includes a dye component the primer coating is applied to at least the front (convex) surface of the optical article.

Alternatively, when the primer coating functions to provide improved impact resistance to the optical article, the primer coating preferably has a thickness of approximately 0.7 to 5 micron.

The optical article may be a camera lens, optical lens element, video disc or the like. An optical lens element is preferred.

By the term "optical lens element" we mean all forms of individual refractive optical bodies employed in the ophthalmic arts, including, but not limited to, lenses, lens wafers and semi-finished lens blanks requiring further finishing to a particular patient's prescription. Also included are formers used in the manufacture of progressive glass lenses and moulds for the casting of progressive lenses in polymeric material.

Where the optical article is an optical lens, the optical lenses may be formed from a variety of different lens materials, and particularly from a number of different polymeric plastic resins. Medium to high index lens materials, e.g. those based on acrylic or allylic versions of bisphenols or allyl phthalates and the like are particularly preferred. Other examples of lens materials that may be suitable for use with the invention include other acrylics, other allylics, styrenics, polycarbonates, vinylics, polyesters and the like. Mid to high index lens materials are particularly preferred.

The utilisation of a coating with a mid to high index optical lens is particularly advantageous in improving the impact resistance of the lens. This is particularly so where an anti-reflective (AR) coating is also included. Such AR coatings may otherwise cause a plastic optical lens to exhibit increased brittleness, for example when heat is applied.

A common ophthalmic lens material is diethylene glycol bis(allyl carbonate). One such material is CR39 (PPG Industries).

The optical article may be formed from cross-linkable polymeric casting compositions, for example as described in the Applicants U.S. Pat. No. 4,912,155, U.S. patent application Ser. No. 07/781,392, Australian Patent Applications 50581/93 and 50582/93, and European Patent Specification 453159A2, the entire disclosures of which are incorporated herein by reference.

For example, in Australian Patent Application 81216/87, the entire disclosure of which is incorporated herein by reference, the Applicant describes a cross-linkable casting composition including at least polyoxyalkylene glycol diacrylate or dimethacrylate and at least one poly functional unsaturated cross-linking agent.

Further, in Australian Patent Application 75160/91, the entire disclosure of which is incorporated herein by reference, describes a polyoxyalkylene glycol diacrylate or dimethacrylate; a monomer including a recurring unit derived from at least one radical-polymerisable bisphenol monomer capable of forming a homopolymer having a high refractive index of more than 1.55; and a urethane monomer having 2 to 6 terminal groups selected from a group comprising acrylic and methacrylic groups.

The polymeric photochromic may be incorporated in the polymer matrix in the process of the present invention by being mixed with a polymerisable monomeric composition that, upon curing produces a solid polymeric composition of Tg typically above 30° C. preferably at least 50° C., still more preferably at least 70° C. and most preferably at least 80° C. The polymerisable composition can be cast as a film, sheet or lens, or injection moulded or otherwise formed into a sheet or lens. Preferably the article will be optically transparent;

(a) The photochromic polymer composition may also be applied to the surface of a material by any convenient manner, such as spraying, brushing, spin-coating or dip-coating from a solution or dispersion of the photochromic material in the presence of a polymeric binder. For example the polymerizable composition (which may be) partly cured) can be dissolved or dispersed in a solvent which can be applied to the surface of a substrate in the form of a permanent adherent film or coating by any suitable technique such as spraying, brushing, spin-coating or dip-coating;

(b) The photochromic polymer composition can be cast or coated onto a substrate by the above mentioned methods and placed within a host material as a discrete layer intermediate to adjacent layers of a host material(s);

(c) The photochromic polymer composition of the invention may be incorporated into a composition by ball milling with a carrier to disperse it in a reactive binder matrix. Such a composition may be used as an ink in ink jet printing and suitable (PC) moieties may be chosen to allow security markings on documents to be visible in exposure to UV light used in photocopy;

(d) The photochromic polymer may be compounded with suitable resins and the resin polymerized with the dye monomer before, during or after being injection moulded to shape it to form a film, for example by blow moulding or to form more complex shaped extruded and/or blown structures.

Examples of host matrix into which the photochromic polymer may be incorporated include homopolymers and copolymers of polyol(allyl carbonate) monomers, homopolymers and copolymers of polyfunctional acrylate monomers, polyacrylates, poly(alkylacrylates) such as poly(methylmethacrylate), cellulose acetate, cellulose triacetate, cellulose acetate propionate, cellulose acetate butyrate, poly(vinyl acetate), poly(vinylalcohol), poly(vinylchloride), poly(vinylidene chloride), polyurethanes, polycarbonates, poly(ethylene-terephthalate), polystyrene, copoly(styrene-methylmethacrylate), copoly(styrene-acrylateonitrile), poly(vinylbutyral), and homopolymers and copolymers of diacylidene pentaerythritol, particularly copolymers with polyol(allylcarbonate) monomers, e.g. diethylene glycol bis(allyl carbonate), and acrylate monomers. Transparent copolymers and blends of the transparent polymers are also suitable as host materials.

The resulting matrix material may be an optically clear polymerized organic material prepared from a polycarbonate resin, such as the carbonate-linked resin derived from bisphenol A and phosgene which is sold under the trademark LEXAN; a poly(methylmethacrylate), such as the material sold under the trademark PLEXIGLAS; polymerizates of a polyol(allyl carbonate), especially diethylene glycol bis(allyl carbonate), which is sold under the trademark CR-39, and its copolymers such as copolymers with vinyl acetate, eg copolymers of from about 80-90 percent diethylene glycol bis(allyl carbonate) and 10-20 percent vinyl acetate, particularly 80-85 percent of the bis(allyl carbonate) and 15-20 percent vinyl acetate, cellulose acetate, cellulose propionate, cellulose butyrate, polystyrene and copolymers of styrene with methyl methacrylate, vinyl acetate and acrylonitrile, and cellulose acetate butyrate.

Polyol (allyl carbonate) monomers which can be polymerised to form a transparent host material are the allyl carbonates of linear or branched aliphatic glycol bis(allyl carbonate) compounds, or alkylidene bisphenol bis(allyl carbonate) compounds. These monomers can be described as unsaturated polycarbonates of polyols, eg glycols. The monomers can be prepared by procedures well known in the art, e.g., U.S. Pat. Nos. 2,370,567 and 2,403,113. The polyol (allyl carbonate) monomers can be represented by the graphic formula:

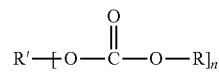

wherein R is the radical derived from an unsaturated alcohol and is commonly an allyl or substituted allyl group, R' is the radical derived from the polyol, and n is a whole number from 2-5, preferably 2. The allyl group (R) can be substituted at the 2 position with a halogen, most notably chlorine or bromine, or an alkyl group containing from 1 to 4 carbon atoms, generally a methyl or ethyl group. The R group can be represented by the graphic formula:

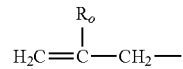

wherein $R_o$ is hydrogen, halogen, or a $C_1$-$C_4$ alkyl group. Specific examples of R include the groups: allyl 2-chloroalyl, 2-bromoalyl, 2-fluoroalyl, 2-methylalyl, 2-ethylalyl, 2-isopropylalyl, 2-n-propylalyl, and 2-n-butylalyl. Most commonly R is the alyl group:

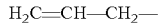

R' is the polyvalent radical derived from the polyol, which can be an aliphatic or aromatic polyol that contains 2, 3, 4 or 5 hydroxy groups. Typically, the polyol contains 2 hydroxy groups, ie a glycol or bisphenol. The aliphatic polyol can be linear or branched and contain from 2 to 10 carbon atoms. Commonly, the aliphatic polyol is an alkylene glycol having from 2 to 4 carbon atoms or a poly($C_2$-$C_4$) alkylene glycol, ie ethylene glycol, propylene glycol, trimethylene glycol, tetramethylene glycol, or diethylene glycol, triethylene glycol etc.

In a further embodiment, the invention provides a photochromic article comprising a polymeric organic host material selected from the group consisting of poly(methyl methacrylate), poly(ethylene glycol bismethacrylate), poly(ethoxylated bisphenol A dimethacrylate) thermoplastic polycarbonate, poly(vinyl acetate), polyvinylbutyral, polyurethane, and polymers of members of the group consisting of diethylene glyco bi(allylcarbonate) monomers, diethylene glycol dimethacrylate monomers, ethoxylated phenol bismethylacrylate monomers, diisopropenyl benzene monomers and ethoxylated trimethylol propane triacrylate monomers, and a photochromic polymer covalently tethered to the matrix via a terminal group reactive with the host.

The polymeric matrix material is selected from the group consisting of polyacrylates, polymethacrylates, poly($C_1$-$C_{12}$) alkyl methacrylates, polyoxy(alkylene methacrylates), poly (alkoxylates phenol methacrylates), cellulose acetates, cellulose triacetate, cellulose acetate propionate, cellulose acetate butyrate, poly(vinyl acetate), poly(vinyl alcohol), poly(vinyl chloride) poly(vinylidene chloride), thermoplastic polycarbonates, polyesters, polyurethanes, polythiourethanes, poly (ethylene terephthalate), polystyrene, poly(alpha methylstyrene), copoly(styrene-methylmethacrylate), copoly(styrene-acrylonitrile), polyvinylbutyral and polymers of members of the group consisting of polyol(allyl carbonate) monomers, polyfunctional acrylate monomers, polyfunctional methylacrylate monomers, diethylene glycol dimethacrylate monomers, diisopropenyl benzene monomers, alkoxylated polyhydric alcohol monomers and diallylidene pentaerythritol monomers.

The polymerizable composition of the invention may be in the form of a coating or adhesive and may comprise a binder resin and crosslinker. Binders are primarily responsible for the quality of a paint or lacquer coating. Examples of binders include alkyds, polyesters, amino resins such as melamine formaldehyde, acrylics, epoxies and urethanes. The binder may be thermoplastic or thermosetting in character and max be of molecular weight from 500 to several million. Coating comprising the polymerizable composition of the invention may include a solvent to adjust the viscosity. The viscosity may for example be in the range of from 0.5 to 10 Ps. Pigments and fillers may be used to confer opacity or colour. A coating composition based on the composition of the invention may utilise a range of crosslinking systems such as polyisocyanates for cross linking active hydrogen functional groups such as hydroxy and amine; epoxy/acid; epoxy amine and carbamate melamine. The coating composition may be in two pack form, for example one pack comprising the cross linking agent and another pack comprising a binder, a dye monomer as hereinbefore described and optionally further components such as solvents, pigments, fillers and formulation aids.

The terminal reactive group of the polymerizable composition and the binder component may both comprise groups such as hydroxy, amine, alkylamine, chlorosilane, alkoxy silane epoxy unsaturated, isocyanato and carboxyl for reacting with a monomer component on curing.

In this embodiment one pack comprises the binder component and the other the cross-linker. Typically the binder component will comprise 50 to 90% by weight of the coating composition (more preferably 65 to 90%) and the crosslinker components will comprise from 10 to 50% by weight of the coating composition.

Preferred hydroxyl moieties in the binder component are derived from hydroxy monomers, such as hydroxy alkyl acrylates and (meth)acrylates wherein the alkyl group has the range of 1 to 4 carbon atoms in the alkyl group. Exemplars include hydroxy ethyl (meth)acrylate, hydroxy propyl (meth) acrylate, hydroxy butyl (meth)acrylate or a combination thereof.

The monomer mixture which may be used in preparation of an acrylic binder preferably includes one or more monomers selected from alkyl acrylates and corresponding (meth)acrylates having 1-18 carbon atoms in the alkyl group, such as methyl (meth)acrylate, ethyl (meth)acrylate, propyl (meth) acrylate, isopropyl (meth)acrylate, butyl (meth)acrylate, pentyl (meth)acrylate, hexyl (meth)acrylate, 2-ethyl hexyl (meth)acrylate, nonyl (meth)acrylate, lauryl (meth)acrylate, stearyl (meth)acrylate; cycloaliphatic (meth)acrylates, such as trimethylcyclohexyl (meth)acrylate, and isobutylcyclohexyl (meth)acrylate; aryl (meth)acrylates, such as benzyl (meth)acrylate; isobornyl (meth)acrylate; cyclohexyl (meth) acrylate; glycidyl (meth)acrylate; ethyl hexyl (meth)acrylate, benzyl (meth)acrylate or a combination thereof. Methacrylates of methyl, butyl, n-butyl, and isobornyl are preferred. Other monomers such as styrene, alkyl styrene, vinyl toluene and acrylonitrile may be used in addition.

Amine moieties where directed may be provided by alkyl amino alkyl (meth)acrylates such as tert-butylaminoethyl methacrylate.

The crosslinking component of the coating composition of the present invention preferably includes one or more crosslinking agents having at least two isocyanate groups, such as a polyisocyanate crosslinking agent. Any of the conventional aromatic, aliphatic, cycloaliphatic, isocyanates, trifunctional isocyanates and isocyanate functional adducts of a polyol and a diisocyanate can be used. Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis(4-isocyanatocyclohexyl)-methane and 4,4-diisocyanatodiphenyl ether. Prepolymerised forms of these isocyanates are also commonly used to reduce potential exposure hazard of volatile form.

The photochromic article may comprise a polymeric organic material which is a homopolymer or copolymer of monomer(s) selected from the group consisting of acrylates, methacrylates, methyl methacrylate, ethylene glycol bis methacrylate, ethoxylated bisphenol A dimethacrylate, vinyl acetate, vinylbutyral, urethane, thiourethane, diethylene glycol bis(allyl carbonate), diethylene glycol dimethacrylate, diisopropenyl benzene, and ethoxylated trimethyl propane triacrylates.

The photochromic composition of the invention may contain the photochromic compound in a wide range of concentrations depending on the type of photochromic moiety and its intended application. For example in the case of inks in which high colour intensity is required a relatively high concentration of up to 30 wt % photochromic may be required. On the other hand it may be desirable in some cases such as optical articles to use photochromics in very low concentrations to provide a relatively slight change in optical transparency on irradiation. For example, as low as 0.01 mg/g of matrix may be used. Generally the photochromic resin will be present in an amount of from 0.01 mg/g of matrix up to 30 wt % of host matrix. More preferably the photochromic compound will be present in an amount of from 0.01 mg/g to 100 mg/g of host matrix and still more preferably from 0.05 mg/g to 100 mg/g of host matrix.

The photochromic article may contain the photochromic compound in an amount of from 0.01 to 10.0 milligram per square centimeter of polymeric organic host material surface to which the photochromic substance(s) is incorporated or applied.

The dye monomers and polymerizable compositions of the invention may be used in those applications in which the organic photochromic substances may be employed, such as optical lenses, e.g., vision correcting ophthalmic lenses and plano lenses, face shields, goggles, visors, camera lenses, windows, automotive windshields, aircraft and automotive transparencies, e.g., T-roofs, sidelights and backlights, plastic films and sheets, textiles and coatings, e.g. coating compositions. The dye monomers and photochromic compositions may also be used as a means of light activated date storage. As used herein, coating compositions include polymeric coating composition prepared from materials such as polyurethanes, epoxy resins and other resins used to produce synthetic polymers; paints, i.e., a pigmented liquid or paste used for the decoration, protection and/or the identification of a substrate; and inks, i.e., a pigmented liquid or paste used for writing and printing on substrates, which include paper, glass, ceramics, wood, masonry, textiles, metals and polymeric organic materials. Coating compositions may be used to produce verification marks on security documents, e.g. documents such as banknotes, passport and driver' licenses, for which authentication or verification of authenticity may be desired.

Compounds of the invention show a large increase in compatibility in the host matrix over those compounds that consist of a single photochromic dye on a poly(dimethylsiloxane) oligomer. For a given length of oligomer it was found that a compound of this invention has essentially similar switching speeds of colouration and decolouration (as determined by t1/2 and t3/4 measurements) to those earlier disclosed compounds of a single dye on one end of a poly(dimethylsiloxane). This is shown in FIGS. 1, 2, 5, 6, 9, 10, 13, and 14. This means that the amount of siloxane required to achieve a desired switching speed is halved in a compound of the invention. This is clearly illustrated in FIGS. 3, 4, 7, 8, 11, 12, 15, and 16 where the number of dimethylsiloxane repeat units per dye is used as the x axis. This represents a significant reduction in siloxane content with minimal if any effect on switching performance. This has much greater commercial utility as there is a much larger range of di-end functional poly(dimethylsiloxane)s available than there are mono-end-functionalised poly(dimethylsiloxane)$_s$. In addition di-end-functional materials are significantly cheaper and available in larger quantities.

This reduction in siloxane per dye molecule in the compounds of the invention has an obvious effect on compatibility of the compounds in a polymer matrix. Siloxanes have a strong tendency to phase separate in most polymers. This is an undesirable effect as it will most certainly result in haze in the lens which is unsuitable for optical applications. Compounds of this invention show superior compatibility with matrices as the siloxane content is greatly reduced and the dyes at the termini of the siloxane help compatibilize the compounds in the host matrix. This is clearly illustrated in examples 14 and 15 which show the comparison between a single end-functional photochromic-PDMS (polydimethylsiloxane) conjugate and the equivalent dye in the form of compounds of this invention (a dye at both ends of a PDMS). FIG. 17 shows the hazy gross phase separation on the mono-functionalised dye-PDMS conjugate (10 F1) and the compound of invention 4 F1 which is clear. The molar quantity of dye in each lens is the same. This is further evidenced in table 10 that lists the haze measure and transmission of light through a blank lens, and lens containing a compound of the invention (di-end-functionalized PDMS) (4 F1, haze 7.52, transmittance 62.9%: 1H, haze 4.09, transmittance 78.4%) and mono-end-functionalized dye-PDMS conjugate (10 F1, haze 43.5, transmittance 33.5%: CE2 (high molecular weight fraction) haze 10.3, transmittance 73.0%).

This extra compatibility of the di-end-functional dye-PDMS conjugates of the invention would be of particular use in coatings where dye concentrations would be relatively high and thus phase separation may be more of an issue as compared to applications where dyes are more evenly distributed in the lens either by imbibation or cast-in methods.

The photochromic polymers are particularly suited to use in combination with other photochromic compounds for the purpose of more closely matching the fade speed of photochromics. In photochromic compositions comprising a polymeric host matrix, particularly when the matrix is a hard and rigid matrix such as a spectacle lens, the variation in the rate of fade between different photochromics can be significant. This often leads to an unattractive colour variation during light induced colouration and fade.

The photochromic polymer allows the fade speed of photochromics to be independently tuned or for the fade speed of one or more photochromics to be enhanced to more closely correspond with the fade speed of one or more other photochromics in a polymeric host.

The invention thus further provides a photochromic composition comprising a polymeric host material, preferably a rigid polymeric host, and a plurality of photochromic compounds of differing colour including at least one photochromic of formula II as hereinbefore described wherein (PC$^1$) and (PC$^2$) are the same and wherein the rate of fade of PC$^1$ and PC$^2$ more closely matches at least one other photochromic as a result of the group

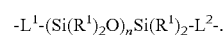

$-L^1-(Si(R^1)_2O)_nSi(R^1)_2-L^2-$.

The influence of the group can be determined by comparing the compound of formula I with a photochromic PC$^1$ compound from which the compound of formula II is derived in the same matrix.

The siloxane polymers from which the photochromic polymers of formula II are prepared generally comprise a range of molecular weights as a result of the statistical molecular weight distribution which is provided by the ionic method of polymerisation. We have found that the compounds of formula II of distinct molecular weights may be prepared by fractionation using standard chromatographic methods. Fractionation of the compound of formula II into different molecular weight ranges allows the fade speed of the photochromic moiety (PC) to be tailored for specific compositions to match other photochromics. Application of the fractionation technique has shown that selection of short oligomer lengths will give slower switching speeds and longer oligomer lengths will give faster switching speeds. In all cases, a dye with any siloxane length will switch faster than the same dye without a siloxane oligomer. Thus fractionation allows tuneability of fast switching dyes with small oligomers.

It should be appreciated that the fractionation process may occur at any point in the synthesis. The starting siloxane may be fractionated prior to any reaction with the photochromic moiety or alternatively fractionation can be performed after reaction with the photochromic moiety attached. Both methods have advantages. Fractionation prior to the addition of photochromic dye results in more efficient use of the dye component as none is lost in unused fractions. However addition of the dye makes visual monitoring of the fractionation process extremely simple. The preferred method will be determined by the economics of each method prevailing at the time of manufacture.

In one aspect the invention thus provides a process for tuning the switching speed of a photochromic group comprising providing a polysiloxane polymer and reacting the polysiloxane polymer with a photochromic compound to provide a photochromic polymer and wherein the process comprises separating the polysiloxane polymer, prior to or after reaction with the photochromic, into two or more molecular weight ranges and incorporating a photochromic polymer of a portion of the molecular weight ranges into a host polymer wherein the portion is chosen based on the required extent of increase in switching speed wherein the photochromic polymer of greater molecular weight switches more rapidly. In one set of examples of this embodiment the photochromic polymer comprising a siloxane group may be a photochromic described in our International publication WO 2004/041961 the contents of which are herein incorporated by reference. In one set of embodiments the photochromic polymer is of the type described above.

The photochromic polymer may separated into different polysiloxane polymer molecular weight ranges after reaction of the photochromic compound with the polysiloxane polymer.

The separation into different molecular weight ranges provides ranges of narrower polydispersity (molecular weight distribution) and allows the switching speed of the photochromic polymer to be tailored to meet specific requirements or to match the speed of other photochromic materials which may or may not comprise polysiloxane polymeric groups.

The separation into different molecular weight ranges, which may be referred to as fractionation may carried out by a method selected from the group consisting of column chromatography, high performance liquid chromatography, wiped film distillation, spinning-band distillation, and high performance preparative thin layer chromatography.

The process in one set of embodiments comprises incorporating at least one further photochromic into the host wherein the portion of the molecular weight ranges present in the photochromic polymer incorporated into the host more closely matches the switching speed of at least one of the further photochromics than does a corresponding polysiloxane polymer which has not been subject to the separation of the polysiloxane into different molecular weight ranges.

In yet a further set of embodiments we provide a photochromic composition comprising a polymeric host material and a plurality of photochromic compounds of differing colour whereby the switching speed of the different photochromic compounds has been more closely matched by the presence in at least one photochromic compound of a polysiloxane polymer of molecular weight range separated from a polysiloxane polymer composition by fractionation.

In one set of embodiments there is provided a process for tuning the switching speed of photochromic dyes by the use of narrow polydispersity photochromic dye-polysiloxane polymers of a defined molecular weight wherein the molecular weight is chosen based on the required extent of increase in switching speed wherein the photochromic polymer of greater molecular weight switches more rapidly. The narrow paly dispesity is generally a polydispersity of no more than 1.5 such as less than 1.4, less than 1.3, less than 1.2 or less than 1.1.

The invention will now be described with reference to the following examples. It is to be understood that the examples are provided by way of illustration of the invention and that they are in no way limiting to the scope of the invention.

BRIEF DESCRIPTION OF DRAWINGS

The Examples are described with reference to graphs in the attached drawings pages.

In the drawings.

EXAMPLES

Example 1

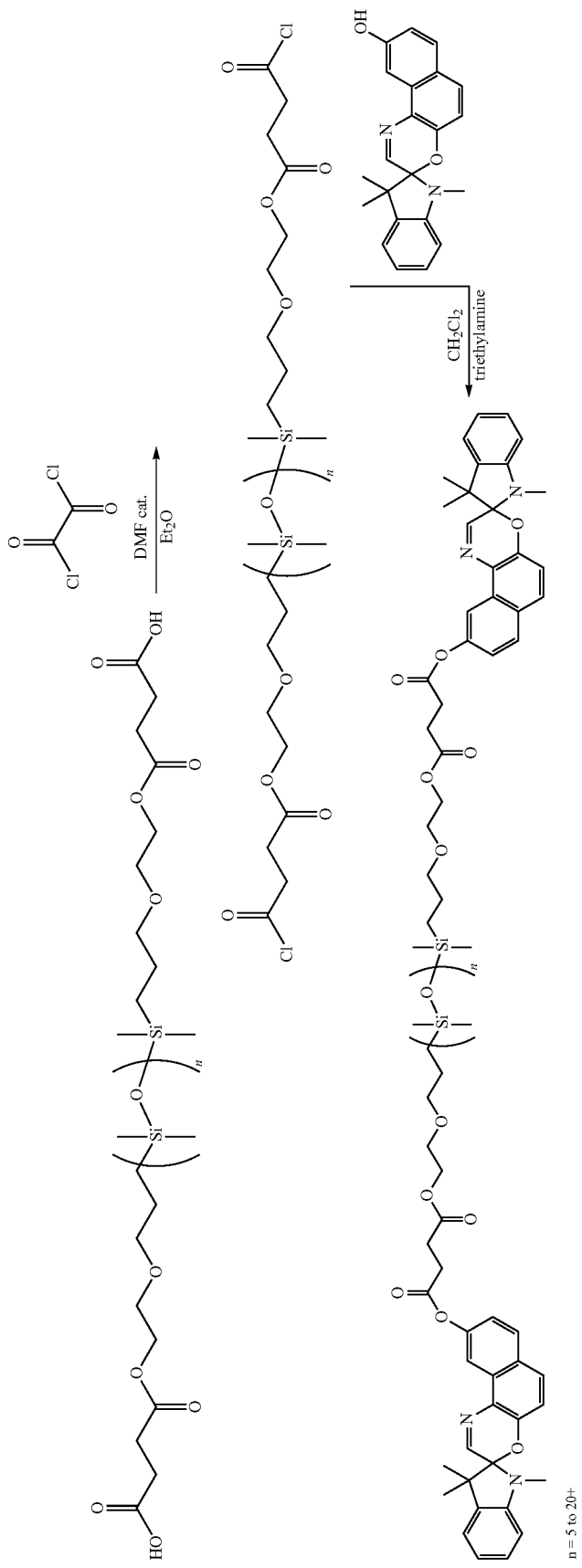

Step 1

Figure 1:
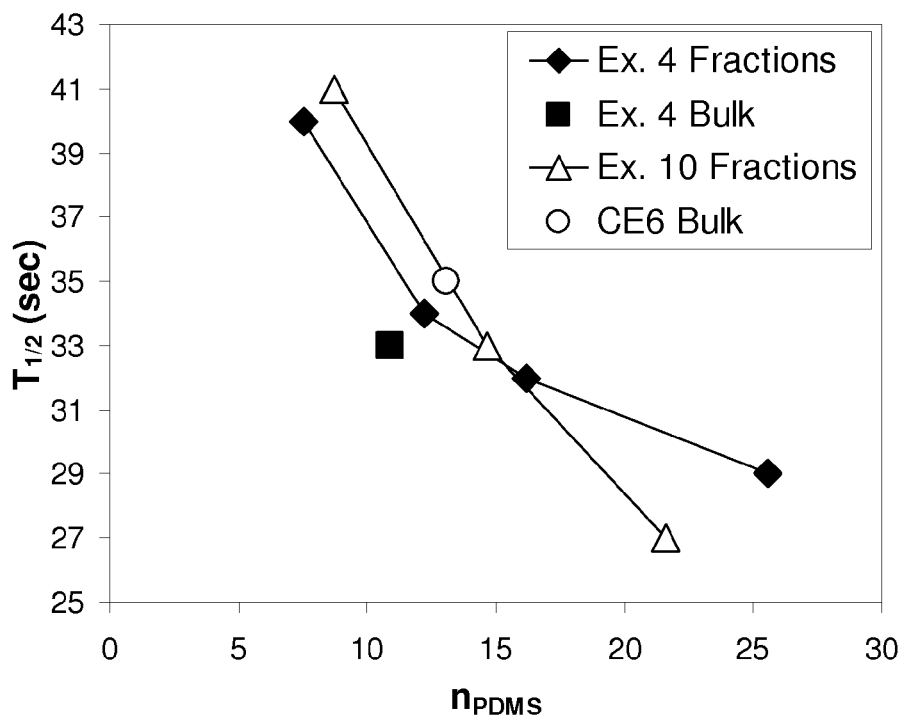
FIG. 1 is a graph comparing the T1/2 (in seconds) fade speed of the photochromics of Examples 4, 10 and Comparative Example 6 having varying numbers of monomer units in the PDMS (polydimethylsiloxane) polymer chain as recorded in Table 4.
Figure 2:
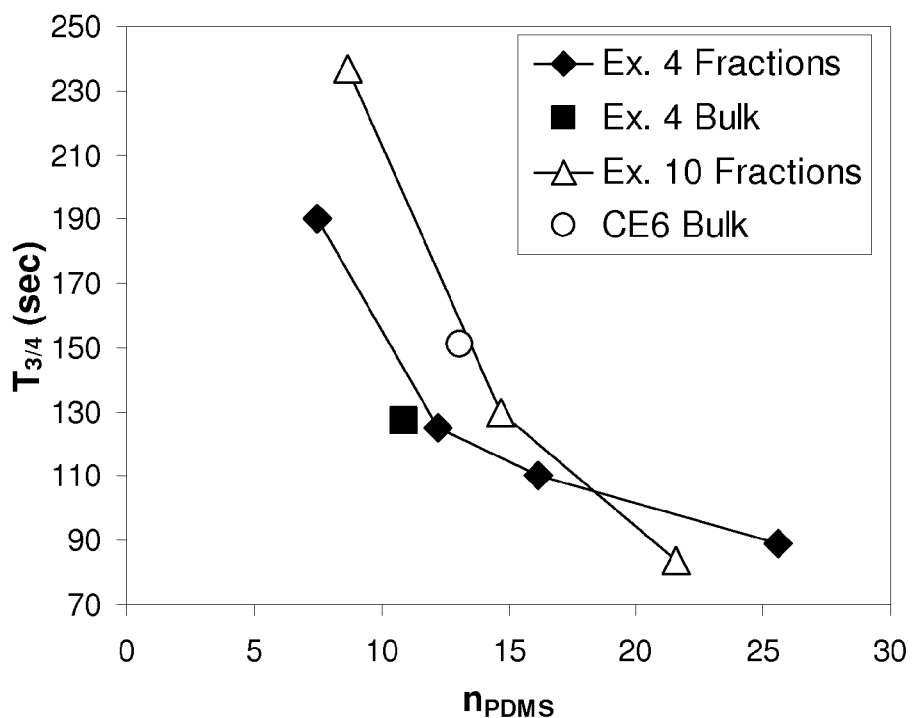
FIG. 2 is a graph comparing the T3/4 (in seconds) fade speed of the photochromics of Examples 4, 10 and Comparative Example 6 having varying numbers of monomer units in the PDMS (polydimethylsiloxane) polymer chain as recorded in Table 4.

Carbinol (Hydroxyl) Terminated Polydimethylsiloxane (Gelest Inc., DMS-C15, molecular weight ca. 1000) (20.0 g) was dissolved in dry dichloromethane (80 ml) and succinic anhydride (3.86 g) then added as a solid. Triethylamine (5.4 ml) was added to the mixture which was then stirred at 35° C., under nitrogen, for 4 hours. Triethylene glycol mono methyl ether (1.1 ml) was added to react with the excess anhydride, the mixture stirred for an additional 1 hour. The solvent was evaporated and the residue taken up in diethyl ether/hexane (1:1) and twice washed with dilute aqueous HCl. The organic layer was dried with $MgSO_4$, filtered through a short column of silica gel, and the solvent evaporated, giving the pure Carboxylic Acid Terminated Polydimethylsiloxane product (23.44 g) as a clear viscous oil. Analysis by $^1H$ NMR gave an average molecular weight ($M_n$) of 1,436. $^1H$ NMR (400 MHz, $CDCl_3$) δ 4.25 (t, 4H), 3.63 (t, 4H), 3.42 (t, 4H), 2.67 (m, 8H), 1.61 (m, 4H), 0.52 (m, 4H), 0.07 (m).

Step 2

The Carboxylic Acid Terminated Polydimethylsiloxane from Step 1 (2.5 g) was dissolved in dry diethyl ether (15 ml) in a Schlenk flask under nitrogen. One small drop of DMF was added followed by oxalyl chloride (0.61 ml) in one portion. The reaction mixture was stirred at room temperature for 30 minutes and then the solvent and excess reagent evaporated in vacuo. The product Acid Chloride Terminated Polydimethylsiloxane was used immediately in the next step without further purification.

Step 3

9'-Hydroxy-1,3,3-trimethylspiro[indoline-2,3'-[3H]naphtha[2,1-b][1,4]oxazine] (Kakishita et al. J. Heterocycl. Chem. 1992, 29, 1709) (0.468 g, 1.36 mmol) was dissolved in anhydrous diethyl ether (15 ml) under nitrogen. To this solution was added triethylamine (0.38 ml) followed by the Acid Chloride Terminated Polydimethylsiloxane (1.0 g) (from Step 2) in one portion. The mixture was stirred at room temperature for 3 hours. The reaction mixture was filtered through a short column of silica gel and the solvent evaporated, giving the pure Spirooxazine Terminated Polydimethylsiloxane product (1.24 g) as a green-yellow tar. Analysis by $^1H$ NMR gave an average molecular weight ($M_n$) of 2,123 ($n_{PDMS}$=13.6). $^1H$ NMR (400 MHz, $d_6$-acetone) δ 8.26 (d, 2H), 7.87 (d, 2H), 7.81 (m, 4H), 7.21-7.13 (m, 6H), 7.03 (d, 2H), 6.87 (t, 2H), 6.65 (d, 2H), 4.25 (t, 4H), 3.65 (t, 4H), 3.44 (t, 4H), 2.99 (t, 4H), 2.81 (t, 4H), 2.77 (s, 6H), 1.62 (4H), 1.34 (d, 12H), 0.60 (m, 4H), 0.13-0.09 (m, $SiCH_3$).

Step 4

Fractionation: The commercially available Carbinol (Hydroxyl) Terminated Polydimethylsiloxane (Gelest Inc., DMS-C15) is a polydisperse mixture of polydimethylsiloxane oligomers having siloxane repeat units ($n_{PDMS}$) ranging from 5 to 20+, as determined by electrospray mass spectroscopy. The material used here was analysed by $^1H$ NMR to determine its average molecular weight, which was found to be 1,246. The photochromic dye-polymer conjugates synthesised from this material are therefore a polydisperse mixture ranging in molecular weights and polarity. Higher molecular weight conjugates, having longer PDMS chains, are less polar than conjugates having shorter PDMS chains. Therefore, subjecting the bulk polydisperse product to column chromatography (silica gel) results in the higher molecular weight conjugates moving faster through the column than conjugates which have shorter chains. This results, typically, in a broad product band on the column. It is therefore possible to fractionate the bulk conjugate material, obtaining fractions which range in their average molecular weight. These fractions obviously have a narrower polydispersity than the original bulk product conjugate material.

The bulk Spirooxazine Terminated Polydimethylsiloxane product from Step 3 was fractionated by column chromatography (silica gel, diethyl ether/hexane, 2:3). The bulk product is visible on the column and elutes as a broad blue coloured band, with high molecular weight components having long polydimethylsiloxane oligomers running first. A front-running fraction of the band was collected, the middle portion eluted further and then the tail-end fraction also collected. Analysis of the front-running (1H) and tail (1L) fractions by $^1H$ NMR gave average molecular weights ($M_n$) of 2,830 ($n_{PDMS}$=23.1) and 1,592 ($n_{PDMS}$=6.4), respectively.

Example 2

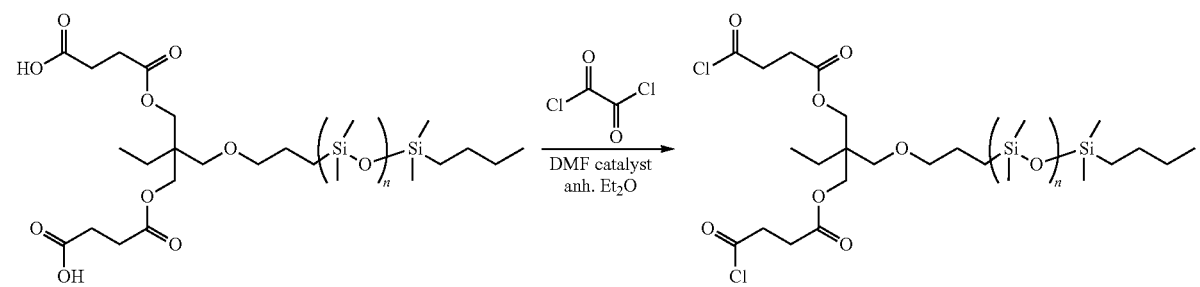

Mn = ca. 1623    Mn = ca. 1660

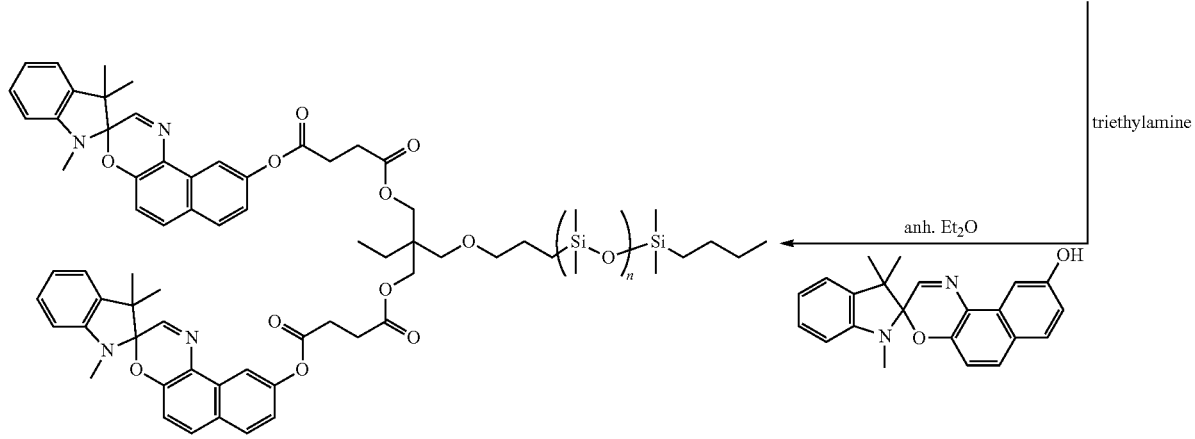

Step 1

Mono Di-Carbinol Terminated Polydimethylsiloxane (Gelest Inc., MCR-C61, molecular weight ca. 1000) (10.0 g) was dissolved in dry dichloromethane (40 ml) and succinic anhydride (1.74 g) then added as a solid. Triethylamine (2.43 ml) was added to the mixture which was then stirred at 35° C., under nitrogen, for 23 hours. The solvent was evaporated and the residue taken up in diethyl ether, washed twice with dilute aqueous HCl and then with slightly acidic (HCl) brine. The organic layer was dried with $MgSO_4$, filtered through a short column of silica gel, and the solvent evaporated, giving the pure Mono Di-Carboxylic Acid Terminated Polydimethylsiloxane product (10.88 g) as a clear viscous oil. Analysis by $^1H$ NMR gave an average molecular weight ($M_n$) of 1,623. $^1H$ NMR (400 MHz, $CDCl_3$) δ 4.03 (m, 4H), 3.32 (t, 2H), 3.27 (s, 2H), 2.64 (m, 8H), 1.55 (m, 2H), 1.45 (m, 2H), 1.31 (m, 4H), 0.87 (m, 6H), 0.52 (m, 4H), 0.07-0.04 (m, $SiCH_3$).

Step 2

The Mono Di-Carboxylic Acid Terminated Polydimethylsiloxane from Step 1 (1.20 g) was dissolved in dry diethyl ether (15 ml) in a Schlenk flask under nitrogen. One small drop of DMF was added followed by oxalyl chloride (0.13 ml) in one portion. The reaction mixture was stirred at room temperature for 30 minutes and then the solvent and excess reagent evaporated in vacuo. The product Mono Di-Acid Chloride Terminated Polydimethylsiloxane was used immediately in the next step without further purification.

Step 3

9'-Hydroxy-1,3,3-trimethylspiro[indoline-2,3'-[3H]naphtha[2,1-b][1,4]oxazine] (0.20 g, 0.58 mmol) was dissolved in anhydrous diethyl ether (15 ml) under nitrogen. To this solution was added triethylamine (0.16 ml) followed by the Mono Di-Acid Chloride Terminated Polydimethylsiloxane from Step 2 (1.0 g) in one portion. The mixture was stirred at room temperature for 40 minutes and filtered through a plug of silica gel eluting with diethyl ether. The solvent was evaporated and the residue purified by column chromatography (silica gel, diethyl ether/hexane, 1:1) giving the pure Mono Bis-Spirooxazine Terminated Polydimethylsiloxane product (0.368 g). Analysis by $^1H$ NMR gave an average molecular weight ($M_n$) of 2,227 ($n_{PDMS}$=14.6). $^1H$ NMR (400 MHz, $d_6$-acetone) δ 8.26 (d, 2H), 7.87 (d, 2H), 7.81 (m, 4H), 7.21-7.13 (m, 6H), 7.03 (d, 2H), 6.87 (t, 2H), 6.65 (d, 2H), 4.15 (m, 4H), 3.41 (s, 2H), 3.37 (t, 2H), 2.97 (t, 4H), 2.80 (t, 4H), 1.57 (m, 4H), 1.33 (m, 18H), 0.91 (m, 6H), 0.58 (m, 4H), 0.12-0.08 (m, $SiCH_3$).

Example 3

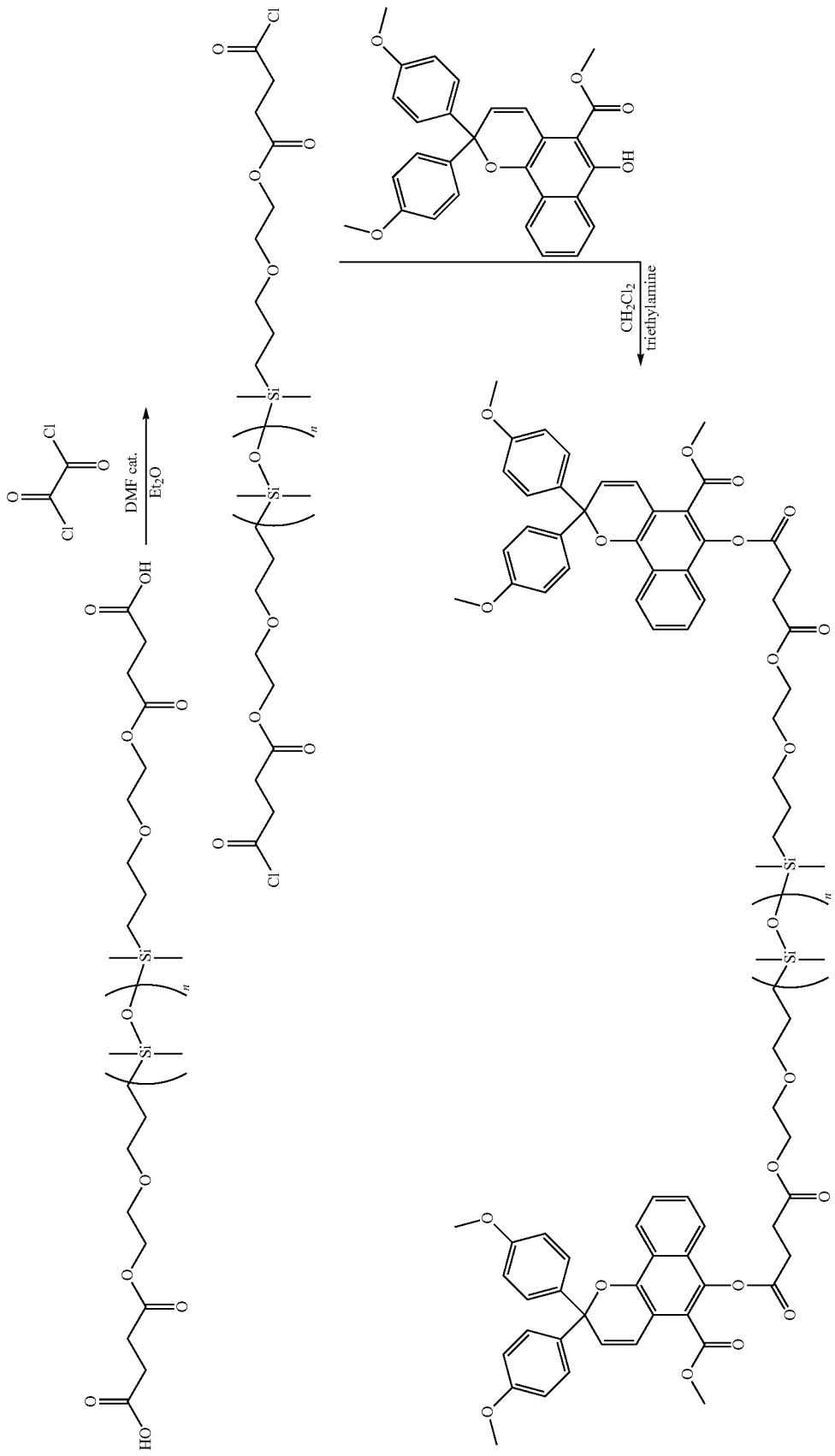

Step 1

2,2-Bis(4-methoxyphenyl)-5-(methoxycarbonyl)-6-hydroxy-[2H]-naphtho[1,2-b]pyran (U.S. Pat. No. 5,458,814) (0.225 g, 0.48 mmol) was dissolved in anhydrous THF (25 ml) under nitrogen. To this solution was added triethylamine (0.13 ml) followed by the Acid Chloride Terminated Poly-

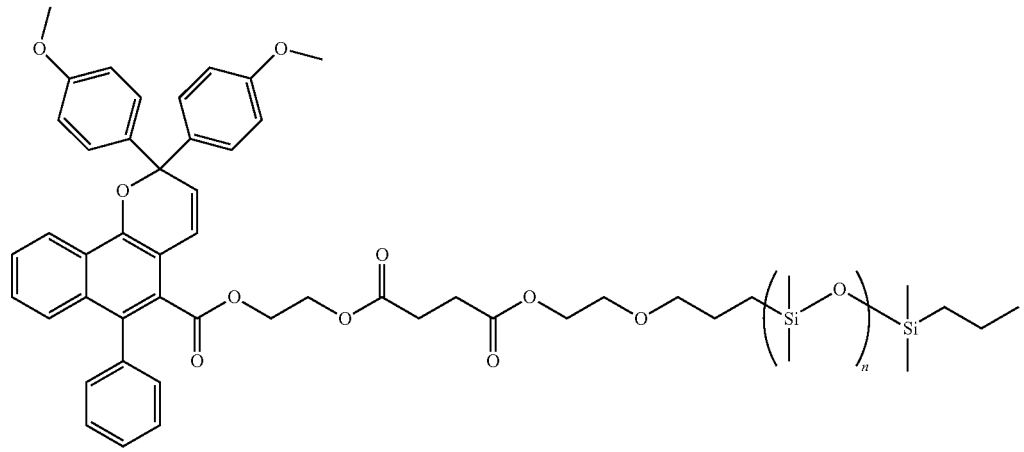

dimethylsiloxane (Example 1, Step 2) (0.358 g), dropwise. The mixture was stirred at room temperature for 2 hours. The reaction mixture was filtered through a short plug of silica gel and the solvent evaporated. The crude product (0.53 g) was then purified by column chromatography (silica gel, diethyl ether/hexane, 2:3→2:1) giving the bulk product, Naphthopyran Terminated Polydimethylsiloxane, as a viscous red oil. Analysis by $^1$H NMR gave an average molecular weight ($M_n$) of 2,297 ($n_{PDMS}$=12.6). $^1$H NMR (200 MHz, $d_6$-acetone) δ 8.40 (m, 2H), 7.95 (m, 2H), 7.63 (m, 4H), 7.45 (m, 8H), 6.97 (d, 2H), 6.88 (m, 8H), 6.41 (d, 2H), 4.23 (t, 4H), 3.95 (s, 6H), 3.75 (s, 12H), 3.62 (t, 4H), 3.41 (t, 4H), 3.04 (m, 4H), 2.80 (m, 4H), 1.60 (m, 4H), 0.58 (m, 4H), 0.13-0.08 (m, SiCH$_3$).

Step 2

The bulk Naphthopyran Terminated Polydimethylsiloxane product from Step 1 was then fractionated by column chromatography (silica gel, diethyl ether/hexane, 2:3→2:1). The bulk product is visible on the column and elutes as a broad red coloured band, with high molecular weight components having long polydimethylsiloxane oligomers running first. A front-running fraction of the band was collected, the middle portion eluted further and then a tail fraction also collected. Analysis of the front-running (3H) and tail (3L) fractions by $^1$H NMR gave average molecular weights ($M_n$) of 3,272 ($n_{PDMS}$=25.7) and 1,870 ($n_{PDMS}$=6.8), respectively.

Example 4

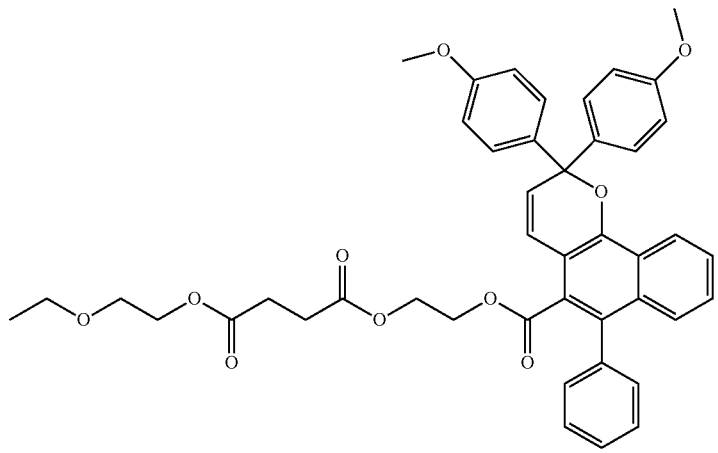

Step 1

2,2-Bis(4-methoxyphenyl)-5-(2-hydroxyethoxycarbonyl)-6-phenyl-[2H]-naphtho[1,2-b]pyran (U.S. Pat. No. 6,113,814) (0.20 g, 0.34 mmol) was dissolved in anhydrous diethyl ether (20 ml) under nitrogen. To this solution was added triethylamine (0.2 ml) followed by the Acid Chloride Terminated Polydimethylsiloxane (Example 1, Step 2) (0.264 g), dropwise. The mixture was stirred at room temperature for 1 hour. The solvent was evaporated and the crude product then purified by column chromatography (silica gel, diethyl ether/hexane, 5:1) giving the bulk product, Naphthopyran Terminated Polydimethylsiloxane, as a pink tar. Analysis by $^1$H NMR gave a spectrum consistent with the structure, having an average molecular weight ($M_n$) of 2,592 ($n_{PDMS}$=14.1).

Step 2

The bulk Naphthopyran Terminated Polydimethylsiloxane product from Step 1 was then fractionated by column chromatography (silica gel, diethyl ether/hexane, 2:1). The bulk product is visible on the column and elutes as a broad pink coloured band, with high molecular weight components having long polydimethylsiloxane chains running first. Four fractions were collected and analysed by $^1$H NMR to determine their average molecular weights ($M_n$) and average siloxane repeat units ($n_{PDMS}$).

Example 4, Fraction 1 (4 F1): $M_n$=3,443 ($n_{PDMS}$=25.6)
Example 4, Fraction 2 (4 F2): $M_n$=2,749 ($n_{PDMS}$=16.2)
Example 4, Fraction 3 (4 F3): $M_n$=2,447 ($n_{PDMS}$=12.2)
Example 4, Fraction 4 (4 F4): $M_n$=2,100 ($n_{PDMS}$=7.5)

Example 5

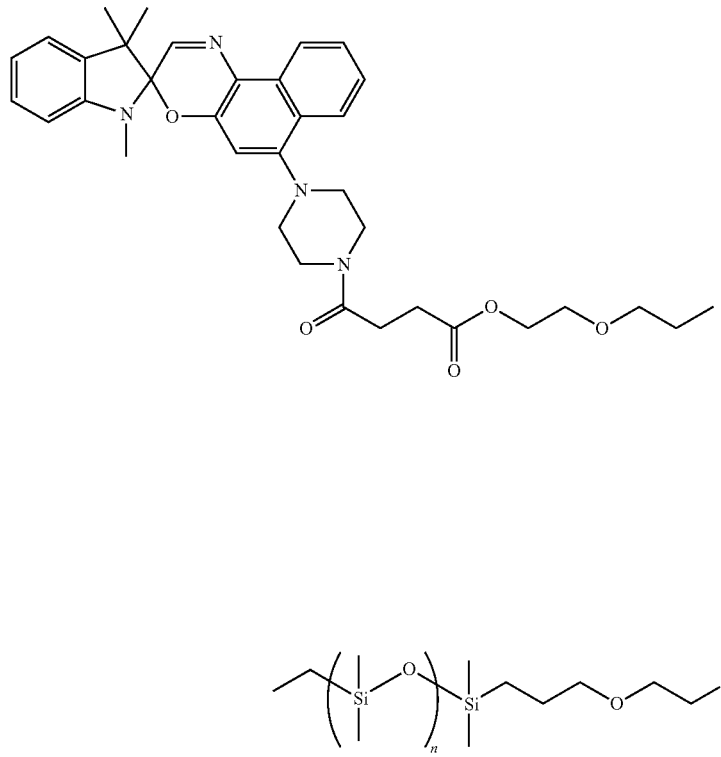

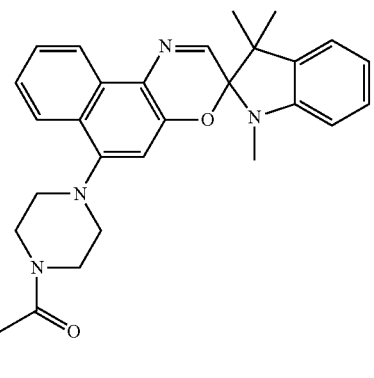

Step 1

6'-piperazine-1,3,3-trimethylspiro[indoline-2,3'-[3H] naphtho[2,1-b][1,4]-oxazine] (Yuan et al., Adv. Mater. 2005, 17, 156-160) (0.25 g, 0.61 mmol) was dissolved in anhydrous diethyl ether (ca. 20 ml), under nitrogen, with triethylamine (0.25 ml). The Acid Chloride Terminated Polydimethylsiloxane (Example 1, Step 2) (0.446 g) was then added dropwise and the mixture stirred at room temperature for 1 hour. The whole reaction mixture was passed through a plug of silica gel, eluting with diethyl ether and finally ethyl acetate. The solvent was evaporated to give the pure bulk Spirooxazine Terminated Polydimethylsiloxane product. Analysis by $^1$H NMR gave a spectrum consistent with the structure, having an average molecular weight ($M_n$) of 2,286 ($n_{PDMS}$=13.9).

Step 2

The bulk Spirooxazine Terminated Polydimethylsiloxane product from Step 1 was then fractionated by column chromatography (silica gel, diethyl ether/hexane, 4:1). The bulk product is visible on the column and elutes as a broad purple coloured band, with high molecular weight components having long polydimethylsiloxane chains running first. Three fractions were collected and analysed by $^1$H NMR to determine their average molecular weights ($M_n$) and average siloxane repeat units ($n_{PDMS}$).

Example 5, Fraction 1 (5 F1): $M_n$=3,164 ($n_{PDMS}$=25.8)
Example 5, Fraction 2 (5 F2): $M_n$=2,144 ($n_{PDMS}$=12.0)
Example 5, Fraction 3 (5 F3): $M_n$=1,772 ($n_{PDMS}$=7.0)

Example 6

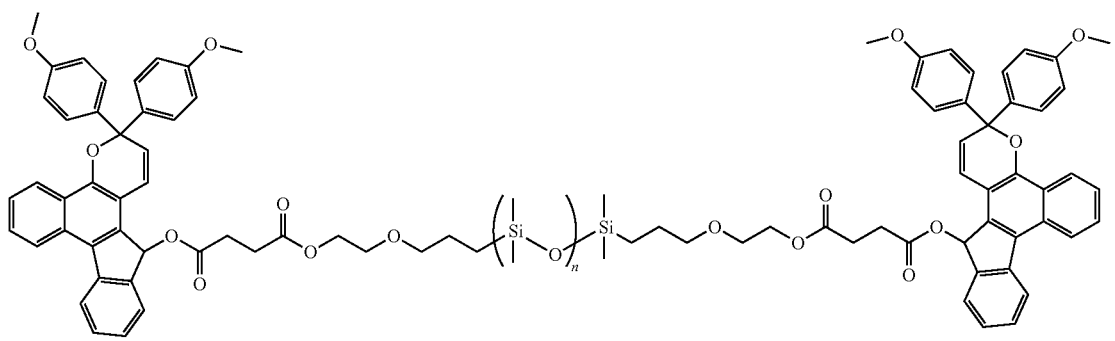

Step 1

3,3-Di(4-methoxyphenyl)-13-hydroxy-3H,13H-indeno[2',3':3,4]naphtho[1,2-b]pyran (US Patent Application, US 2006/0226402) (0.30 g, 0.602 mmol) was dissolved in dry dichloromethane (ca. 15 ml), under nitrogen, with triethylamine (0.25 ml). A solution of Acid Chloride Terminated Polydimethylsiloxane (Example 1, Step 2, $M_n$=1,501) (0.443 g) in dry dichloromethane (1 ml) was then added dropwise and the mixture stirred at room temperature for 2 hours. The whole reaction mixture was passed through a plug of silica gel, eluting with dichloromethane/methanol. The solvent was evaporated to give the pure bulk Indeno-Naphthopyran Terminated Polydimethylsiloxane product. Analysis by $^1$H NMR gave a spectrum consistent with the structure, having an average molecular weight ($M_n$) of 2,417 ($n_{PDMS}$=13.4).

Step 2

The bulk Indeno-Naphthopyran Terminated Polydimethylsiloxane product from Step 1 was then fractionated by column chromatography (silica gel, diethyl ether/petroleum ether, 1:1). The bulk product is visible on the column and elutes as a broad purple coloured band, with high molecular weight components having long polydimethylsiloxane chains running first. Five fractions were collected and analysed by $^1$H NMR to determine their average molecular weights ($M_n$) and average siloxane repeat units ($n_{PDMS}$).

Example 6, Fraction 1 (6 F1): $M_n$=3,236 ($n_{PDMS}$=24.4)
Example 6, Fraction 2 (6 F2): $M_n$=2,465 ($n_{PDMS}$=14.0)
Example 6, Fraction 3 (6 F3): $M_n$=2,269 ($n_{PDMS}$=11.4)
Example 6, Fraction 4 (6 F4): $M_n$=2,101 ($n_{PDMS}$=9.1)
Example 6, Fraction 5 (6 F5): $M_n$=2,048 ($n_{PDMS}$=8.4)

Example 7

Step 2

The bulk Naphthopyran Terminated Polydimethylsiloxane product from Step 1 was then fractionated by column chromatography (silica gel, diethyl ether/hexane, 4:1). The bulk product is visible on the column and elutes as a broad purple coloured band, with high molecular weight components having long polydimethylsiloxane chains running first. Three fractions were collected and analysed by $^1$H NMR to determine their average molecular weights ($M_n$) and average siloxane repeat units ($n_{PDMS}$).

Example 7, Fraction 1 (7 F1): $M_n$=2,908 ($n_{PDMS}$=20.8)
Example 7, Fraction 2 (7 F2): $M_n$=2,293 ($n_{PDMS}$=12.5)
Example 7, Fraction 3 (7 F3): $M_n$=1,996 ($n_{PDMS}$=8.5)

Example 8

The photochromic dye synthesised here (Steps 1-3, below) for use in this example is a conjugatable (having a free hydroxyl group for further reaction) form of a class of spirooxazine photochromic dye disclosed in U.S. Pat. No. 6,303,673.

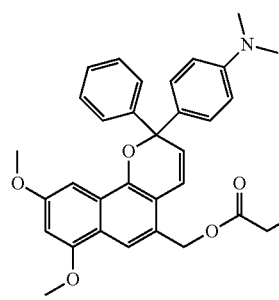
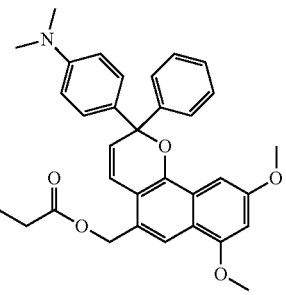

Step 1

2-(4-dimethylaminophenyl)-2-phenyl-5-hydroxymethyl-7,9-methoxy-[2H]-naphtho[1,2-b]pyran (U.S. Pat. No. 6,399,791) (0.20 g, 0.34 mmol) was dissolved in anhydrous diethyl ether (ca. 20 ml) under nitrogen. To this solution was added triethylamine (0.2 ml) followed by the Acid Chloride Terminated Polydimethylsiloxane (Example 1, Step 2, $M_n$=1,501) (0.522 g), dropwise. The mixture was stirred at room temperature for 30 minutes. The solvent was evaporated and the crude product then purified by column chromatography (silica gel, ethyl acetate/hexane, 1:1) giving the bulk product, Naphthopyran Terminated Polydimethylsiloxane, as a purple/blue tar. Analysis by $^1$H NMR gave a spectrum consistent with the structure, having an average molecular weight ($M_n$) of 2,402 ($n_{PDMS}$=14.0).

Step 1

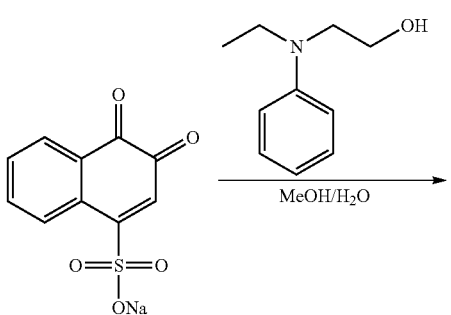

-continued

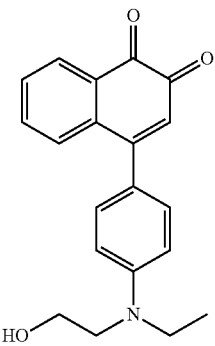

A suspension of 1,2-napthoquinone-4-sulfonic acid sodium salt (10.5 g, 40.35 mmol) in a 9:1 mixture of water:MeOH (250 ml) was treated in one portion with 2-(ethyl(phenyl)amino)ethanol (6.67 g, 40.35 mmol) and stirred at 50° C. for 18 hrs. The mixture was then cooled, the MeOH removed in vacuo and the resulting suspension filtered. The precipitate was then washed with water and oven dried at 50° C. to give the product, 4-(4-(ethyl(2-hydroxyethyl)amino)phenyl)naphthalene-1,2-dione, as a dark purple solid (6.8 g, 54%). Analysis of the product by $^1$H NMR gave a spectrum consistent with the structure.

Step 2

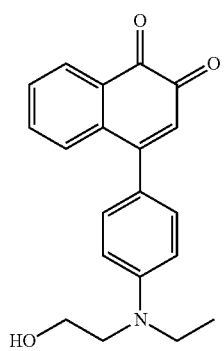

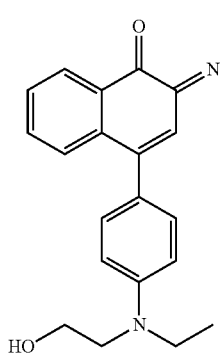

A suspension of 4-(4-(ethyl(2-hydroxyethyl)amino)phenyl)naphthalene-1,2-dione (8.5 g, 26.48 mmol) in absolute ethanol (150 ml) was treated in one portion with hydroxylamine hydrochloride (3.68 g, 52.96 mmol) recrystallised from 75:25 EtOH:H$_2$O and stirred at RT for 2 hrs. The mixture was then evaporated in vacuo and the residue suspended in H$_2$O (500 ml). The aqueous phase was then basified to pH 10 with ammonium hydroxide solution and extracted into EtOAc (×4). The combined organics were then dried (Na$_2$SO$_4$) and evaporated in vacuo to afford the product, 4-(4-(ethyl(2-hydroxyethyl)amino)phenyl)-2-(hydroxyimino)naphthalen-1(2H)-one, as a dark red solid (9.1 g, 100%). Analysis of the product by $^1$H NMR gave a spectrum consistent with the structure.

Step 3

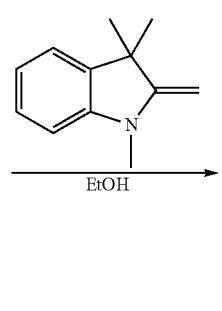

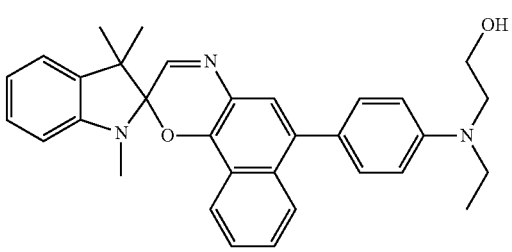

A suspension of 4-(4-(ethyl(2-hydroxyethyl)amino)phenyl)-2-(hydroxyimino)naphthalen-1(2H)-one (4.0 g, 11.89 mmol) in ethanol (100 ml) was treated with 1,3,3-trimethyl-2-methyleneindoline (2.68 g, 15.46 mmol) in one portion and heated to 100° C. in a sealed tube for 4 hrs. The mixture was then cooled to RT and left to stand overnight. The resulting suspension was evaporated in vacuo to approx 25 ml total volume, MeOH added (25 ml) and the mixture stored in the freezer for 3 hrs. After this time the product was collected by filtration and washed with a little methanol to give the product, 2-(ethyl(4-(1,3,3-trimethylspiro[indoline-2,2'-naphtho[1,2-b][1,4]oxazine]-6'-yl)phenyl)amino)ethanol, as pale green fibres (4.15 g, 71%). Analysis of the product by $^1$H NMR gave a spectrum consistent with the structure.

Step 4

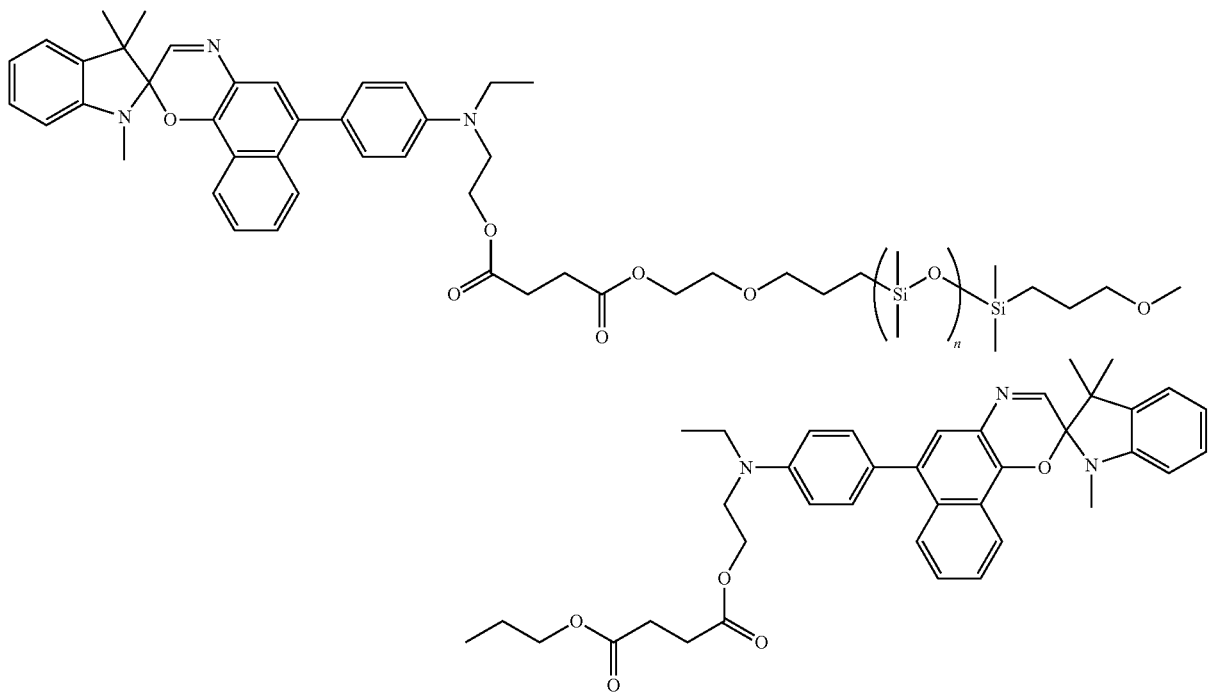

2-(ethyl(4-(1,3,3-trimethylspiro[indoline-2,2'-naphtho[1,2-b][1,4]oxazine]-6'yl)phenyl)amino)ethanol (0.60 g, 1.22 mmol) was dissolved in anhydrous diethyl ether (ca. 30 ml) under nitrogen. To this solution was added triethylamine (0.51 ml) followed by the Acid Chloride Terminated Polydimethylsiloxane (Example 1, Step 2, $M_n$=1,501) (0.916 g), dropwise. The mixture was stirred at room temperature for 30 minutes. The solvent was evaporated and the crude product purified by column chromatography (silica gel, diethyl ether/hexane, 4:1) giving the bulk product, Spirooxazine Terminated Polydimethylsiloxane, as a green viscous oil. Analysis by $^1$H NMR gave a spectrum consistent with the structure, having an average molecular weight ($M_n$) of 2,444 ($n_{PDMS}$=13.9).

Example 9

The photochromic dye synthesised here (Steps 1-5, below) for use in this example is a conjugatable (having a free hydroxyl group for further reaction) form of a naphthopyran photochromic dye disclosed in Patent Application (PCT) WO 00/18755.

Step 1

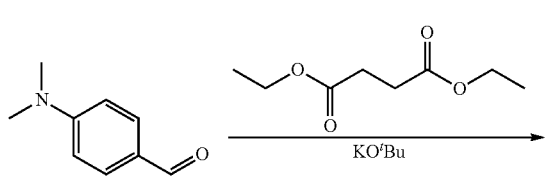

-continued

4-Dimethylaminobenzaldehyde (5.0 g, 33.5 mmol), diethylsuccinate (6.43 g, 36.9 mmol) and potassium t-butoxide (4.14 g, 36.9 mmol) were combined in a mortar and ground with a pestle for 10 minutes. The mixture was allowed to stand at RT for 1 hour, then dissolved in water and extracted with chloroform. The aqueous layer was acidified with glacial acetic acid and extracted with EtOAc. The organic layer was dried with MgSO$_4$ and the solvent evaporated in vacuo giving the crude product as a viscous oil. This material was of sufficient purity for use in the next step and no further purification was undertaken.

Step 2

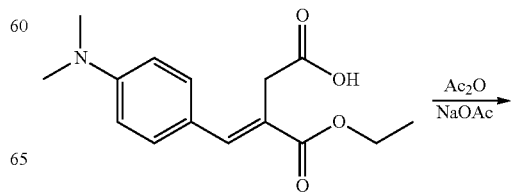

-continued

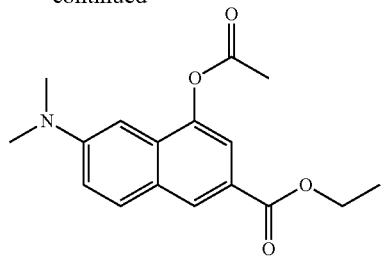

The product from Step 1 was dissolved in acetic anhydride (40 ml) and to this solution added NaOAc (2.75 g). The mixture was refluxed under nitrogen 3 hours. The excess acetic anhydride and acetic acid were removed by evaporation in vacuo and the residue dissolved in dichloromethane (30 ml). To this was added water (20 ml) followed by solid $Na_2CO_3$ until bubbling had ceased. The layers were separated and the aqueous layer extracted once more with dichloromethane. The organic extracts were combined, dried with $MgSO_4$ and the solvent evaporated. Analysis of the crude product by TLC (silica gel, diethyl ether/hexane, 1:1) showed good purity, with only one major product spot and trace impurities showing as two very minor spots at lower Rf. This product, ethyl 1-acetoxy-7-dimethylamino-3-naphthoate, was used in the next step without further purification.

Step 3

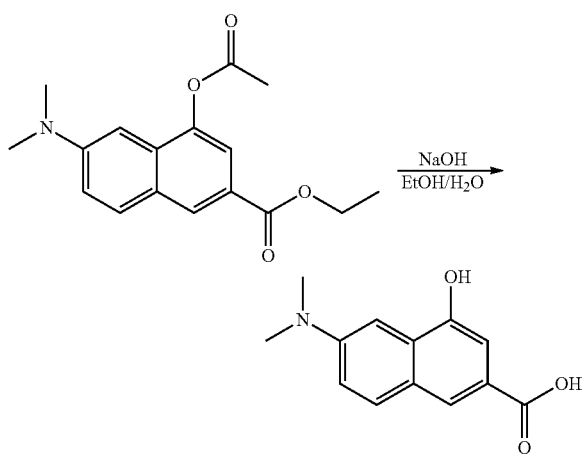

The product from Step 2 was dissolved in EtOH (40 ml) and to this added a solution of NaOH (5.4 g) in water (40 ml). The mixture was heated at reflux for 1 hour, cooled, then extracted with dichloromethane to remove impurities. The aqueous layer was acidified with glacial acetic acid and the resulting precipitate collected by filtration. The solid was washed with water and dried in a vacuum oven at 50° C. for several hours, yielding the desired product of good purity (3.69 g). Another batch of product was obtained from the aqueous filtrate by extraction with EtOAc. The organic extracts were combined, dried with $MgSO_4$ and the solvent evaporated in vacuo, giving another 0.46 g of product of good purity. Purity was established by analysis using $^1H$ and $^{13}C$ NMR, which gave spectra consistent with the structure of 6-dimethylamino-4-hydroxy-2-naphthoic acid.

Step 4

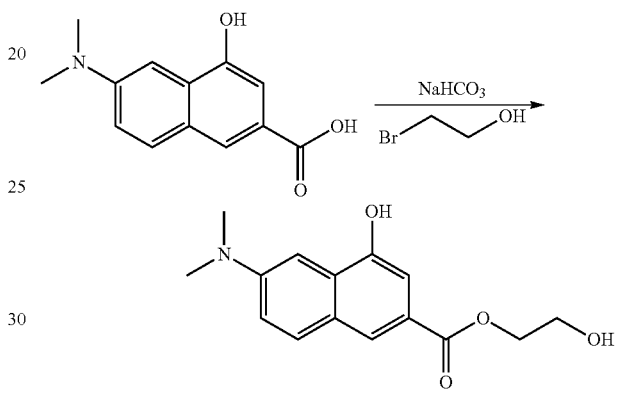

6-Dimethylamino-4-hydroxy-2-naphthoic acid (from Step 3) (3.0 g, 12.97 mmol) was dissolved in dry DMF (30 ml) and to this solution added $NaHCO_3$ (1.31 g, 15.56 mmol). The mixture was stirred at 100° C. for 45 minutes, under nitrogen. Freshly distilled and acid-free 2-bromoethanol (2.43 g, 19.46 mmol) was then added and heating continued for 2 hours. The mixture was poured into water and extracted with EtOAc. The organic layers were combined, washed with water then brine and dried with $MgSO_4$. This solution was filtered through a short column of silica gel and the solvent then evaporated, yielding the desired product of good purity (2.25 g). The product was analysed by $^1H$ NMR which gave a spectrum consistent with the structure for 2-hydroxyethyl 6-dimethylamino-4-hydroxy-2-naphthoate.

Step 5

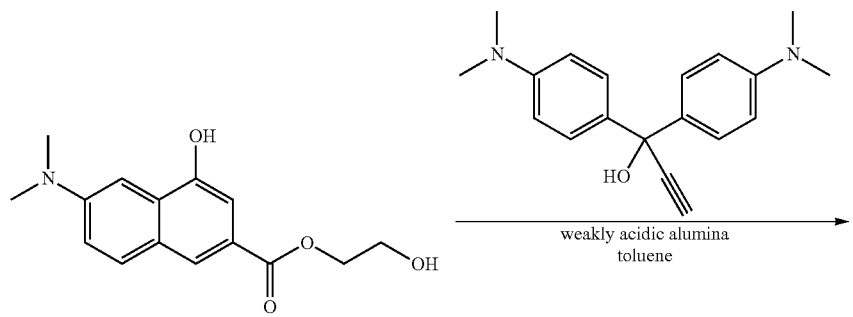

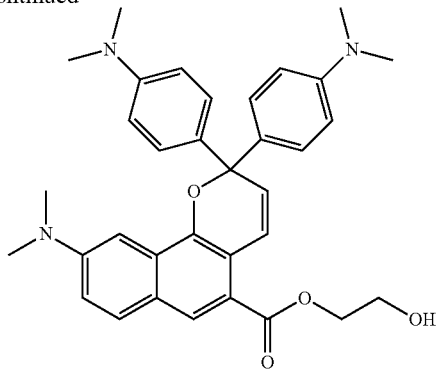

A stirred suspension of 2-hydroxyethyl 6-dimethylamino-4-hydroxy-2-naphthoate (0.70 g, 2.54 mmol), 1,1-bis(4-dimethylaminophenyl)prop-2-yn-1-ol (0.830 g, 2.80 mmol, Gabbutt et al. Eur. J. Org. Chem. 2003, 1220) and aluminium oxide (activated, weakly acidic, Brockmann 1) (5.0 g) in dry toluene (50 ml) was heated to reflux using a Dean-Stark apparatus under nitrogen for one hour. The progress of the reaction was followed by TLC. The cooled mixture was filtered through a small plug of silica with ethyl acetate. Removal of the solvent gave the crude product as a deep blue gum, which was purified by column chromatography (silica gel, CHCl$_3$→10% MeOH/CHCl$_3$) to afford the desired product (0.450 g) in 80% purity as analysed by $^1$H NMR. The compound was re-purified by HPLC (preparative chromatograph was performed with 300×40 mm Delta-Pak C18 cartridges on a Waters Prep LC 4000 system, monitoring with a Waters 490E Programmable Multiwavelength Detector at 248 nm, 2.0 absorbance units for full scale deflection fed to a Curken chart recorder running at 6 cm/hr. 65% acetonitrile in deionised water at 80 ml/min was the mobile phase). The pure product was obtained as a green/grey solid (0.30 g, 22%). Analysis by $^1$H NMR gave a spectrum consistent with the structure for 2,2-bis(4-dimethylaminophenyl)-5-(2-hydroxyethoxycarbonyl)-9-dimethylamino-2H-naphtho[1,2-b]pyran.

Step 6

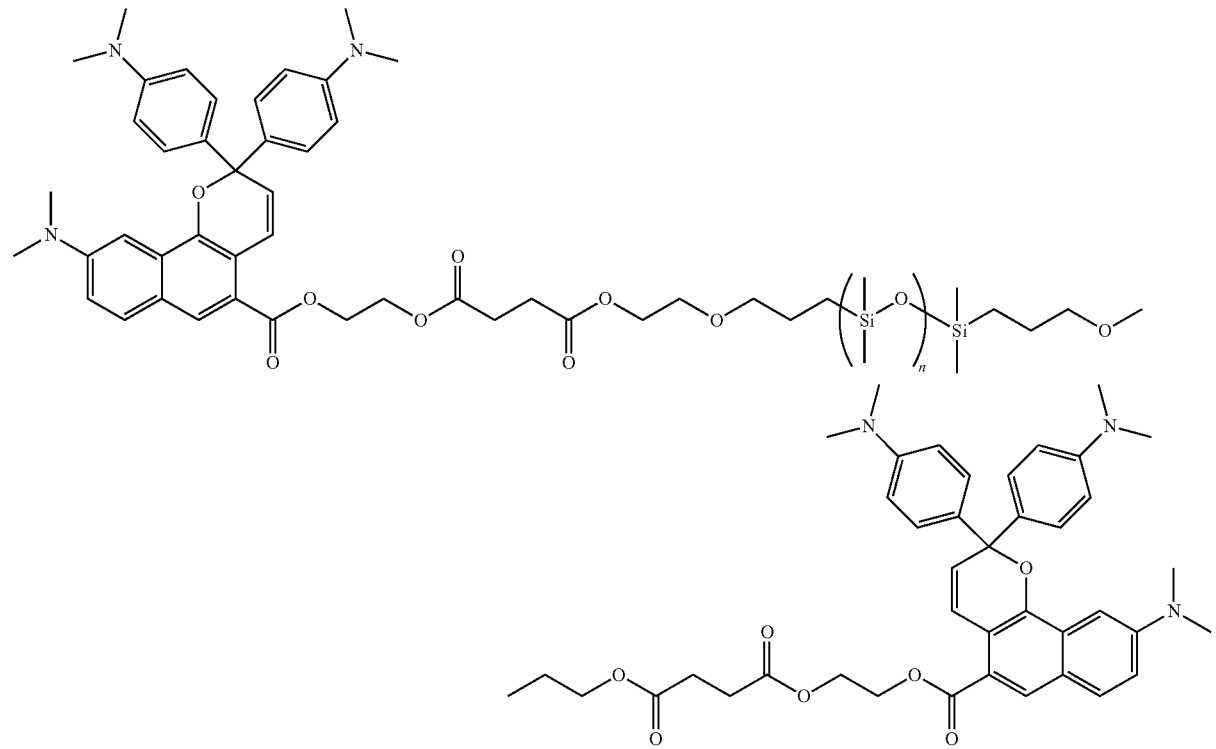

Carboxylic Acid Terminated Polydimethylsiloxane (Example 1, Step 1) with an average molecular weight ($M_n$) of 1,490 (1.0 g, 0.671 mmol) was dissolved in dry dichloromethane (15 ml) in a dry Schlenk flask under nitrogen. One drop of DMF was injected via syringe followed by the addition of oxalyl chloride (0.350 ml, 4.02 mmol) in one portion. The mixture was stirred at room temperature for 30 minutes. The solvent and a majority of excess reagent were removed by evaporation in vacuo and the residual reagent removed in vacuo with the aid of dichloromethane (2×10 ml), to afford the Acid Chloride Terminated Polydimethylsiloxane as a light yellow oil in quantitative yield. The acid chloride product (0.365 ml, 0.348 mmol) was immediately dissolved in dichloromethane (2 ml) and added to a stirred solution of 2,2-bis(4-dimethylaminophenyl)-5-(2-hydroxyethoxycarbonyl)-9-dimethylamino-2H-naphtho[1,2-b]pyran (Step 5) (0.320 g, 0.58 mmol), triethylamine (0.238 ml, 1.74 mmol) and DMAP (2 mg) in dry dichloromethane (12 ml) in an oven dried Schlenk flask under nitrogen. The mixture was stirred for one hour at room temperature and the progress of the reaction followed by TLC. The crude product was concentrated to half its volume and then purified by column chromatography (silica gel, 10% diethyl ether/dichloromethane→30% diethyl ether/dichloromethane) to afford the desired Naphthopyran Terminated Polydimethylsiloxane product as deep green gum (0.36 g). Analysis by $^1$H NMR gave a spectrum consistent with the structure, having an average molecular weight ($M_n$) of 2,550 ($n_{PDMS}$=13.7).

Example 10

Step 1

This compound was prepared using the method outlined in Comparative Example 2, using 2,2-Bis(4-methoxyphenyl)-5-(2-hydroxyethoxycarbonyl)-6-phenyl-[2H]-naphtho[1,2-b]pyran (U.S. Pat. No. 6,113,814) in place of 9'-Hydroxy-1,3,3-trimethylspiro[indoline-2,3'-[3H]naphtha[2,1-b][1,4]oxazine]. Purification was performed by column chromatography (silica gel, diethyl ether/hexane, 1:1).

Analysis of the purified Mono Naphthopyran Terminated Polydimethylsiloxane bulk product by $^1$H NMR gave a spectrum consistent with the structure, having an average molecular weight ($M_n$) of 1,830 ($n_{PDMS}$=13.1).

Step 2

Fractionation: The synthesis of this example as well as all Mono Photochromic Dye Terminated Polydimethylsiloxane conjugates disclosed in this invention use the commercially available starting material Mono Carbinol (Hydroxyl) Terminated Polydimethylsiloxane (Gelest Inc., MCR-C12), which is a polydisperse mixture of polydimethylsiloxane oligomers. Thus, the principles of fractionation, as defined in Example 1 (Step 4) for Telechelic Photochromic Dye Terminated Polydimethylsiloxane conjugates, are also applicable to Mono Photochromic Dye Terminated Polydimethylsiloxane conjugates.

The bulk Mono Naphthopyran Terminated Polydimethylsiloxane product from Step 1 was then fractionated by column chromatography (silica gel, diethyl ether/hexane, 1:1). The bulk product is visible on the column and elutes as a broad pink coloured band, with high molecular weight components having long polydimethylsiloxane chains running first. Three

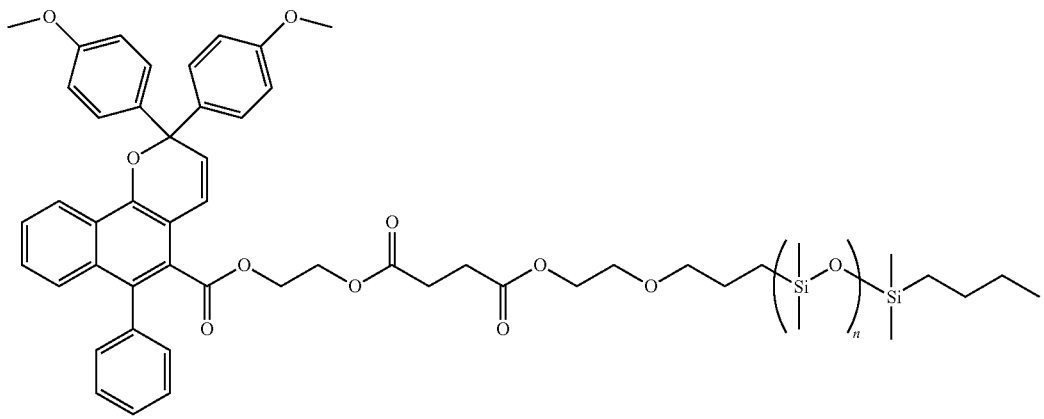

fractions were collected and analysed by $^1$H NMR to determine their average molecular weights ($M_n$) and average siloxane repeat units ($n_{PDMS}$).

Example 10, Fraction 1 (10 F1): $M_n$=2,461 ($n_{PDMS}$=21.6)
Example 10, Fraction 2 (10 F2): $M_n$=1,949 ($n_{PDMS}$=14.7)
Example 10, Fraction 3 (10 F3): $M_n$=1,507 ($n_{PDMS}$=8.7)

Example 11

Step 1

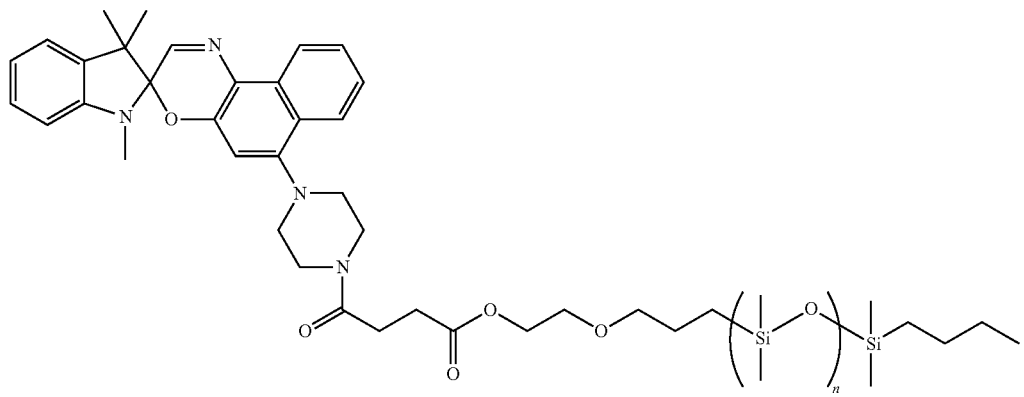

This compound was prepared using the method outlined in Comparative Example 2, using 6'-piperazine-1,3,3-trimethylspiro[indoline-2,3'-[3H]naphtho[2,1-b][1,4]-oxazine] in place of 9'-Hydroxy-1,3,3-trimethylspiro[indoline-2,3'-[3H]naphtha[2,1-b][1,4]oxazine]. Purification was performed by column chromatography (silica gel, diethyl ether/hexane, 1:1→2:1). Analysis of the purified Mono Spirooxazine Terminated Polydimethylsiloxane bulk product by $^1$H NMR gave a spectrum consistent with the structure, having an average molecular weight ($M_n$) of 1,634 ($n_{PDMS}$=12.2).

Step 2

The bulk Mono Spirooxazine Terminated Polydimethylsiloxane product from Step 1 was then fractionated by column chromatography (silica gel, diethyl ether/hexane, 2:1). The bulk product is visible on the column and elutes as a broad purple coloured band, with high molecular weight components having long polydimethylsiloxane chains running first. Three fractions were collected and analysed by $^1$H NMR to determine their average molecular weights ($M_n$) and average siloxane repeat units ($n_{PDMS}$).

Example 11, Fraction 1 (11 F1): $M_n$=1,849 ($n_{PDMS}$=15.3)

Example 11, Fraction 2 (11 F2): $M_n$=1,383 ($n_{PDMS}$=9.0)

Example 11, Fraction 3 (11 F3): $M_n$=1,151 ($n_{PDMS}$=5.9)

Example 12

Step 1

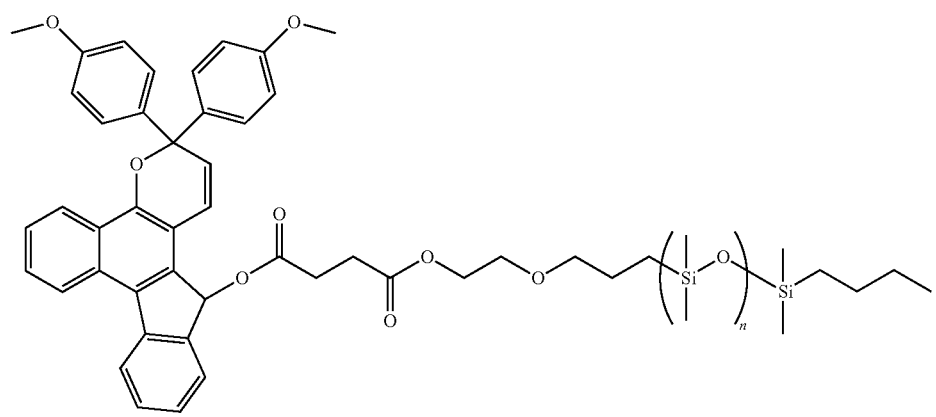

This compound was prepared using the method outlined in Comparative Example 2, using 3,3-Di(4-methoxyphenyl)-β-hydroxy-3H,13H-indeno[2',3':3,4]naphtho[1,2-b]pyran in place of 9'-Hydroxy-1,3,3-trimethylspiro[indoline-2,3'-[3H]naphtha[2,1-b][1,4]oxazine]. Purification was performed by column chromatography (silica gel, EtOAc/hexane, 1:2). Analysis of the purified Mono Indeno-Naphthopyran Terminated Polydimethylsiloxane bulk product by $^1$H NMR gave a spectrum consistent with the structure, having an average molecular weight ($M_n$) of 1,716 ($n_{PDMS}$=12.4).

Step 2

The bulk Mono Indeno-Naphthopyran Terminated Polydimethylsiloxane product from Step 1 was then fractionated by column chromatography (silica gel, diethyl ether/hexane, 1:1). The bulk product is visible on the column and elutes as a broad purple coloured band, with high molecular weight components having long polydimethylsiloxane chains running first. Five fractions were collected and analysed by $^1$H NMR to determine their average molecular weights ($M_n$) and average siloxane repeat units ($n_{PDMS}$).

Example 12, Fraction 1 (12 F1): $M_n$=2,256 ($n_{PDMS}$=19.7)
Example 12, Fraction 2 (12 F2): $M_n$=1,981 ($n_{PDMS}$=15.9)
Example 12, Fraction 3 (12 F3): $M_n$=1,680 ($n_{PDMS}$=11.9)
Example 12, Fraction 4 (12 F4): $M_n$=1,438 ($n_{PDMS}$=8.6)
Example 12, Fraction 5 (12 F5): $M_n$=1,260 ($n_{PDMS}$=6.2)

Example 13 nents having long polydimethylsiloxane chains running first. Three fractions were collected and analysed by $^1$H NMR to determine their average molecular weights ($M_n$) and average siloxane repeat units ($n_{PDMS}$).

Example 13, Fraction 1 (13 F1): $M_n$=2,012 ($n_{PDMS}$=16.8)
Example 13, Fraction 2 (13 F2): $M_n$=1,699 ($n_{PDMS}$=12.6)
Example 13, Fraction 3 (13 F3): $M_n$=1,430 ($n_{PDMS}$=8.9)

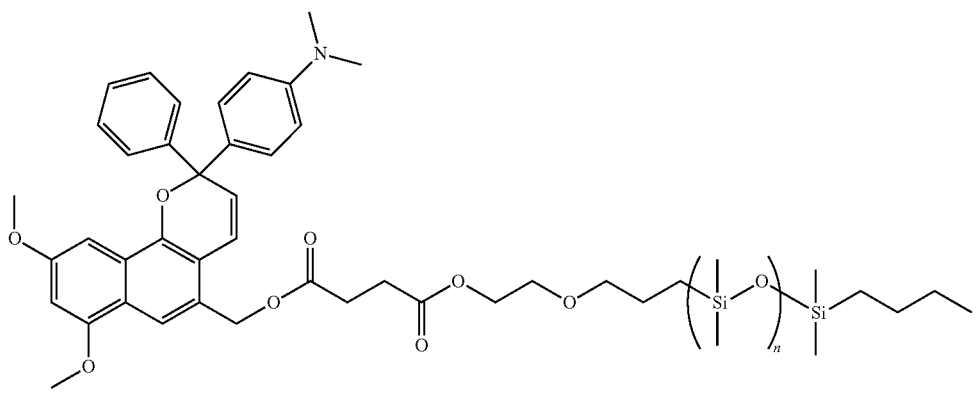

Step 1

This compound was prepared using the method outlined in Comparative Example 2, using 2-(4-dimethylaminophenyl)-2-phenyl-5-hydroxymethyl-7,9-methoxy-[2H]-naphtho[1,2-b]pyran in place of 9'-Hydroxy-1,3,3-trimethylspiro[indoline-2,3'-[3H]naphtha[2,1-b][1,4]oxazine]. Purification was performed by column chromatography (silica gel, EtOAc/hexane, 1:1). Analysis of the purified Mono Naphthopyran Terminated Polydimethylsiloxane bulk product by $^1$H NMR gave a spectrum consistent with the structure, having an average molecular weight ($M_n$) of 1,672 ($n_{PDMS}$=12.2).

Step 2

The bulk Mono Naphthopyran Terminated Polydimethylsiloxane product from Step 1 was then fractionated by column chromatography (silica gel, diethyl ether/hexane, 4:1). The bulk product is visible on the column and elutes as a broad purple coloured band, with high molecular weight compo- Comparative Example 1

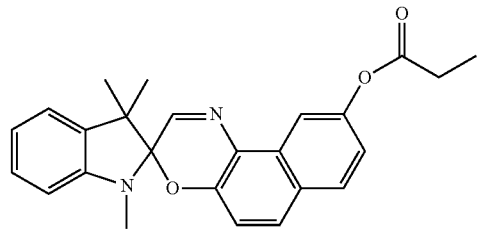 [SMILES: CCC(=O)Oc1ccc2ccc3c(c2c1)N=CC1(O3)N(C)c2ccccc2C1(C)C]

This compound was prepared using the procedure outlined in Evans, R. A. et al. WO 2004/041961; PCT/AU03/01453 (2003). Analysis of the purified product by $^1$H NMR gave a spectrum consistent with the structure.

Comparative Example 2

The synthesis of this compound is outlined in Evans, R. A. et al. WO 2004/041961; PCT/AU03/01453 (2003). It is synthesised here using the following alternative procedure.

Step 1

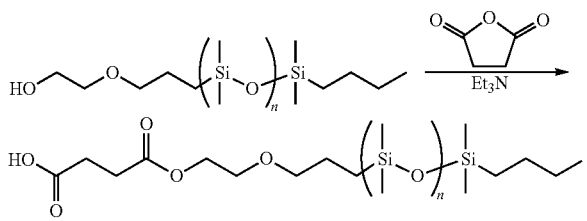

Mono Carbinol (Hydroxyl) Terminated Polydimethylsiloxane (Gelest Inc., MCR-C12, molecular weight ca. 1132) (25 g, ca. 0.0221 mol) and succinic anhydride (2.65 g, 0.0265 mol) were added to dry $CH_2Cl_2$ (ca. 30 mL) under nitrogen. Triethylamine (3.35 g, 4.6 mL, 0.0331 mol) was then added in one portion and the mixture was stirred at room temperature for 30 minutes followed by heating at 35° C. for 1 hour. Polyethylene glycol methyl ether (3.86 g, 0.0110 mol) was then added and the mixture stirred for an additional 30 minutes at 35° C. It was then poured into hexane, washed with several portions of 2M HCl, the organic layer dried with $MgSO_4$ and the solvent evaporated to give the pure product, Mono Carboxylic Acid Terminated Polydimethylsiloxane, as a colourless oil (26.34 g, 97%). $^1H$ NMR (400 MHz, $CDCl_3$) δ 4.25 (t, 2H), 3.63 (t, 2H), 3.42 (t, 2H), 2.67 (s, 4H), 1.61 (m, 2H), 1.31 (m, 4H), 0.88 (t, 3H), 0.53 (m, 4H), 0.07 (s, approx. 80H, $SiCH_3$).

Step 2

The Mono Carboxylic Acid Terminated Polydimethylsiloxane from Step 1 (1.0 g, ca. 0.811 mmol) was dissolved in dry $CH_2Cl_2$ (10 mL) under argon and 1 drop DMF added. The mixture was cooled in an ice bath and then oxalyl chloride (0.41 g, 0.28 mL, 3.244 mmol) added in one portion. Stirring was continued at 0° C. for 15 minutes and then at room temperature for 20 minutes whilst maintaining a slow argon flow above the reaction by means of a syringe needle through a rubber septum. The solvent and excess reagent was removed by evaporation in vacuo and the residual reagent further removed in vacuo with the aid of 1,2-dichloroethane. The Mono Acid Chloride Terminated Polydimethylsiloxane product was used immediately in the next step. Analysis by $^1H$ NMR in d-chloroform showed quantitative conversion. $^1H$ NMR (400 MHz, $CDCl_3$) δ 4.26 (t, 2H), 3.63 (t, 2H), 3.42 (t, 2H), 3.22 (t, 2H), 2.72 (t, 2H), 1.61 (m, 2H), 1.31 (m, 4H), 0.88 (t, 3H), 0.53 (m, 4H), 0.07 (s, approx. 80H, $SiCH_3$).

Step 3

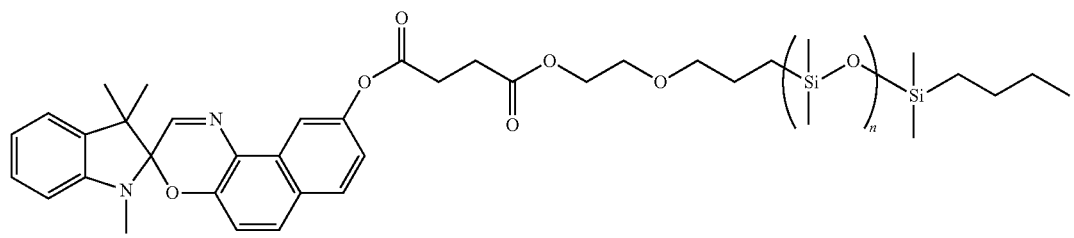

9'-Hydroxy-1,3,3-trimethylspiro[indoline-2,3'-[3H]naphtha[2,1-b][1,4]oxazine] (0.924 g, 2.68 mmol) was added to dry $CH_2Cl_2$ (15 mL) followed by the addition of triethylamine (0.54 g, 0.75 mL, 5.37 mmol) under an argon atmosphere. Mono Acid Chloride Terminated Polydimethylsiloxane from Step 2 (made from 3.00 g (ca. 2.44 mmol) of Mono Carboxylic Acid Terminated Polydimethylsiloxane, Step 1) was then added dropwise and the mixture stirred at room temperature for 30 minutes. The solvent was evaporated in vacuo, the residue re-dissolved in a mixture of $Et_2O$/hexane (1:1) and this solution filtered through a plug of silica gel. The solvent was evaporated and the oily residue purified by column chromatography ($SiO_2$, $Et_2O$/hexane, 1:3) to give the product, Mono Spirooxazine Terminated Polydimethylsiloxane, as a viscous green oil (2.92 g, 77%). Analysis by $^1H$ NMR gave a spectrum consistent with the structure, having an average molecular weight ($M_n$) of 1,550 ($n_{PDMS}$=12.2). $^1H$ NMR (200 MHz, $d_6$-acetone) δ 8.25 (d, 1H), 7.88 (d, 1H), 7.83 (s, 1H), 7.81 (d (overlapping), 1H), 7.18 (m, 3H), 7.04 (d, 1H), 6.86 (t, 1H), 6.66 (d, 1H), 4.25 (t, 2H), 3.65 (t, 2H), 3.44 (t, 2H), 2.99

(t, 2H), 2.80 (t (overlapping), 2H), 2.77 (s, 3H), 1.62 (m, 2H), 1.35 (m (overlapping), 10H), 0.89 (t, 3H), 0.59 (m, 4H), 0.10 (m, SiCH$_3$).

Comparative Example 3

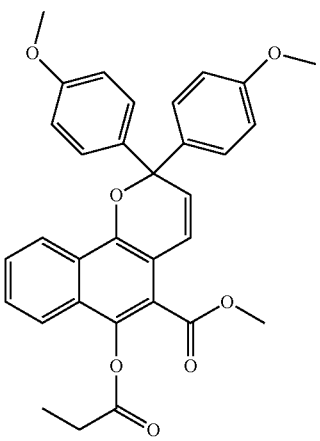 [SMILES: CCC(=O)Oc1c(C(=O)OC)c2c(c3ccccc13)OC(c1ccc(OC)cc1)(c1ccc(OC)cc1)C=C2]

This compound was prepared using the procedure outlined in Evans, R. A. et al. WO 2004/041961; PCT/AU03/01453 (2003). Analysis of the purified product by $^1$H NMR gave a spectrum consistent with the structure.

Comparative Example 4

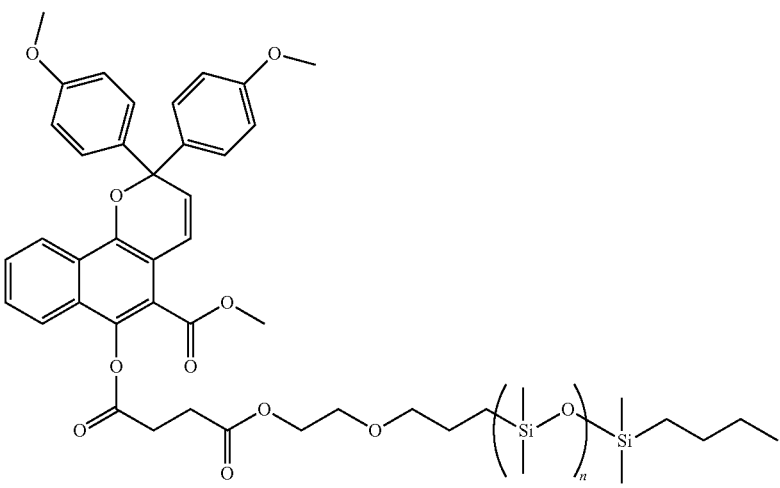

This compound was prepared using the method outlined in Comparative Example 2, using 2,2-Bis(4-methoxyphenyl)-5-(methoxycarbonyl)-6-hydroxy-[2H]-naphtho[1,2-b]pyran in place of 9'-Hydroxy-1,3,3-trimethylspiro[indoline-2,3'-[3H] naphtha[2,1-b][1,4]oxazine]. Analysis of the purified bulk product by $^1$H NMR gave a spectrum consistent with the structure, having an average molecular weight ($M_n$) of 1,777 ($n_{PDMS}$=13.6).

Comparative Example 5

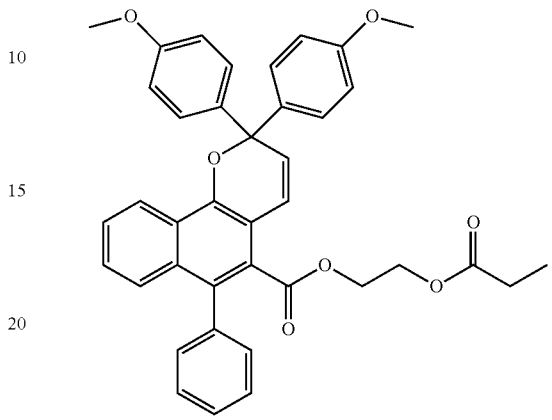

2,2-Bis(4-methoxyphenyl)-5-(2-hydroxyethoxycarbonyl)-6-phenyl-[2H]-naphtho[1,2-b]pyran (U.S. Pat. No. 6,113,814) (0.50 g, 0.90 mmol) was dissolved in dry dichloromethane (20 ml) together with triethylamine (0.25 ml), under nitrogen. To this solution was added propionyl chloride (0.083 g, 0.90 mmol) and the mixture stirred at RT for 15 minutes. The solvent was evaporated and the crude residue purified by column chromatography (silica gel, EtOAc/hexane, 2:3) giving a pink foamy solid on evaporation of the solvent in vacuo. Analysis of the purified product by $^1$H NMR gave a spectrum consistent with the structure of 2,2-Bis(4-methoxyphenyl)-5-(2-propionyloxy-ethoxycarbonyl)-6-phenyl-[2H]-naphtho[1,2-b]pyran.

Comparative Example 6

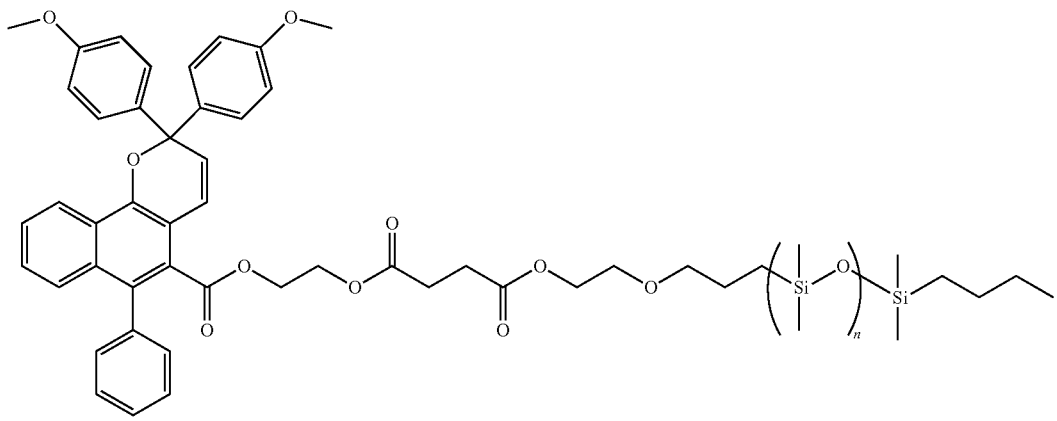

The compound of this Comparative Example is the bulk photochromic conjugate of Example 10, Step 1 ($M_n$=1,830 ($n_{PDMS}$=13.1)).

Comparative Example 7

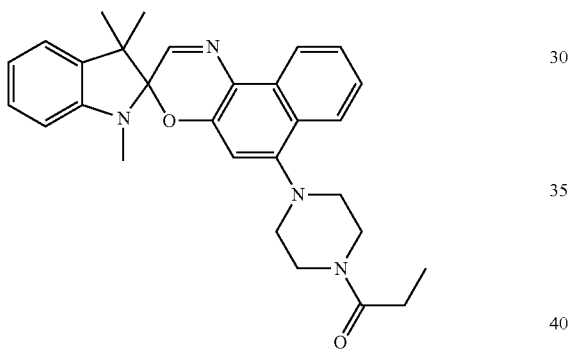

This compound was prepared using the procedure outlined in Comparative Example 5, using 6'-piperazine-1,3,3-trimethylspiro[indoline-2,3'-[3H]naphtho[2,1-b][1,4]-oxazine] (Yuan et al., Adv. Mater. 2005, 17, 156-160) in place of 2,2-Bis(4-methoxyphenyl)-5-(2-hydroxyethoxycarbonyl)-6-phenyl-[2H]-naphtho[1,2-b]pyran. Purification was performed by column chromatography (silica gel, diethyl ether). Analysis of the purified product by $^1$H NMR gave a spectrum consistent with the structure.

Comparative Example 8

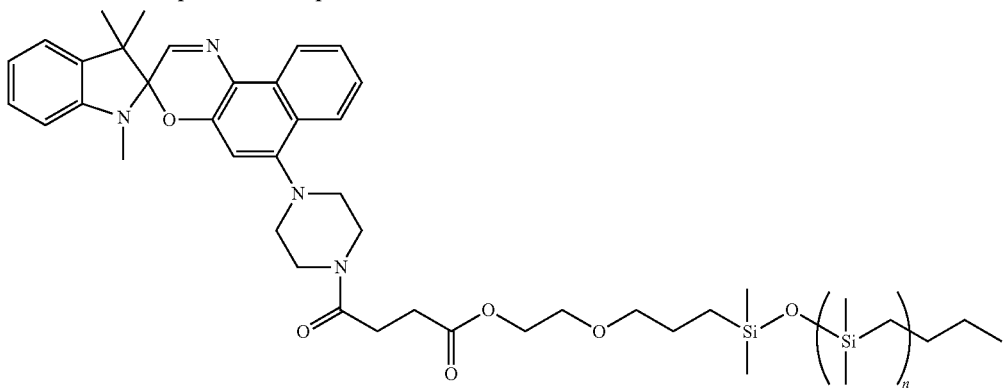

The compound of this Comparative Example is the bulk photochromic conjugate of Example 11, Step 1 ($M_n$=1,634 ($n_{PDMS}$=12.2)).

Comparative Example 9

The compound of this Comparative Example is the bulk photochromic conjugate of Example 12, Step 1 (Mn=1,716 (nPDMS=12.4)).

Comparative Example 11

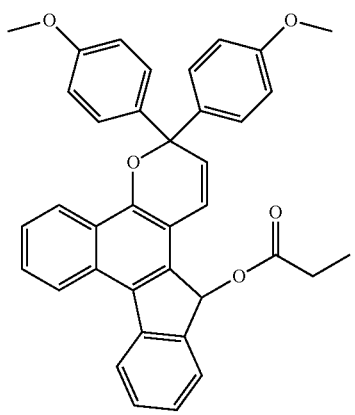 [SMILES: CCC(=O)OC1c2ccccc2-c2c1c1c(c3ccccc23)OC(c2ccc(OC)cc2)(c2ccc(OC)cc2)C=C1]

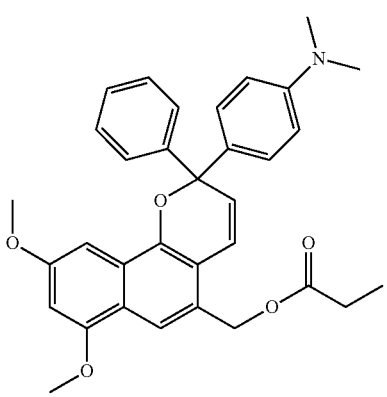

This compound was prepared using the procedure outlined in Comparative Example 5, using 3,3-Di(4-methoxyphenyl)-β-hydroxy-3H,13H-indeno[2',3':3,4]naphtho[1,2-b]pyran (US Patent Application, US 2006/0226402) in place of 2,2-Bis(4-methoxyphenyl)-5-(2-hydroxyethoxycarbonyl)-6-phenyl-[2H]-naphtho[1,2-b]pyran. Purification was performed by column chromatography (silica gel). Analysis of the purified product by $^1$H NMR gave a spectrum consistent with the structure.

Comparative Example 10

This compound was prepared using the procedure outlined in Comparative Example 5, using 2-(4-dimethylaminophenyl)-2-phenyl-5-hydroxymethyl-7,9-methoxy-[2H]-naphtho[1,2-b]pyran (U.S. Pat. No. 6,399,791) in place of 2,2-Bis(4-methoxyphenyl)-5-(2-hydroxyethoxycarbonyl)-6-phenyl-[2H]-naphtho[1,2-b]pyran. Purification was performed by column chromatography (silica gel). Analysis of the purified product by $^1$H NMR gave a spectrum consistent with the structure.

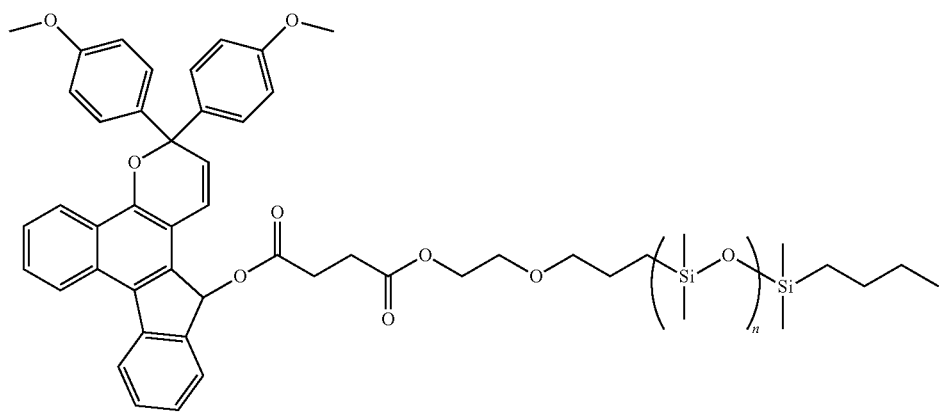

Comparative Example 12

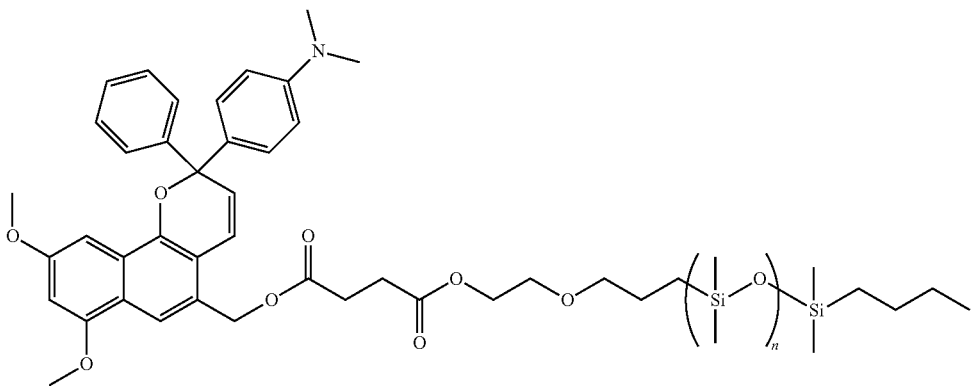

The compound of this Comparative Example is the bulk photochromic conjugate of Example 13, Step 1 (Mn=1,672 (nPDMS=12.2)).

Comparative Example 13

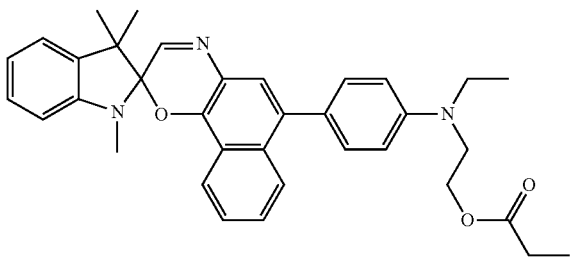 [SMILES: CCC(=O)OCCN(CC)c1ccc(-c2cc3c(c4ccccc24)OC2(C=N3)N(C)c3ccccc3C2(C)C)cc1]

A solution of 2-(ethyl(4-(1,3,3-trimethylspiro[indoline-2, 2'-naphtho[1,2-b][1,4]oxazine]-6'-yl)phenyl)amino)ethanol (Example 8, Step 3) (0.085 g, 0.17 mmol) in DCM (5 ml) was treated with triethylamine (0.026 g, 0.26 mmol) in one portion followed by propionyl chloride (0.019 g, 0.21 mmol) and stirred at RT for 18 hrs. The solvent was then evaporated in vacuo and the crude residue purified by column chromatography (silica gel) eluting with 0-10% EtOAc/Petroleum ether, which gave the pure product, 2-(ethyl(4-(1,3,3-trimethylspiro[indoline-2,2'-naphtho[1,2-b][1,4]oxazine]-6'-yl)phenyl)amino)ethyl propionate, as a pale green foam upon evaporation of the solvent in vacuo (0.08 g, 84%).

Comparative Example 14

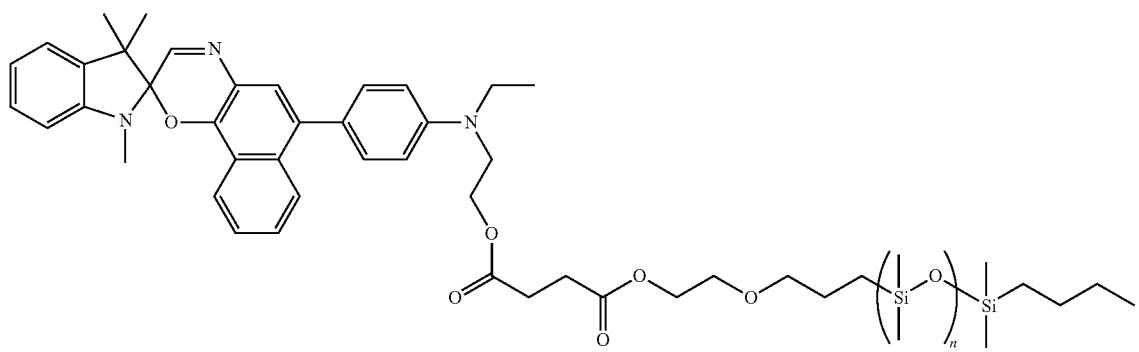

This compound was prepared using the method outlined in Comparative Example 2, using 2-(ethyl(4-(1,3,3-trimethylspiro[indoline-2,2'-naphtho[1,2-b][1,4]oxazine]-6'-yl)phenyl)amino)ethanol (Example 8, Step 3) in place of 9'-Hydroxy-1,3,3-trimethylspiro[indoline-2,3'-[3H]naphtha[2,1-b][1,4]oxazine]. Purification was performed by column chromatography (silica gel, EtOAc/hexane, 1:2). Analysis of the purified Mono Spirooxazine Terminated Polydimethylsiloxane bulk product by $^1$H NMR gave a spectrum consistent with the structure, having an average molecular weight (Mn) of 1,724 (nPDMS=12.6).

Comparative Example 15

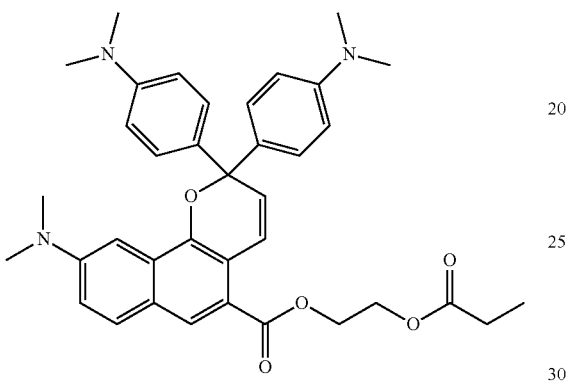

A solution of 2,2-bis(4-dimethylaminophenyl)-5-(2-hydroxyethoxycarbonyl)-9-dimethylamino-[2H]-naphtho[1,2-b]pyran (Example 9, Step 5) (0.045 g, 0.082 mmol) and triethylamine (0.05 ml) in dry DCM (5 ml) was added propionyl chloride in one portion (0.0075 g, 0.082 mmol) and the mixture stirred at RT for 30 minutes. The solvent was then evaporated in vacuo and the crude residue purified by column chromatography (silica gel, DCM/diethyl ether, 10:1), giving the pure product, 2,2-bis(4-dimethylaminophenyl)-5-(2-propionyloxy-ethoxycarbonyl)-9-dimethylamino-[2H]-naphtho[1,2-b]pyran (0.044 g, 89%).

Comparative Example 16

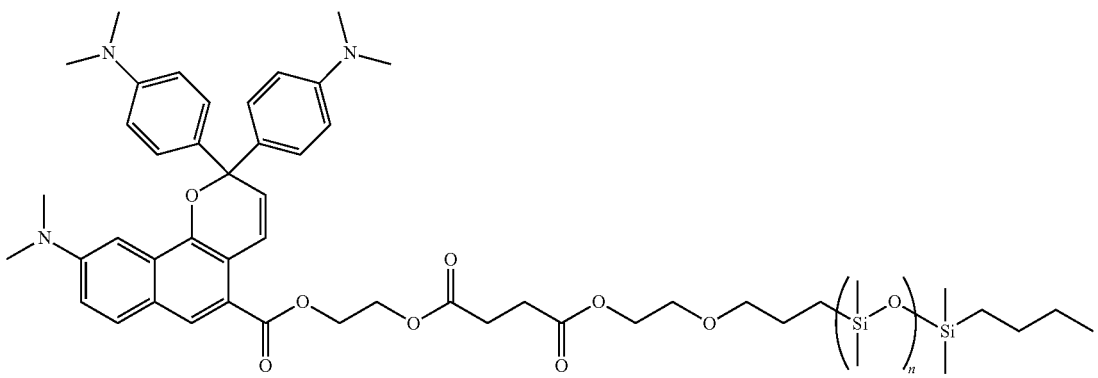

This compound was prepared using the method outlined in Comparative Example 2, using 2,2-bis(4-dimethylaminophenyl)-5-(2-hydroxyethoxycarbonyl)-9-dimethylamino-[2H]-naphtho[1,2-b]pyran in place of 9'-Hydroxy-1,3,3-trimethylspiro[indoline-2,3'-[3H]naphtha[2,1-b][1,4]oxazine].
Purification was performed by column chromatography (silica gel, diethyl ether/DCM, 1:9). Analysis of the purified Mono Naphthopyran Terminated Polydimethylsiloxane bulk product by $^1$H NMR gave a spectrum consistent with the structure, having an average molecular weight (Mn) of 1,791 (nPDMS=12.7).

Kinetics Analyses

Analysis of photochromic performance (fade speed) was performed on lenses composed of example compounds dissolved in a standard thermoset industrial lens formulation. The compositions of the lens formulations and thermal curing protocols used for each example of the invention are summarised in FIG. 1 and Table 1, below.

FIGURE 1: Standard thermoset industrial lens formulations and curing protocols used in the invention.

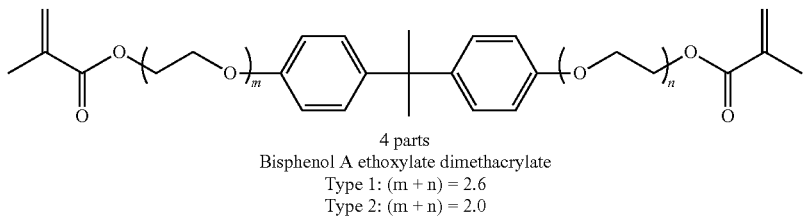

4 parts
Bisphenol A ethoxylate dimethacrylate
Type 1: (m + n) = 2.6
Type 2: (m + n) = 2.0

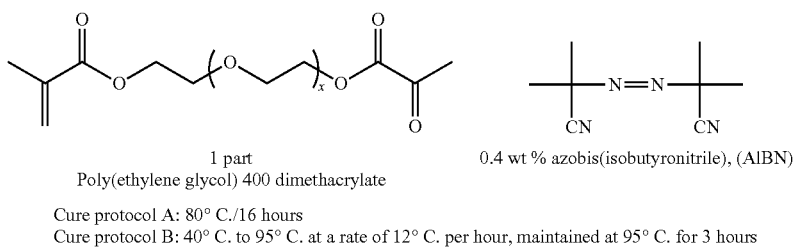

1 part
Poly(ethylene glycol) 400 dimethacrylate 0.4 wt % azobis(isobutyronitrile), (AIBN)

Cure protocol A: 80° C./16 hours
Cure protocol B: 40° C. to 95° C. at a rate of 12° C. per hour, maintained at 95° C. for 3 hours FIG. 1: Standard thermoset industrial lens formulations and curing protocols used in the invention.

TABLE 1

Composition of lens formulation and curing protocol used for examples of the invention.

| Examples | Bisphenol A ethoxylate dimethacrylate[#] | Cure protocol[~] |
|---|---|---|
| 1-3, 14, CE1-CE4 | Type 2 | A |
| 4, 10, CE5, CE6 | Type 2 | B |
| 5-9, 11-13, 15, CE7-CE16 | Type 1 | B |

[#]as defined in FIG. 1.
[~]as defined in FIG. 1.

The photochromic response of the lenses were analysed on a light table comprised of a Cary 50 spectrophotometer and a 300 W Oriel xenon lamp as an incident light source. A series of two filters (Edmund Optics WG320 and Edmund Optics band-pass filter U-340) were used to restrict the output of the lamp to a narrow band (350-400 nm). The samples were monitored at λmax of the coloured form for a period of one minute without UV, 1000 seconds with UV lamp on (160 W) and then 80 minutes fade time (without UV exposure) in the dark. Performance of the various conjugates is outlined in Tables 2-9 and Graphs 1-16 below.

TABLE 2

| Example | Description | $T_{1/2}$ (sec) | $T_{3/4}$ (sec) |
|---|---|---|---|
| 1 | Bulk product ($n_{PDMS}$ = 13.6) | 10 | 28 |
| 1H | High $M_n$ fraction ($n_{PDMS}$ = 23.1) | 7 | 14 |
| 1L | Low $M_n$ fraction ($n_{PDMS}$ = 6.4) | 15 | 55 |

TABLE 2-continued

| Example | Description | $T_{1/2}$ (sec) | $T_{3/4}$ (sec) |
|---|---|---|---|
| 2 | Bulk product ($n_{PDMS}$ = 14.6) | 14 | 44 |
| CE1 | Control | 31 | 234 |
| CE2 | Control, bulk product ($n_{PDMS}$ = 12.2) | 8 | 21 |

$n_{PDMS}$ denotes the average number of siloxane repeat units (determined by $^1$H NMR analysis).
Concentrations: $0.6 \times 10^{-6}$ mol/g (1, 1H, 1L, 2), $1.2 \times 10^{-6}$ mol/g (CE1, CE2).
Observed maxima of coloured form ($\lambda_{max}$) = 605 nm.

TABLE 3

| Example | Description | $T_{1/2}$ (sec) | $T_{3/4}$ (sec) |
|---|---|---|---|
| 3 | Bulk product ($n_{PDMS}$ = 12.6) | 58 | 280 |
| 3H | High $M_n$ fraction ($n_{PDMS}$ = 25.7) | 37 | 120 |
| 3L | Low $M_n$ fraction ($n_{PDMS}$ = 6.8) | 66 | 342 |
| CE3 | Control | 139 | 1060 |
| CE4 | Control, bulk product ($n_{PDMS}$ = 13.6) | 55 | 240 |

$n_{PDMS}$ denotes the average number of siloxane repeat units (determined by $^1$H NMR analysis).
Concentrations: $0.3 \times 10^{-6}$ mol/g (3, 3H, 3L), $0.6 \times 10^{-6}$ mol/g (CE3, CE4).
Observed maxima of coloured form ($\lambda_{max}$) = 510 nm.

TABLE 4

| Example | Description | $T_{1/2}$ (sec) | $T_{3/4}$ (sec) |
|---|---|---|---|
| 4 | Bulk product ($n_{PDMS}$ = 10.9) | 33 | 127 |
| 4 F1 | Fraction 1 ($n_{PDMS}$ = 25.6) | 29 | 89 |

TABLE 4-continued

| Example | Description | $T_{1/2}$ (sec) | $T_{3/4}$ (sec) |
|---|---|---|---|
| 4 F2 | Fraction 2 ($n_{PDMS}$ = 16.2) | 32 | 110 |
| 4 F3 | Fraction 3 ($n_{PDMS}$ = 12.2) | 34 | 125 |
| 4 F4 | Fraction 4 ($n_{PDMS}$ = 7.5) | 40 | 190 |
| CE5 | Control | 92 | 1482 |
| CE6 | Control, bulk product ($n_{PDMS}$ = 13.1) | 35 | 151 |
| 10 F1 | Control, Fraction 1 ($n_{PDMS}$ = 21.6) | 27 | 84 |
| 10 F2 | Control, Fraction 2 ($n_{PDMS}$ = 14.7) | 33 | 130 |
| 10 F3 | Control, Fraction 3 ($n_{PDMS}$ = 8.7) | 41 | 237 |

$n_{PDMS}$ denotes the average number of siloxane repeat units (determined by $^1$H NMR analysis).
Concentrations: $0.75 \times 10^{-7}$ mol/g (4, 4 F1-F4), $1.5 \times 10^{-7}$ mol/g (CE5, CE6, 10 F1-F3).
Observed maxima of coloured form ($\lambda_{max}$) = 515 nm.

Figure 3:
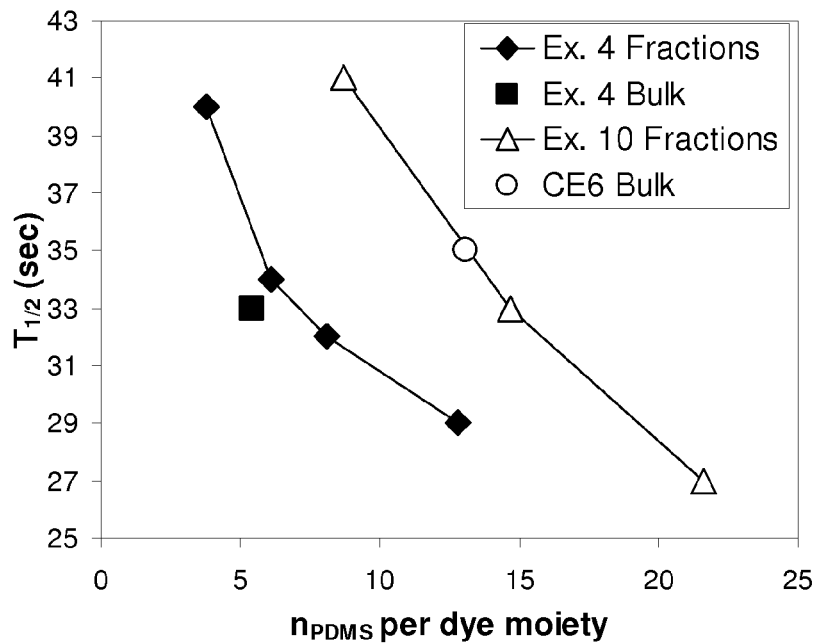
FIG. 3 is a graph comparing the T1/2 (in seconds) fade speed of the photochromics of Examples 4, 10 and Comparative Example 6 having varying numbers of monomer units in the PDMS (polydimethylsiloxane) polymer chain per dye moiety as recorded in Table 4.
Figure 4:
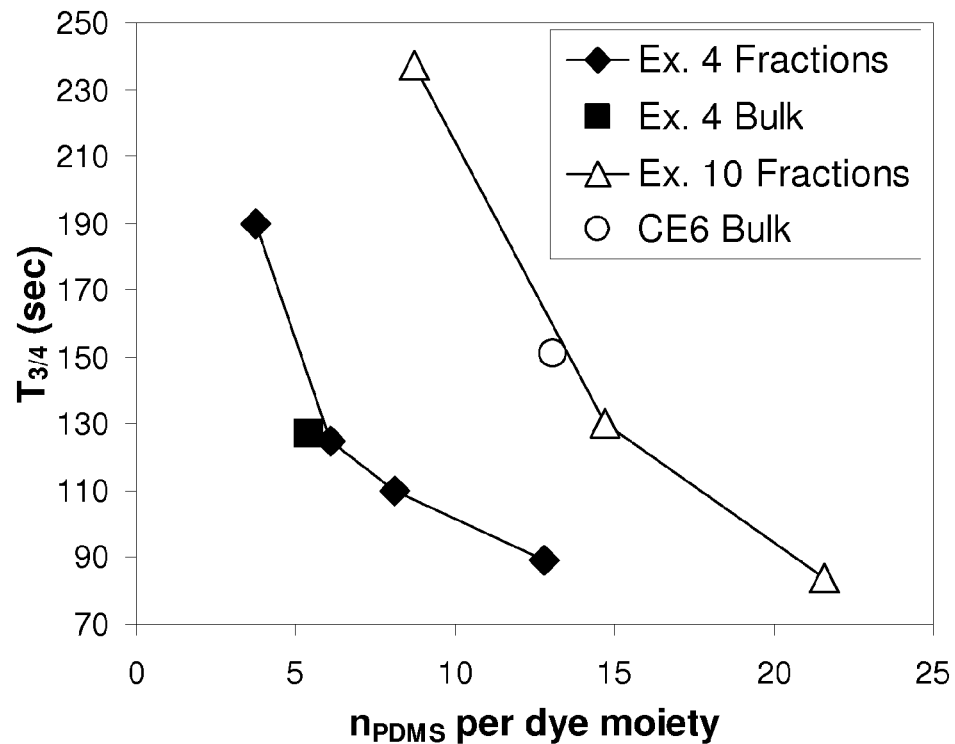
FIG. 4 is a graph comparing the T3/4 (in seconds) fade speed of the photochromics of Examples 4, 10 and Comparative Example 6 having varying numbers of monomer units in the PDMS (polydimethylsiloxane) polymer chain per dye moiety as recorded in Table 4.
Figure 5:
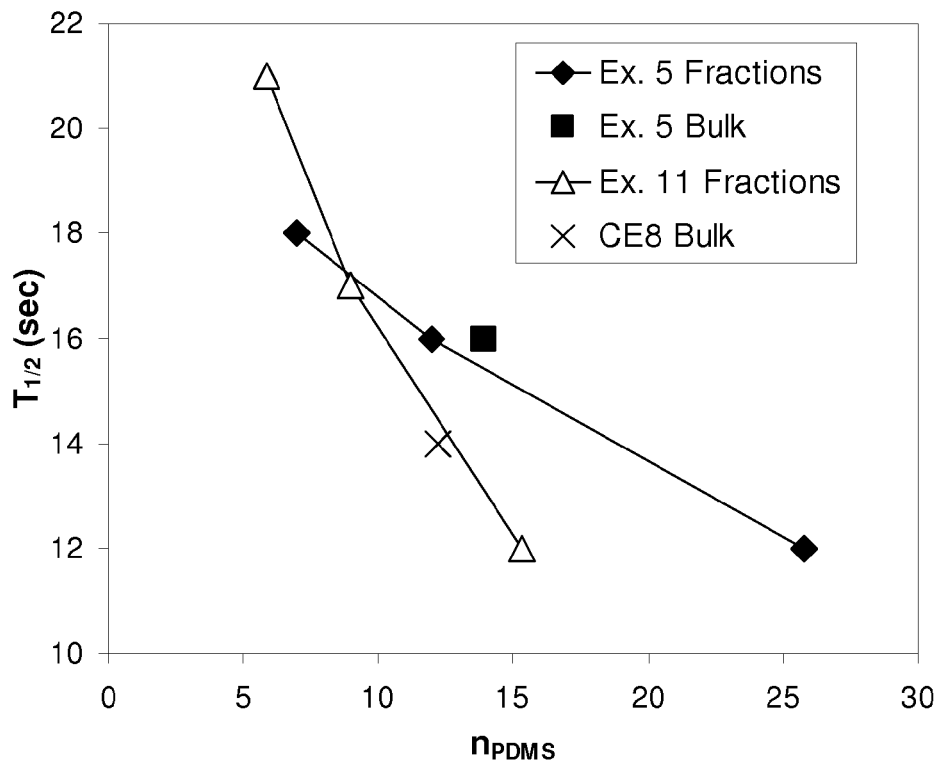
FIG. 5 is a graph comparing the T1/2 (in seconds) fade speed of the photochromics of Examples 5, 11 and Comparative Example 8 having varying numbers of monomer units in the PDMS (polydimethylsiloxane) polymer chain as recorded in Table 5.
Figure 6:
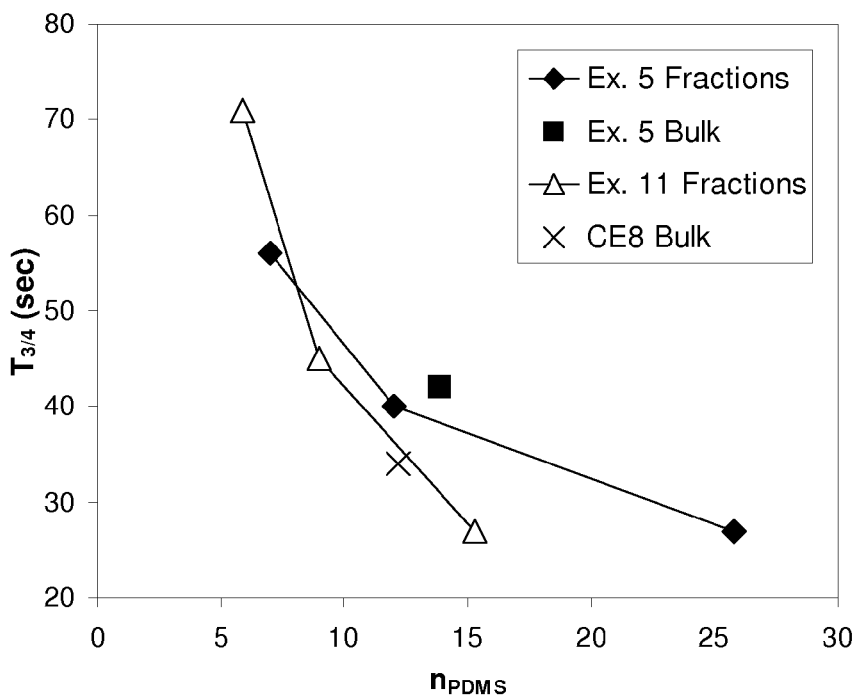
FIG. 6 is a graph comparing the T3/4 (in seconds) fade speed of the photochromics of Examples 5, 11 and Comparative Example 8 having varying numbers of monomer units in the PDMS (polydimethylsiloxane) polymer chain as recorded in Table 5.

The variation of fade speed (t1/2 and t3/4) with the number of PDMS units recorded in Table 4 is shown in the graphs of FIGS. 1 to 4 for the number of PDMS units (FIGS. 1 and 2) and the number of PDMS units per dye moiety FIGS. 3 and 4).

TABLE 5

| Example | Description | $T_{1/2}$ (sec) | $T_{3/4}$ (sec) |
|---|---|---|---|
| 5 | Bulk product ($n_{PDMS}$ = 13.9) | 16 | 42 |
| 5 F1 | Fraction 1 ($n_{PDMS}$ = 25.8) | 12 | 27 |
| 5 F2 | Fraction 2 ($n_{PDMS}$ = 12.0) | 16 | 40 |
| 5 F3 | Fraction 3 ($n_{PDMS}$ = 7.0) | 18 | 56 |
| CE7 | Control | 45 | 213 |
| CE8 | Control, bulk product ($n_{PDMS}$ = 12.2) | 14 | 34 |
| 11 F1 | Control, Fraction 1 ($n_{PDMS}$ = 15.3) | 12 | 27 |
| 11 F2 | Control, Fraction 2 ($n_{PDMS}$ = 9.0) | 17 | 45 |
| 11 F3 | Control, Fraction 3 ($n_{PDMS}$ = 5.9) | 21 | 71 |

$n_{PDMS}$ denotes the average number of siloxane repeat units (determined by $^1$H NMR analysis).
Concentrations: $0.6 \times 10^{-6}$ mol/g (5, 5 F1-F3), $1.2 \times 10^{-6}$ mol/g (CE7, CE8, 11 F1-F3).
Observed maxima of coloured form ($\lambda_{max}$) = 590 nm.

Figure 7:
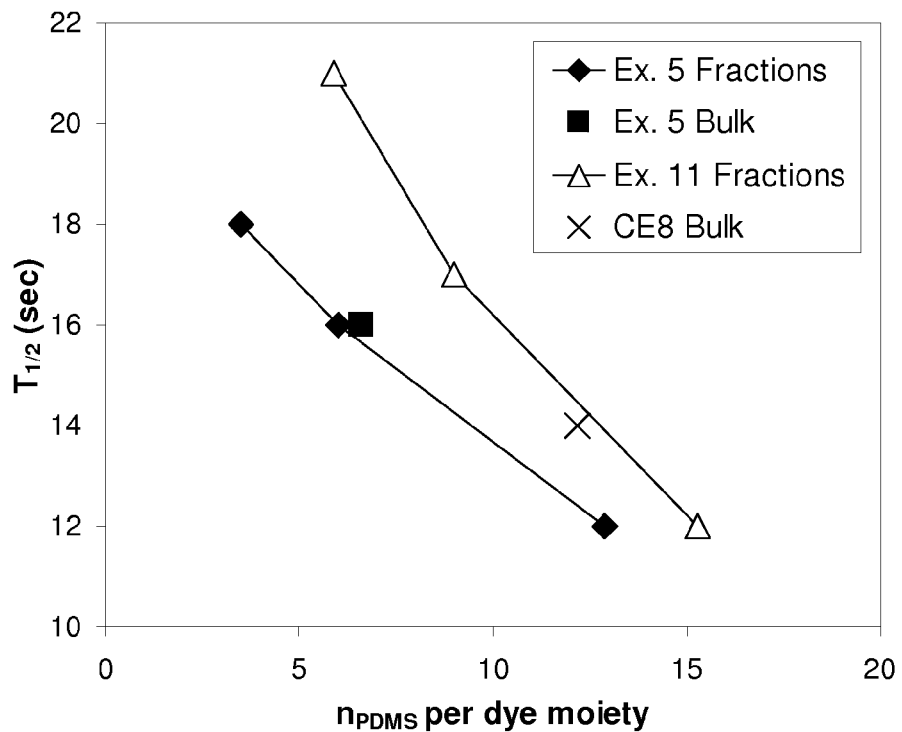
FIG. 7 is a graph comparing the T1/2 (in seconds) fade speed of the photochromics of Examples 5, 11 and Comparative Example 8 having varying numbers of monomer units in the PDMS (polydimethylsiloxane) polymer chain per dye moiety as recorded in Table 5.
Figure 8:
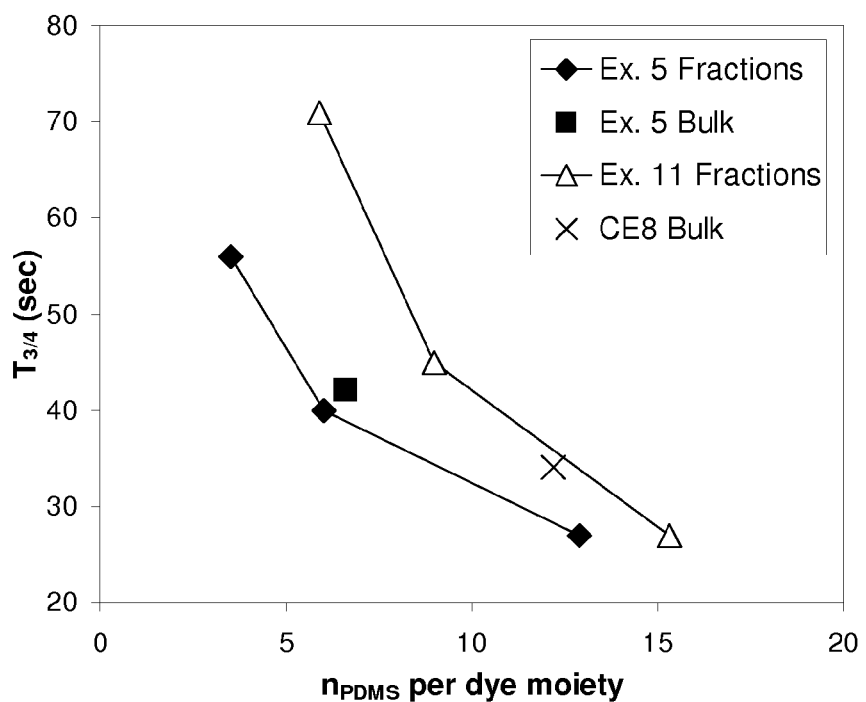
FIG. 8 is a graph comparing the T3/4 (in seconds) fade speed of the photochromics of Examples 5, 11 and Comparative Example 8 having varying numbers of monomer units in the PDMS (polydimethylsiloxane) polymer chain per dye moiety as recorded in Table 5.
Figure 9:
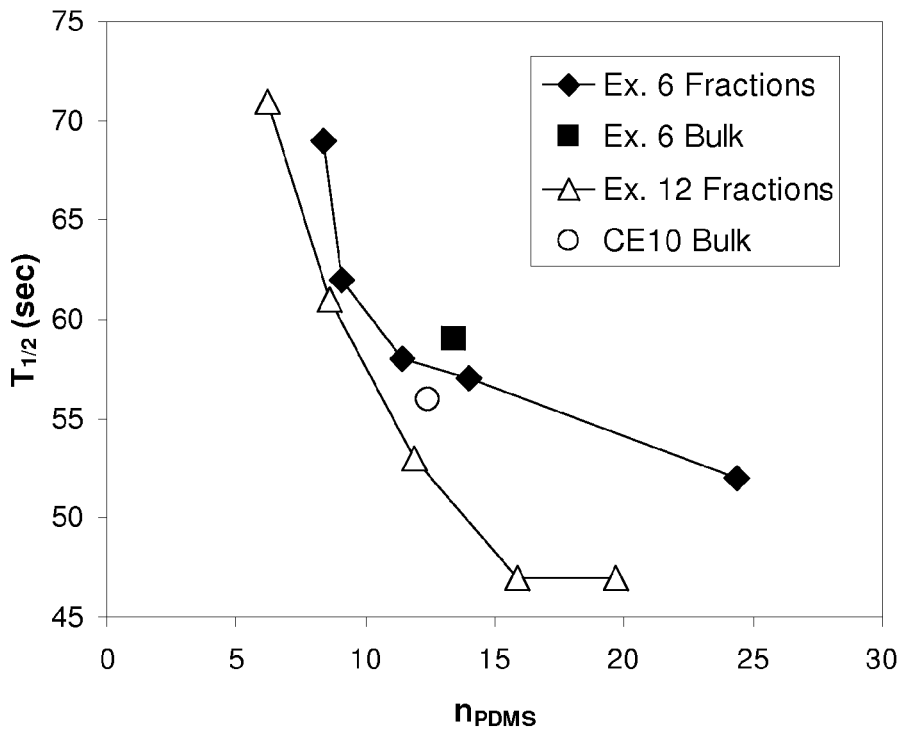
FIG. 9 is a graph comparing the T1/2 (in seconds) fade speed of the photochromics of Examples 6, 12 and Comparative Example 10 having varying numbers of monomer units in the PDMS (polydimethylsiloxane) polymer chain as recorded in Table 6.
Figure 10:
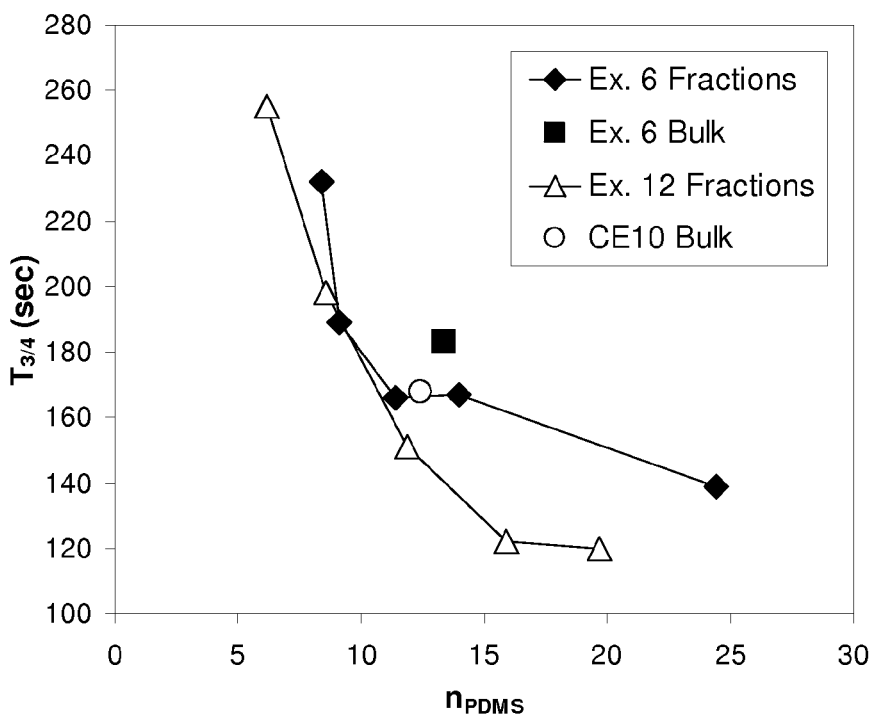
FIG. 10 is a graph comparing the T3/4 (in seconds) fade speed of the photochromics of Examples 6, 12 and Comparative Example 10 having varying numbers of monomer units in the PDMS (polydimethylsiloxane) polymer chain as recorded in Table 6.

The variation of fade speed (t1/2 and t3/4) with the number of PDMS units recorded in Table 5 is shown in the graphs of FIGS. 5 to 8 for the number of PDMS units (FIGS. 5 and 6) and the number of PDMS units per dye moiety FIGS. 7 and 8).

TABLE 6

| Example | Description | $T_{1/2}$ (sec) | $T_{3/4}$ (sec) |
|---|---|---|---|
| 6 | Bulk product ($n_{PDMS}$ = 13.4) | 59 | 183 |
| 6 F1 | Fraction 1 ($n_{PDMS}$ = 24.4) | 52 | 139 |
| 6 F2 | Fraction 2 ($n_{PDMS}$ = 14.0) | 57 | 167 |
| 6 F3 | Fraction 3 ($n_{PDMS}$ = 11.4) | 58 | 166 |
| 6 F4 | Fraction 4 ($n_{PDMS}$ = 9.1) | 62 | 189 |
| 6 F5 | Fraction 5 ($n_{PDMS}$ = 8.4) | 69 | 232 |
| CE9 | Control | 186 | 978 |
| CE10 | Control, bulk product ($n_{PDMS}$ = 12.4) | 56 | 168 |
| 12 F1 | Control, Fraction 1 ($n_{PDMS}$ = 19.7) | 47 | 120 |
| 12 F2 | Control, Fraction 2 ($n_{PDMS}$ = 15.9) | 47 | 122 |
| 12 F3 | Control, Fraction 3 ($n_{PDMS}$ = 11.9) | 53 | 151 |
| 12 F4 | Control, Fraction 4 ($n_{PDMS}$ = 8.6) | 61 | 198 |
| 12 F5 | Control, Fraction 5 ($n_{PDMS}$ = 6.2) | 71 | 255 |

$n_{PDMS}$ denotes the average number of siloxane repeat units (determined by $^1$H NMR analysis).
Concentrations: $0.75 \times 10^{-7}$ mol/g (6, 6 F1-F5), $1.5 \times 10^{-7}$ mol/g (CE9, CE10, 12 F1-F5).
Observed maxima of coloured form ($\lambda_{max}$) = 560 nm.

Figure 11:
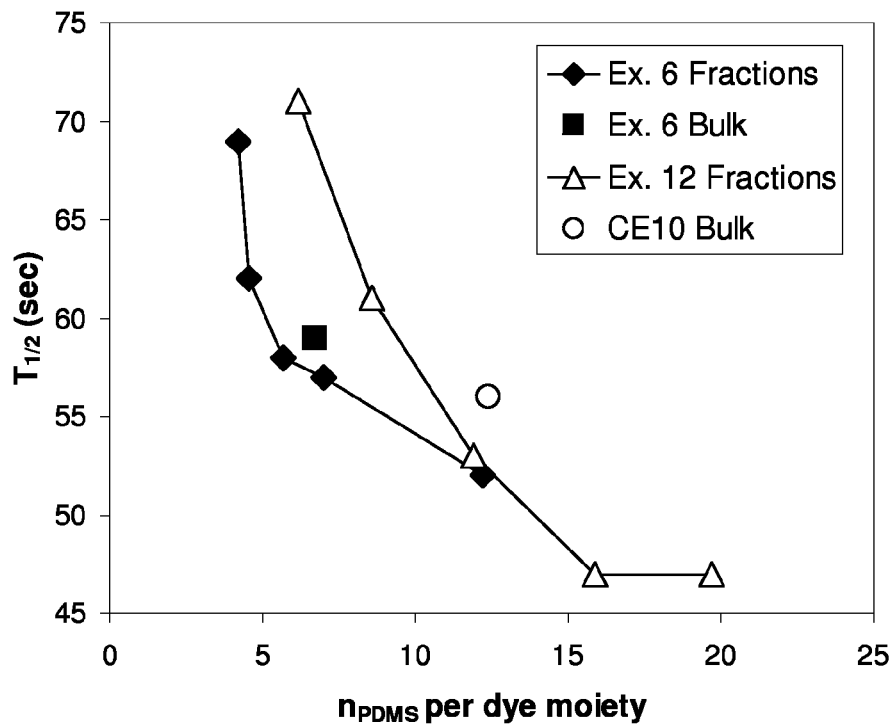
FIG. 11 is a graph comparing the T1/2 (in seconds) fade speed of the photochromics of Examples 6, 12 and Comparative Example 10 having varying numbers of monomer units in the PDMS (polydimethylsiloxane) polymer chain per dye moiety as recorded in Table 6.
Figure 12:
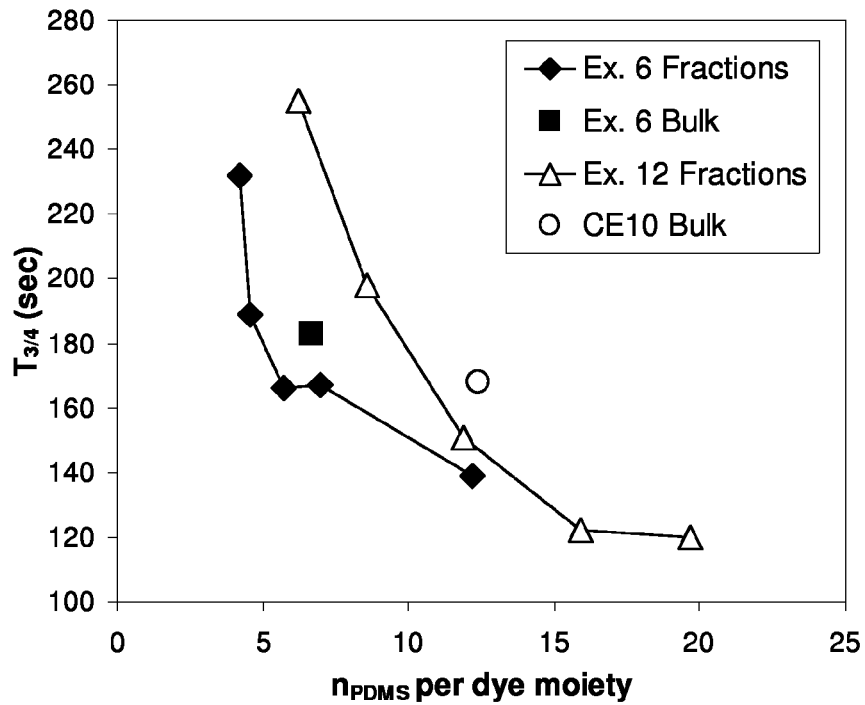
FIG. 12 is a graph comparing the T3/4 (in seconds) fade speed of the photochromics of Examples 6, 12 and Comparative Example 10 having varying numbers of monomer units in the PDMS (polydimethylsiloxane) polymer chain per dye moiety as recorded in Table 6.
Figure 13:
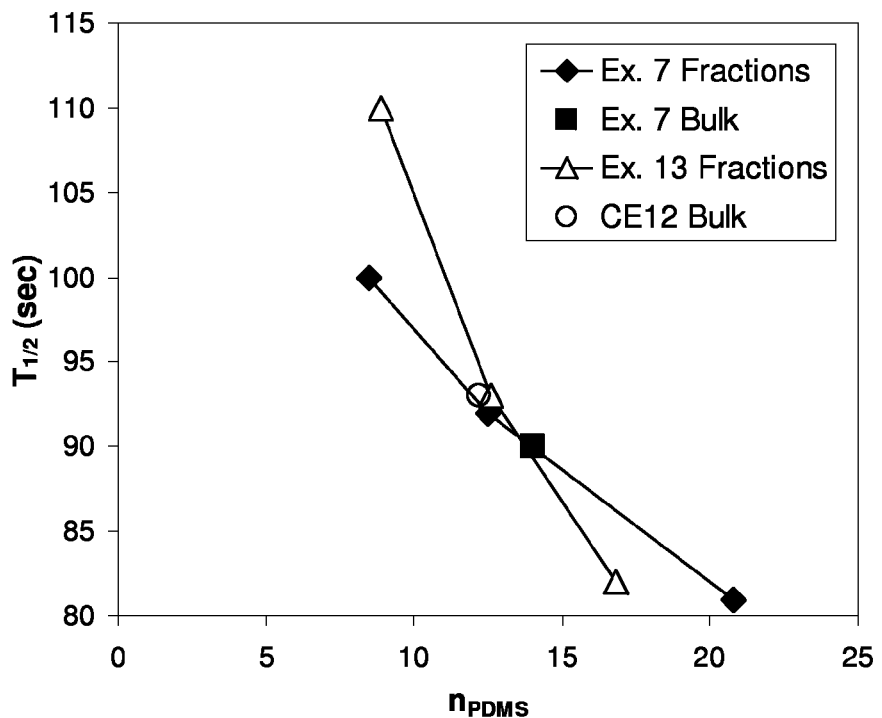
FIG. 13 is a graph comparing the T1/2 (in seconds) fade speed of the photochromics of Examples 7, 13 and Comparative Example 12 having varying numbers of monomer units in the PDMS (polydimethylsiloxane) polymer chain as recorded in Table 7.
Figure 14:
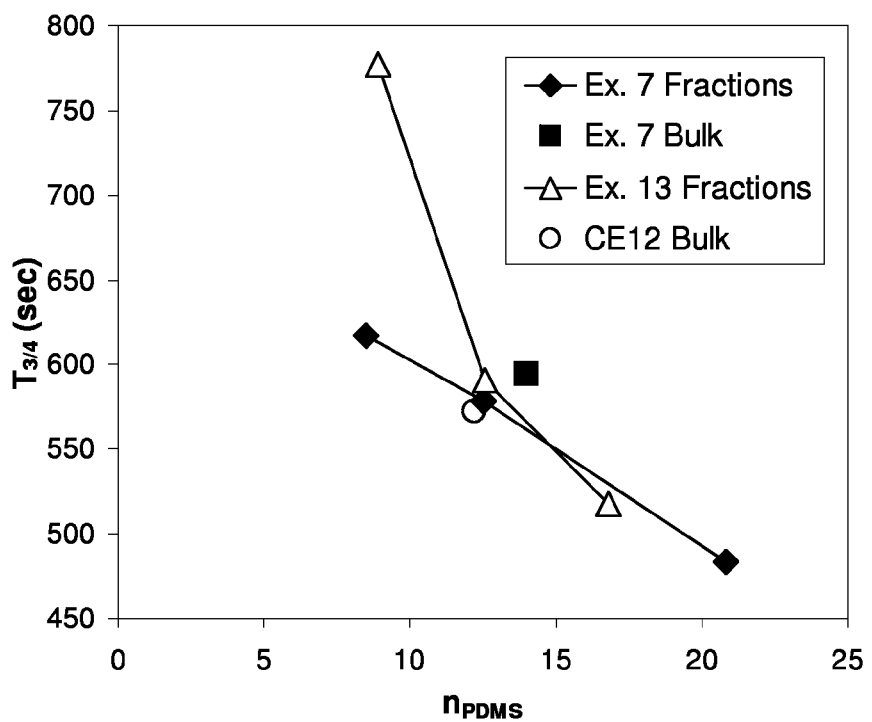
FIG. 14 is a graph comparing the T3/4 (in seconds) fade speed of the photochromics of Examples 7, 13 and Comparative Example 12 having varying numbers of monomer units in the PDMS (polydimethylsiloxane) polymer chain as recorded in Table 7.

The variation of fade speed (t1/2 and t3/4) with the number of PDMS units recorded in Table 6 is shown in the graphs of FIGS. 9 to 12 for the number of PDMS units (FIGS. 9 and 10) and the number of PDMS units per dye moiety FIGS. 11 and 12).

TABLE 7

| Example | Description | $T_{1/2}$ (sec) | $T_{3/4}$ (sec) |
|---|---|---|---|
| 7 | Bulk product ($n_{PDMS}$ = 14.0) | 90 | 594 |
| 7 F1 | Fraction 1 ($n_{PDMS}$ = 20.8) | 81 | 483 |
| 7 F2 | Fraction 2 ($n_{PDMS}$ = 12.5) | 92 | 578 |
| 7 F3 | Fraction 3 ($n_{PDMS}$ = 8.5) | 100 | 617 |
| CE11 | Control | 280 | 2465 |
| CE12 | Control, bulk product ($n_{PDMS}$ = 12.2) | 93 | 572 |
| 13 F1 | Control, Fraction 1 ($n_{PDMS}$ = 16.8) | 82 | 518 |
| 13 F2 | Control, Fraction 2 ($n_{PDMS}$ = 12.6) | 93 | 591 |
| 13 F3 | Control, Fraction 3 ($n_{PDMS}$ = 8.9) | 110 | 111 |

$n_{PDMS}$ denotes the average number of siloxane repeat units (determined by $^1$H NMR analysis).
Concentrations: $0.75 \times 10^{-7}$ mol/g (7, 7 F1-F3), $1.5 \times 10^{-7}$ mol/g (CE11, CE12, 13 F1-F3).
Observed maxima of coloured form ($\lambda_{max}$) = 580 nm.

Figure 15:
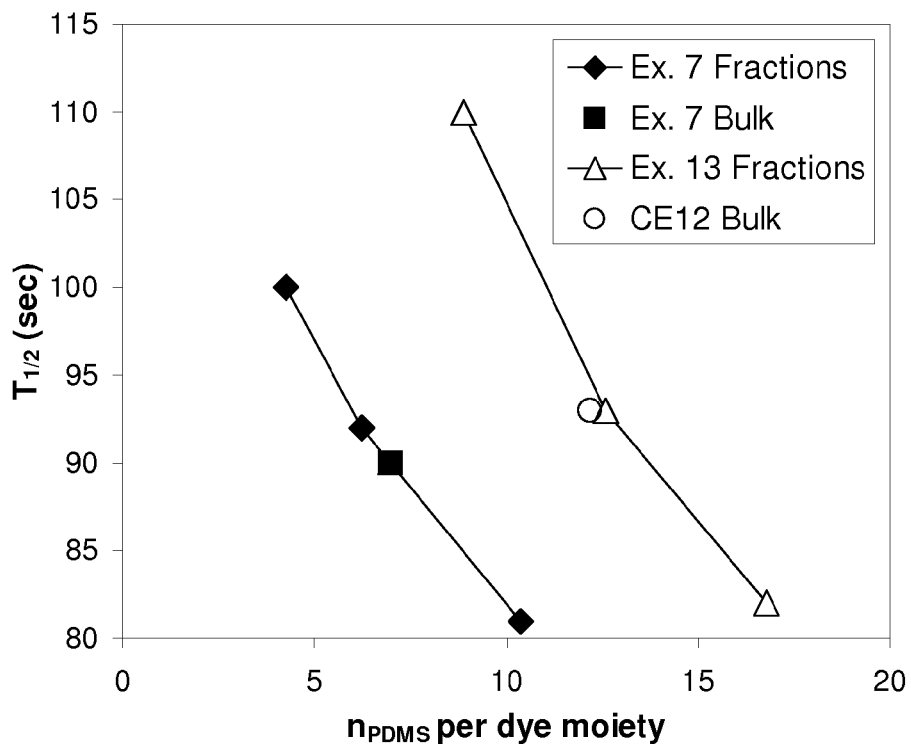
FIG. 15 is a graph comparing the T1/2 (in seconds) fade speed of the photochromics of Examples 7, 13 and Comparative Example 12 having varying numbers of monomer units in the PDMS (polydimethylsiloxane) polymer chain per dye moiety as recorded in Table 7.
Figure 16:
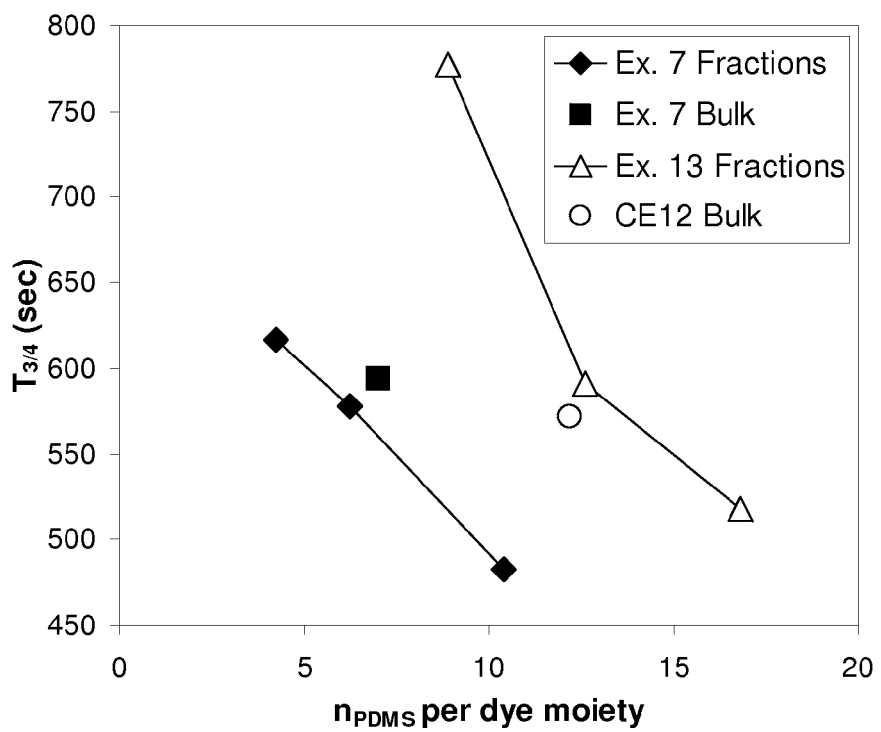
FIG. 16 is a graph comparing the T3/4 (in seconds) fade speed of the photochromics of Examples 7, 13 and Comparative Example 12 having varying numbers of monomer units in the PDMS (polydimethylsiloxane) polymer chain per dye moiety as recorded in Table 7.

The variation of fade speed (t1/2 and t3/4) with the number of PDMS units recorded in Table 6 is shown in the graphs of FIGS. 13 to 16 for the number of PDMS units (FIGS. 13 and 14) and the number of PDMS units per dye moiety FIGS. 15 and 16).

TABLE 8

| Example | Description | $T_{1/2}$ (sec) | $T_{3/4}$ (sec) |
|---|---|---|---|
| 8 | Bulk product ($n_{PDMS}$ = 13.9) | 15 | 35 |
| CE13 | Control | 45 | 204 |
| CE14 | Control, bulk product ($n_{PDMS}$ = 12.6) | 14 | 36 |

$n_{PDMS}$ denotes the average number of siloxane repeat units (determined by $^1$H NMR analysis).
Concentrations: $0.75 \times 10^{-7}$ mol/g (Ex. 8), $1.5 \times 10^{-7}$ mol/g (CE13, CE14).
Observed maxima of coloured form ($\lambda_{max}$) = 625 nm.

TABLE 9

| Example | Description | $T_{1/2}$ (sec) | $T_{3/4}$ (sec) |
|---|---|---|---|
| 9 | Bulk product ($n_{PDMS}$ = 13.7) | 9 | 31 |
| CE15 | Control | 42 | 303 |
| CE16 | Control, bulk product ($n_{PDMS}$ = 12.7) | 9 | 34 |

$n_{PDMS}$ denotes the average number of siloxane repeat units (determined by $^1$H NMR analysis).
Concentrations: $1.5 \times 10^{-7}$ mol/g (Ex. 9), $3.0 \times 10^{-7}$ mol/g (CE15, CE16).
Observed maxima of coloured form ($\lambda_{max}$) = 620 nm.

Example 14

Matrix Solubility Test

The compound from Example 4 Fraction 1 (4 F1, $M_n$=3,443, $n_{PDMS}$=25.6) and Example 10 Fraction 1 (10 F1, $M_n$=2,461, $n_{PDMS}$=21.6) were combined in the standard industrial lens formulation (as described in the Kinetics Analyses section) at a concentration of $0.988 \times 10^{-5}$ mol/g (3.40 wt %, effective dye concentration=$1.975 \times 10^{-5}$ mol/g) and $1.975 \times 10^{-5}$ mol/g (4.86 wt %, effective dye concentration=$1.975 \times 10^{-5}$ mol/g), respectively. The mixtures were added to moulds and then cured at 80° C. for 16 hours. The lenses thus obtained were inspected for haze. The lens containing compound 10 F1 showed an appreciable amount of haze by visual inspection, indicating its phase separation in the matrix. Compound 4 F1 was incorporated into the lens formulation at an equimolar concentration with respect to the photochromic dye moiety as compared to the lens containing compound 10 F1. This lens showed no haze and was completely transparent on visual inspection. This indicates a greater amount of matrix compatibility of compound 4 F1 per unit quantity of dye compared with compound 10 F1, despite it having a longer polydimethylsiloxane chain. Less of compound 4 F1 is required within the matrix to achieve the same dye concentration as compared to compound 10 F1.

Figure 17:
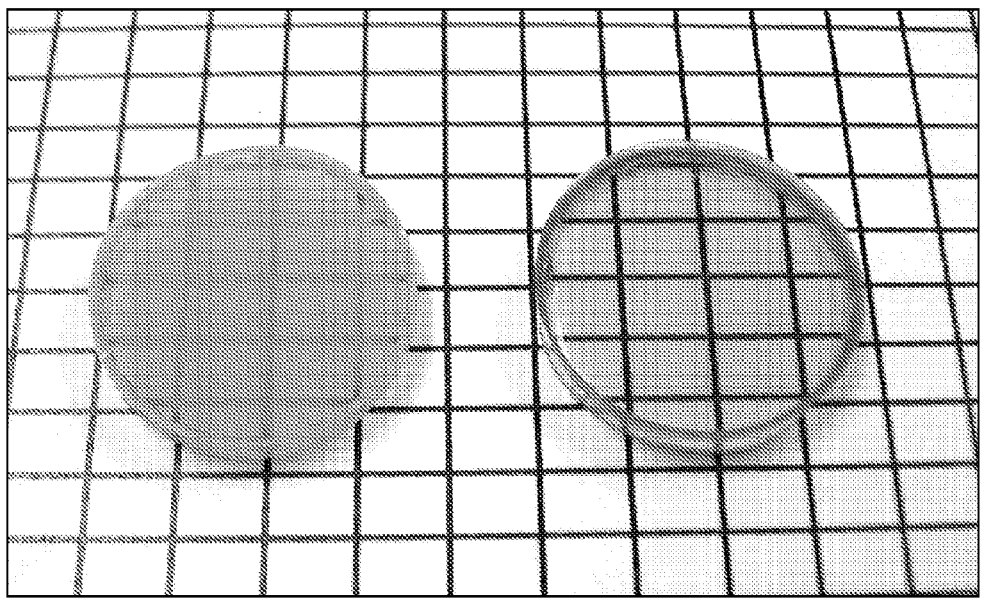
FIG. 17 is a photograph comparing the clarity of the photochromic of Comparative Example 10 (fraction 1) with the photochromic polymer of Example 4 (fraction 1)

The two lenses are shown side by side in FIG. 17 with the lens incorporating Compound of Example 10 on the left and the compound of Example 4 on the right. It will be noted that the compounds have identical photochromic moieties with the compound of Example 10 having a single photochromic group per compound and the Compound of Example 4 having two of the photochromic groups, one at each terminus of the siloxane polymer chain. Whereas the Compound of Example 10 produced significant Haze the Compound of Example 4 produced a lens of good clarity.

Example 15

Haze Testing compound 1H to provide better light transmittance, with a much lower reading for haze (4.09 versus 10.3) as compared to the high molecular weight CE2 compound (Table 10).

TABLE 10

| Compound | Transmittance, % | Haze |
|---|---|---|
| Blank lens | 85.3 | 2.00 |
| 10 F1 | 33.5 | 43.5 |
| 4 F1 | 62.9 | 7.52 |
| CE2 (high MW fraction) | 73.0 | 10.3 |
| 1H | 78.4 | 4.09 |

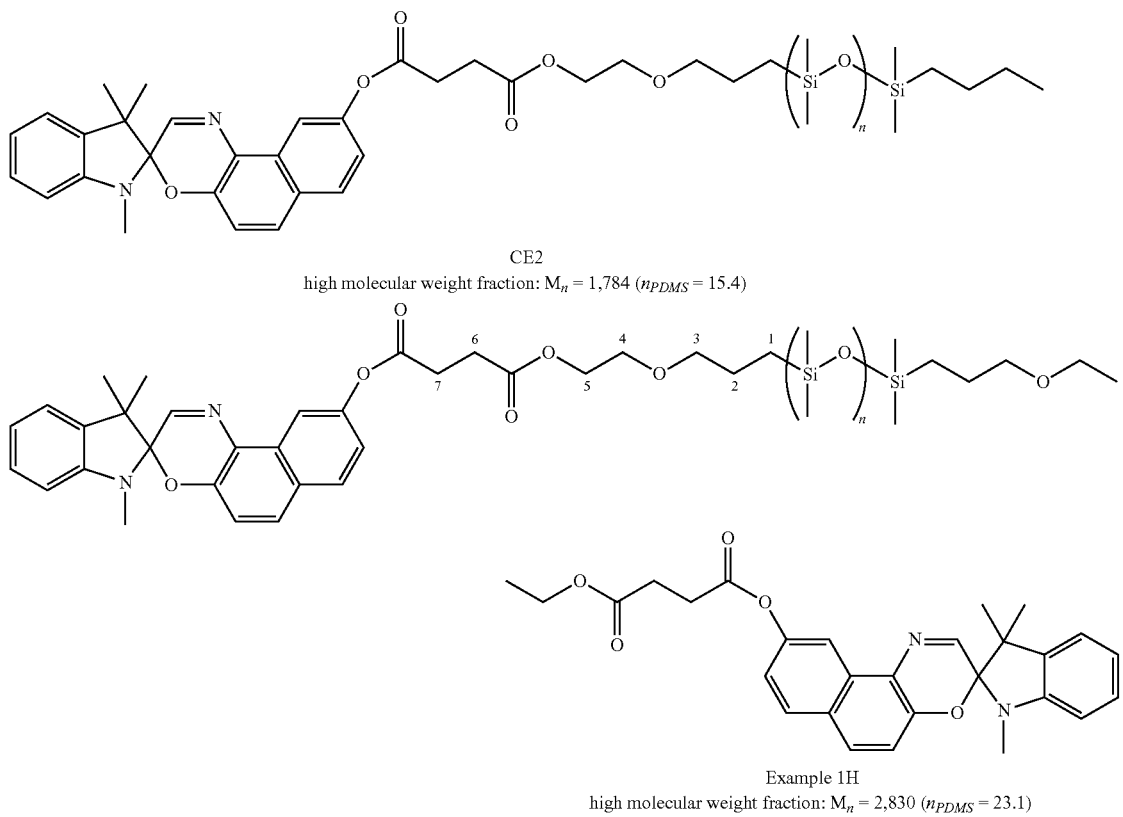

CE2
high molecular weight fraction: $M_n = 1,784$ ($n_{PDMS} = 15.4$)

Example 1H
high molecular weight fraction: $M_n = 2,830$ ($n_{PDMS} = 23.1$)

Sample lenses were also prepared using a high molecular weight fraction of Comparative Example 2 ($M_n$=1,784, $n_{PDMS}$=15.4, CE2 high molecular weight fraction was not tested for kinetics) and the high molecular weight fraction from Example 1 (compound 1H, $M_n$=2,830, $n_{PDMS}$=23.1), which are both Spirooxazine-Polydimethylsiloxane conjugates. They were incorporated within the lens matrix (see FIG. 1 and Table 1 in Kinetic Analysis section for details) at $2.0\times10^{-5}$ mol/g and $1.0\times10^{-5}$ mol/g respectively (equimolar dye concentration). The lens comprising compound 1H was virtually transparent on visual inspection whilst the high molecular weight fraction of CE2 showed appreciable haze. Compound 1H performed better despite it having a far higher average molecular weight of conjugated Polydimethylsiloxane. Haze meter tests (BYK Gardner, haze-gard dual) show

Example 16

Independence of Switching Speed Between Dye-Conjugates and Dye-Conjugates & Dye-Conjugates and Unmodified Dyes The outcome of these experiments indicate that photochromic dye-polydimethylsiloxane (PDMS) conjugate will act independently within a rigid thermoset polymer matrix, in terms of fade speed performance, despite the presence of another conjugate having a different chain length.

The photochromic dye-PDMS conjugates within the lens matrix may exist as aggregates due to phase separation. It may be possible that if these aggregates exist that conjugates with different PDMS chain lengths could come together and influence one another's kinetic performance, particularly fade speed. For example, the fade speed of a photochromic dye conjugated to a short PDMS chain may be enhanced (made to fade faster) when in contact by aggregation to a conjugate having a long PDMS chain, since longer PDMS chains provide faster fade performance as defined in the invention. This invention not only provides faster overall fade performance to photochromic dyes incorporated within a rigid lens matrix, but also the ability to tune their fade speed performance by conjugation with different chain lengths of PDMS.

It is typical that in a commercial sunglass lens there is more than one dye used in combination, usually to produce a neutral colour, such as grey or brown. It is an important feature of photochromic sunglass lenses that their colour (hue) does not change when going from their coloured form to their uncoloured form (and vice versa) when more than one dye is used. It may be possible by the application of this invention to tune the fade speed performance of two (or more) different dyes having otherwise inherently different fade speed performances, making them fade at similar rates within a rigid lens matrix, provided that all the different conjugates are not influenced by one another and act independently. This experiment addresses this issue by the incorporation of a photochromic dye-PDMS conjugate (6 F5 and 10 F3 in Tables 11 and 12, respectively) of low molecular weight (short PDMS chain length) with differing amounts of a model conjugate (NPC-1 and NPC-2) of higher molecular weight (longer PDMS chain). [Note: The model conjugates consist of a non-photochromic dihydro-naphthopyran, used to simulate the presence of a second photochromic naphthopyran in terms of chemical nature and steric bulk, but without any absorption in the visible range of the electromagnetic spectrum (400 nm-800 nm). Dihydro-naphthopyrans were synthesised by catalytic hydrogenation of their corresponding naphthopyrans: 10% Pd/C was added to a solution of the naphthopyrans in ethyl acetate and the mixture stirred at room temperature under a hydrogen atmosphere until TLC analysis indicated the absence of photochromic starting material. The dihydro-naphthopyrans were subsequently conjugated to polydimethylsiloxane in the same manner as described in Example 1 and Comparative Example 2, giving the Non-Photochromic Conjugates (NPC-1 and NPC-2).]

This enables the accurate measurement of fade performance of only the photochromic dye-PDMS conjugates (6 F5 and 10 F3), by measurement of the change in absorbance at their $\lambda_{max}$ over time, without any interference from another source of differently changing absorption in the visible spectrum that a second photochromic species would impart if it were used.

Results of the experiment are included in Tables 11 and 12 and indicate that there is no influence of the non-photochromic conjugates (NPC-1 and NPC-2) towards the photochromic conjugates (6 F5 and 10 F3) at the concentrations tested. There was no observed enhancement in the fade speed of the photochromic conjugates with increasing concentration of the non-photochromic conjugate containing a long length of PDMS.

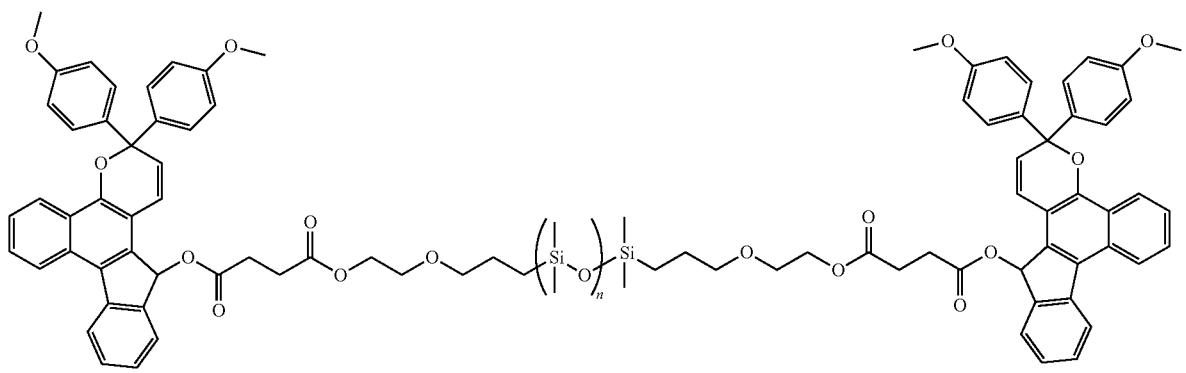

Photochromic Conjugate, 6 F5
$M_n = 2,048$ ($n_{PDMS} = 8.4$)

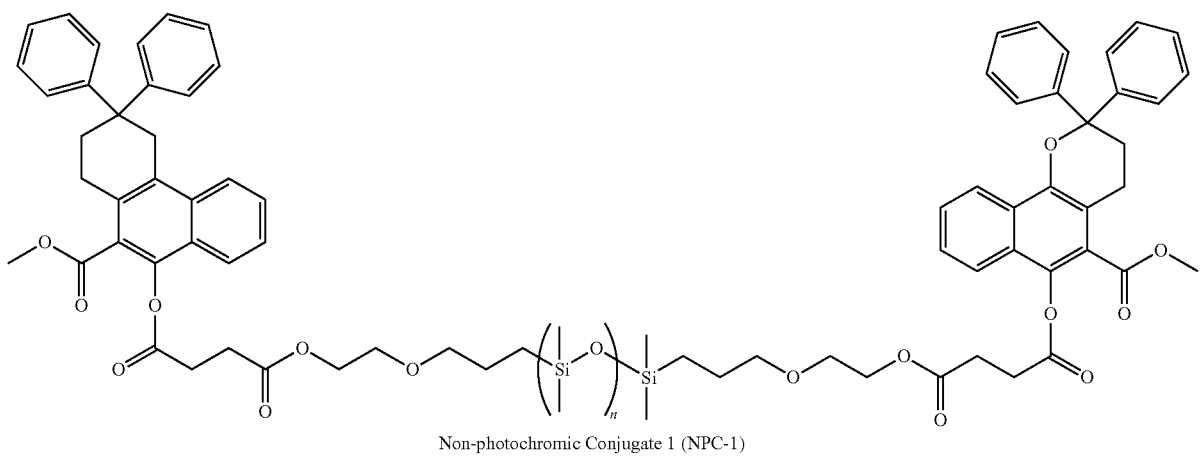

Non-photochromic Conjugate 1 (NPC-1)
$M_n = 2,904$ ($n_{PDMS} = 22.3$)

TABLE 11

| Sample | Photochromic conjugate, 6 F5 (molar equivalents) | Non-photochromic conjugate, NPC-1 (molar equivalents) | $A_0{}^a$ | $T_{1/2}$ (sec) | $T_{3/4}$ (sec) |
|---|---|---|---|---|---|
| 1 | 1 | 0 | 0.21 | 74 | 241 |
| 2 | 1 | 2 | 0.21 | 72 | 233 |
| 3 | 1 | 4 | 0.19 | 69 | 222 |
| 4 | 1 | 8 | 0.20 | 72 | 234 |
| 5 | 1 | 16 | 0.19 | 71 | 229 |

$^a A_0$ = maximum absorbance observed at 1000 seconds UV irradiation (zeroed).
1 molar equivalent = $1.875 \times 10^{-8}$ mol/g (concentration of photochromic conjugate 6 F5 in matrix).
16 molar equivalents = $3.0 \times 10^{-7}$ mol/g (concentration of non-photochromic conjugate NPC-1 in matrix for sample no. 5).

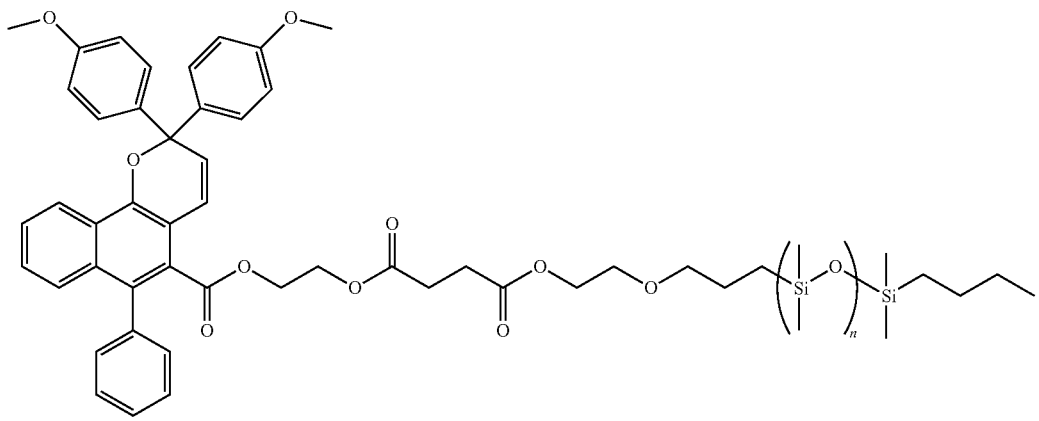

Photochromic Conjugate, 10 F3
$M_n = 1{,}507$ ($n_{PDMS} = 8.7$)

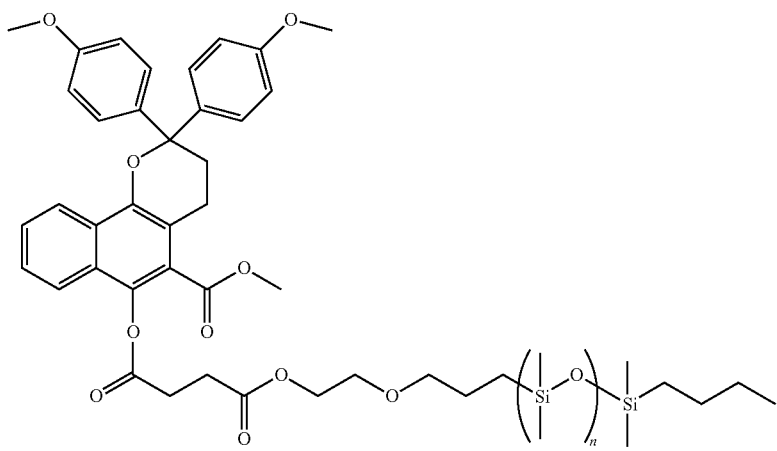

Non-Photochromic Conjugate 2 (NPC-2)
$M_n = 1{,}675$ ($n_{PDMS} = 12.2$)

TABLE 12

| Sample | Photochromic conjugate, 10 F3 (molar equivalents) | Non-photochromic conjugate, NPC-2 (molar equivalents) | $A_0{}^a$ | $T_{1/2}$ (sec) | $T_{3/4}$ (sec) |
|---|---|---|---|---|---|
| 1 | 1 | 0 | 0.85 | 37 | 171 |
| 2 | 1 | 0.5 | 0.73 | 37 | 165 |
| 3 | 1 | 1 | 0.81 | 36 | 165 |
| 4 | 1 | 2 | 0.76 | 38 | 164 |
| 5 | 0.25 | 0 | 0.25 | 38 | 178 |
| 6 | 0.25 | 1 | 0.26 | 38 | 170 |
| 7 | 0.25 | 2 | 0.25 | 36 | 157 |
| 8 | 0.25 | 3 | 0.24 | 39 | 167 |

$^a A_0$ = maximum absorbance observed at 1000 seconds UV irradiation (zeroed).
1 molar equivalent = $1.5 \times 10^{-7}$ mol/g (concentration of photochromic conjugate 10 F3 in matrix).
3 molar equivalents = $4.5 \times 10^{-7}$ mol/g (concentration of non-photochromic conjugate NPC-2 in matrix for sample no. 8).

In addition to the above experiments, a non-PDMS conjugated photochromic control compound, CE9, was incorporated within the test matrix together with the non-photochromic conjugate, NPC-1, in a molar ratio of 1:2 respectively. Results of this test are presented in Table 13 and indicate no influence of the non-photochromic PDMS conjugate, NPC-1, towards the control compound CE9.

TABLE 13

| Sample | Photochromic Control, CE9 (molar equivalents) | Non-photochromic conjugate, NPC-1 (molar equivalents) | $A_0{}^a$ | $T_{1/2}$ (sec) | $T_{3/4}$ (sec) |
|---|---|---|---|---|---|
| 1 | 1 | 0 | 0.75 | 186 | 978 |
| 2 | 1 | 2 | 0.70 | 179 | 819 |

$^a A_0$ = maximum absorbance observed at 1000 seconds UV irradiation (zeroed).
1 molar equivalent = $1.5 \times 10^{-7}$ mol/g (concentration of photochromic control, CE9, in matrix).

Example 17

Fractionation of Commercial Carbinol (Hydroxyl) Terminated Polydimethylsiloxane (DMS-C15, Gelest Inc.)

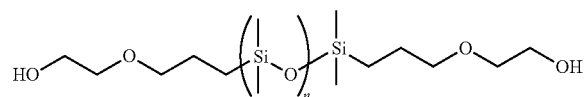

Average molecular weight ($^1$H NMR): 1,246 ($n_{PDMS}$ = 13.2)

The commercially available Carbinol (Hydroxyl) Terminated Polydimethylsiloxane is a polydisperse mixture of oligomers ranging in length from n=5 to n>20, and can be fractionated by (column) chromatography. Chromatography allows the fractionation of the bulk siloxane prior to covalent attachment of a photochromic dye to each end of the polymer chain. In so doing, it allows the choice of a specific average molecular weight of polymer for attachment to the dye. Since photochromic dyes are generally expensive and can be difficult to synthesise, prior fractionation of the polydimethylsiloxane is a commercially attractive option since it reduces the potential for waste that fractionation post attachment may present if the full spectrum of chain lengths are not required. A sample of DMS-C15 (1.5 g) was fractionated by column chromatography (silica gel, diethyl ether/hexane, 4:1). Four fractions were collected as they eluted from the column and were analysed by $^1$H NMR to determine their average molecular weights.
Fraction 1: $M_n$=2,271 ($n_{PDMS}$=27.1)
Fraction 2: $M_n$=1,337 ($n_{PDMS}$=14.5)
Fraction 3: $M_n$=918 ($n_{PDMS}$=8.8)
Fraction 4: $M_n$=726 ($n_{PDMS}$=6.2)
This example demonstrates the principle of fractionation. Average molecular weights and number of fractions collected shown here are by no means limiting. A greater number of fractions collected may provide fractions of a wider variety of average molecular weights. Persons skilled in the art may perform this fractionation using different mobile and stationary phases, achieving similar fractionation outcomes. In addition, fractionation is not limited to the Carbinol (Hydroxyl) Terminated Polydimethylsiloxane, DMS-C15, used in this example.

The invention claimed is:

1. A photochromic polymer having the formula II $$(PC^1)_x\text{-}L^1\text{-}(Si(R^1)_2O)_nSi(R^1)_2\text{-}L^2\text{-}(PC^2)_y \quad (II)$$

wherein
$L^1$ and $L^2$ are independently selected from a bond and linker groups;
$PC^1$ and $PC^2$ are independently selected photochromic groups:
n is from 2 to 80;
x is at least 1;
y is at least 1; and
$R^1$ is selected from $C_1$-$C_6$ alkyl, aryl and mixtures thereof.

2. The photochromic polymer according to claim 1, wherein $R^1$ is methyl.

3. The photochromic polymer according to claim 1, wherein n is from 4 to 50.

4. The photochromic polymer according to claim 1, wherein $L^1$ and $L^2$ are independently selected from a bond and linker groups independently selected from the group consisting of oxygen, sulfur, amino and mono-$C_1$-$C_6$ alkylamino, substituted alkylene and poly(substituted alkylene) and a polyradical comprising at least one of the groups of formula IIIa through to IIIp:

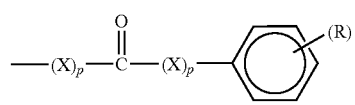

IIIa

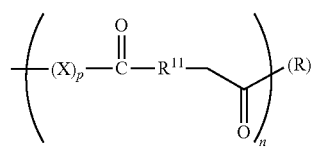

IIIb

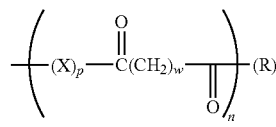

IIIc

IIId

IIIe

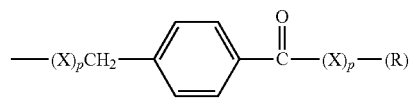

IIIf

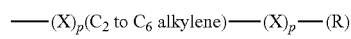

IIIg

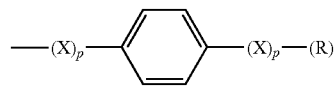

IIIh

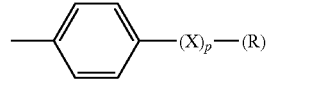

IIIi

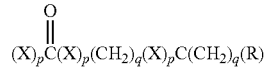

IIIj

-continued

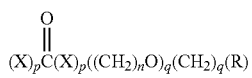  IIIk

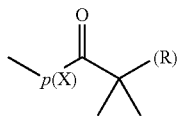  IIIl

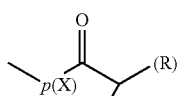  IIIm

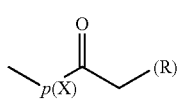  IIIn

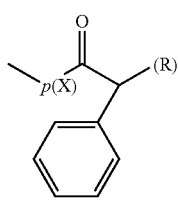  IIIo

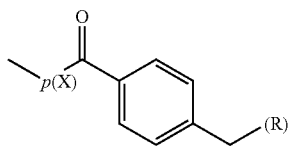  IIIp wherein in the formula IIIa to IIIp:

X which may be the same or different is selected from the group consisting of oxygen and sulfur;

R" is selected from the group consisting of hydroxy, alkoxy, amino and substituted amino;

$R^{11}$ is selected from the group consisting of $C_2$-$C_4$ alkylene, ($C_1$-$C_4$ alkylene)oxy($C_1$-$C_4$ alkylene) and phenylene;

n is an integer from 1 to 3;

w is an integer from 1 to 4;

q which when there is more than one may be the same or different is an integer from 0 to 15;

p which when there is more than one may be the same or different is 0 or 1; and (R) shows the radial for attachment of siloxane oligomer R.

5. The photochromic polymer according to claim 1, wherein at least one of $L^1$ and $L^2$ is the linker of formula:

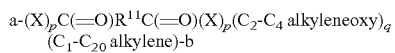

wherein:

a is the photochromic bonded end of the linker; and b is the siloxane oligomer bonded end of the linker;

p which may be the same or different, is 0 or 1;

X is oxygen or sulfur;

q is from 0 to 5; and $R^{11}$ is selected from the group consisting of $C_2$-$C_4$ alkylene and ($C_1$-$C_2$ alkylene)oxy($C_2$-$C_4$ alkylene).

6. The photochromic polymer according to claim 5, having the formula:

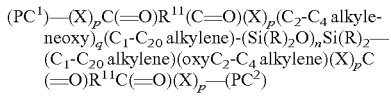

and wherein $R^{11}$ are independently selected.

7. The photochromic polymer according to claim 1, wherein the polymer comprises at least two photochromic groups selected from the group consisting of:

chromenes selected from the group consisting of naphthopyrans, benzopyrans, indenonaphthopyrans and phenanthropyrans;

spiropyrans selected from the group consisting of spiro(benzindoline), spiro(indoline)benzopyrans, spiro(indoline)-naphthopyrans, spiroquinopyrans, spiro(indoline)pyrans and spirodihydroindolizines; and spiro-oxazines selected from the group consisting of spiro(indoline)naphthoxazines, spiro(indoline)pyridobenzoxazines, spiro(benzindoline)pyridobenzoxazines, spiro(benzindoline)naphthoxazines and spiro(indoline)benzoxazines.

8. The photochromic polymer according to claim 1, wherein $PC^1$ and $PC^2$ are independently selected from the groups of:

spiro-oxazines of formula VIII:

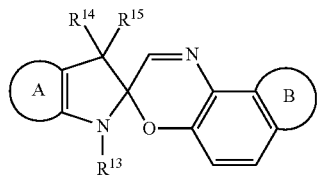  VIII where A is

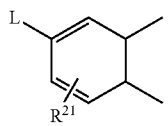 or 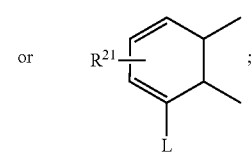 ;

and B is selected from the group consisting of

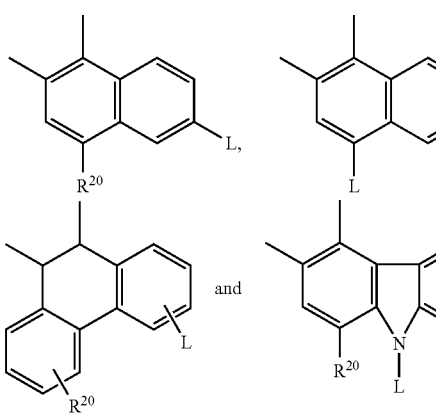

wherein

R$^{13}$, R$^{14}$, R$^{15}$, R$^{20}$ and R$^{21}$ are independently selected from the group consisting of hydrogen, alkyl, halo, haloalkyl, cycloalkyl, cycloarylalkyl, hydroxy, alkoxy, alkyleneoxyalkyl, alkoxycarbonyl, aryl, arylalkyl, aryloxy, alkylenethioalkyl, acyl, acyloxy, amino, cyano and NR$^{16}$R$^{17}$ wherein R$^{16}$ and R$^{17}$ are each selected from the group consisting of an alkyl group, an alkoxy group and an allyl each of which may be substituted and where R$^{16}$ and R$^{17}$ may be bonded and cyclized with each other to form a nitrogen containing heterocyclic ring; and L is the point of attachment of the linker group in the compound of formula II; and naphthopyrans of formula XX(a)

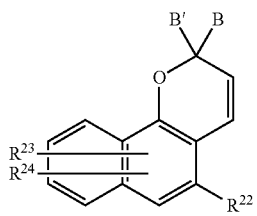

XX(a)

wherein

B and B' are optionally substituted aryl and heteroaryl; and R$^{22}$, R$^{23}$ and R$^{24}$ are independently selected from hydrogen; halogen; C$_1$-C$_3$ alkyl; and the group of formula COW wherein W is OR$^{25}$, NR$^{26}$R$^{27}$, piperidino or morpholino wherein R$^{25}$ is selected from the group consisting of C$_1$-C$_6$ alkyl, phenyl, (C$_1$-C$_6$ alkyl)phenyl, C$_1$-C$_6$ alkoxyphenyl, phenyl C$_1$-C$_6$ alkyl (C$_1$-C$_6$ alkoxy)phenyl and C$_1$-C$_6$ alkoxy C$_2$-C$_4$ alkyl; R$^{26}$ and R$^{27}$ are each selected from the group consisting of C$_1$-C$_6$ alkyl, C$_5$-C$_7$ cycloalkyl, phenyl, phenyl substituted with one or two groups selected from C$_1$-C$_6$ alkyl and C$_1$-C$_6$ alkoxy; R$^{22}$ and R$^{23}$ may optionally form a carbocyclic ring of 5 or 6 ring members optionally fused with an optionally substituted benzene and wherein at least one of the substituents selected from the group of substituents consisting of B and B', R$^{22}$, R$^{23}$, R$^{24}$, R$^{25}$, R$^{26}$ and R$^{27}$ is the point of attachment of the linker group in the compound of formula II.

9. The photochromic polymer according to claim 1, wherein PC$^1$ and PC$^2$ are independently selected from the group of formula XX(b)

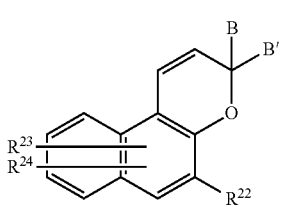

XX(b)

wherein

B and B' are optionally substituted aryl and heteroaryl; and

R$^{23}$ and R$^{24}$ are independently selected from hydrogen; halogen; C$_1$-C$_3$ alkyl; and the group of formula COW wherein W is OR$^{25}$, NR$^{26}$R$^{27}$, piperidino or morpholino wherein R$^{25}$ is selected from the group consisting of C$_1$-C$_6$ alkyl, phenyl, (C$_1$-C$_6$ alkyl)phenyl, C$_1$-C$_6$ alkoxyphenyl, phenyl C$_1$-C$_6$ alkyl (C$_1$-C$_6$ alkoxy)phenyl and C$_1$-C$_6$ alkoxy C$_2$-C$_4$ alkyl; R$^{26}$ and R$^{27}$ are each selected from the group consisting of C$_1$-C$_6$ alkyl, C$_5$-C$_7$ cycloalkyl, phenyl, phenyl substituted with one or two groups selected from C$_1$-C$_6$ alkyl and C$_1$-C$_6$ alkoxy; and wherein at least one of the substituents selected from the group of substituents consisting of B and B', R$^{23}$, R$^{24}$, R$^{25}$, R$^{26}$ and R$^{27}$ is the point of attachment of the linker group in the compound of formula II.

10. The photochromic polymer according to claim 8 wherein PC$^1$ and PC$^2$ are independently selected from

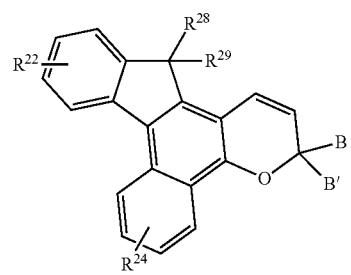

XX(d)

where R$^{22}$, R$^{28}$ and R$^{29}$ are independently selected from hydrogen; halogen; C$_1$-C$_3$ alkyl; and the group of formula COW wherein W is OR$^{25}$, NR$^{26}$R$^{27}$, piperidino or morpholino wherein R$^{25}$ is selected from the group consisting of C$_1$-C$_6$ alkyl, phenyl, (C$_1$-C$_6$ alkyl)phenyl, C$_1$-C$_6$ alkoxyphenyl, phenyl C$_1$-C$_6$ alkyl (C$_1$-C$_6$ alkoxy) phenyl and C$_1$-C$_6$ alkoxy C$_2$-C$_4$ alkyl; R$^{26}$ and R$^{27}$ are each selected from the group consisting of C$_1$-C$_6$ alkyl, C$_5$-C$_7$ cycloalkyl, phenyl, phenyl substituted with one or two groups selected from C$_1$-C$_6$ alkyl and C$_1$-C$_6$ alkoxy; and wherein at least one of the substituents selected from the group of substituents consisting of B and B', R$^{23}$, R$^{24}$, R$^{25}$, R$^{26}$ and R$^{27}$ is the point of attachment of the linker group in the compound of formula II.

11. The photochromic polymer according to claim 10 wherein B and B' are independently selected from the group consisting of aryl optionally substituted with from 1 to 3 substituents, heteroaryl optionally substituted with from 1 to 3 substituents and wherein the substituents present are selected from the group consisting of hydroxy, aryl, chloroaryl (C$_3$-C$_7$) cycloalkylaryl, (C$_3$-C$_7$) cycloalkyl, (C$_3$-C$_7$) cycloalkoxy, aryl (C$_1$-C$_6$) alkyl, aryl (C$_1$-C$_6$) alkoxy, aryloxy, aryloxyalkyl, aryloxy (C$_1$-C$_6$) alkoxy, (C$_1$-C$_6$) alkylaryl, (C$_1$-C$_6$) alkyl, (C$_1$-C$_6$) alkoxyaryl, (C$_1$-C$_6$) alkoxy, amino, N—(C$_1$-C$_6$) alkyl piperazino, N-aryl piperazino, indolino, piperidino, aryl pipersillins, morpholino, thiomorpholino and tetrahydro quinolino.

12. A photochromic polymer having the formula II (PC$^1$)$_x$-L$^1$-(Si(R$^1$)$_2$O)$_n$Si(R$^1$)$_2$-L$^2$-(PC$^2$)$_y$ (II)

wherein

L$^1$ and L$^2$ are independently selected from a bond and linker groups;

PC$^1$ and PC$^2$ are photochromic groups independently selected from naphthopyrans and spiro(indoline) naphthoxazines:

n is from 2 to 80;

x is 1;

y is 1; and

R$^1$ is methyl.

13. The photochromic polymer according to claim 12, wherein $PC^1$ and $PC^2$ are independently selected from the groups of:

spiro-oxazines of formula VIII:

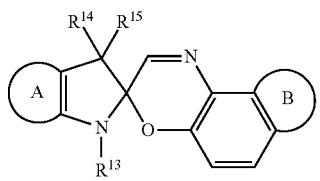

VIII where A is

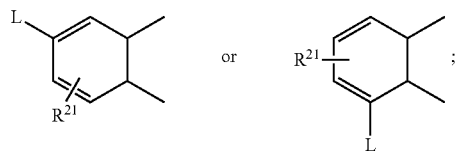

and B is selected from the group consisting of

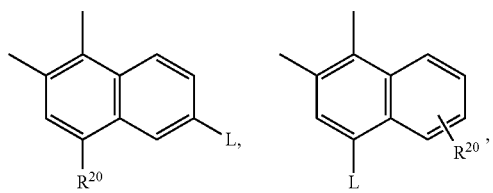

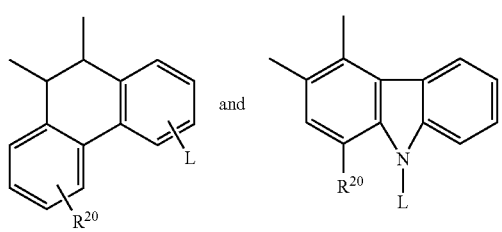

and wherein $R^{13}, R^{14}, R^{15}, R^{20}$ and $R^{21}$ are independently selected from the group consisting of hydrogen, alkyl, halo, haloalkyl, cycloalkyl, cycloarylalkyl, hydroxy, alkoxy, alkyleneoxyalkyl, alkoxycarbonyl, aryl, arylalkyl, aryloxy, alkylenethioalkyl, acyl, acyloxy, amino, cyano and $NR^{16}R^{17}$ wherein $R^{16}$ and $R^{17}$ are each selected from the group consisting of an alkyl group, an alkoxy group and an allyl each of which may be substituted and where $R^{16}$ and $R^{17}$ may be bonded and cyclized with each other to form a nitrogen containing heterocyclic ring;

L is the point of attachment of the linker group in the compound of formula II; and naphthopyrans of formula XX(a)

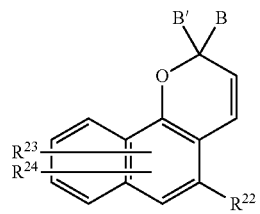

XX(a)

wherein

B and B' are optionally substituted aryl and heteroaryl; and $R^{22}$, $R^{23}$ and $R^{24}$ are independently selected from hydrogen; halogen; $C_1$-$C_3$ alkyl; and the group of formula COW wherein W is $OR^{25}$, $NR^{26}R^{27}$, piperidino or morpholino wherein $R^{25}$ is selected from the group consisting of $C_1$-$C_6$ alkyl, phenyl, ($C_1$-$C_6$ alkyl)phenyl, $C_1$-$C_6$ alkoxyphenyl, phenyl $C_1$-$C_6$ alkyl ($C_1$-$C_6$ alkoxy)phenyl and $C_1$-$C_6$ alkoxy $C_2$-$C_4$ alkyl; $R^{26}$ and $R^{27}$ are each selected from the group consisting of $C_1$-$C_6$ alkyl, $C_5$-$C_7$ cycloalkyl, phenyl, phenyl substituted with one or two groups selected from $C_1$-$C_6$ alkyl and $C_1$-$C_6$ alkoxy; $R^{22}$ and $R^{23}$ may optionally form a carbocylic ring of 5 or 6 ring members optionally fused with an optionally substituted benzene and wherein at least one of the substituents selected from the group of substituents consisting of B and B', $R^{22}$, $R^{23}$, $R^{24}$, $R^{25}$, $R^{26}$ and $R^{27}$ is the point of attachment of the linker group in the compound of formula II.

14. The photochromic polymer according to claim 12, wherein $PC^1$ and $PC^2$ are independently selected from the group of formula XX(b)

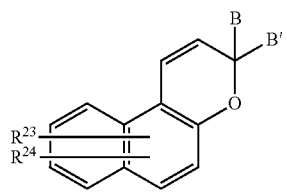

XX(b)

wherein

B and B' are optionally substituted aryl and heteroaryl; and $R^{23}$ and $R^{24}$ are independently selected from hydrogen; halogen; $C_1$-$C_3$ alkyl; and the group of formula COW wherein W is $OR^{25}$, $NR^{26}R^{27}$, piperidino or morpholino wherein $R^{25}$ is selected from the group consisting of $C_1$-$C_6$ alkyl, phenyl, ($C_1$-$C_6$ alkyl)phenyl, $C_1$-$C_6$ alkoxyphenyl, phenyl $C_1$-$C_6$ alkyl ($C_1$-$C_6$ alkoxy)phenyl and $C_1$-$C_6$ alkoxy $C_2$-$C_4$ alkyl; $R^{26}$ and $R^{27}$ are each selected from the group consisting of $C_1$-$C_6$ alkyl, $C_5$-$C_7$ cycloalkyl, phenyl, phenyl substituted with one or two groups selected from $C_1$-$C_6$ alkyl and $C_1$-$C_6$ alkoxy; wherein at least one of the substituents selected from the group of substituents consisting of B and B', $R^{23}$, $R^{24}$, $R^{25}$, $R^{26}$ and $R^{27}$ is the point of attachment of the linker group in the compound of formula II.

15. The photochromic polymer according to claim 14, wherein $PC^1$ and $PC^2$ are independently selected from

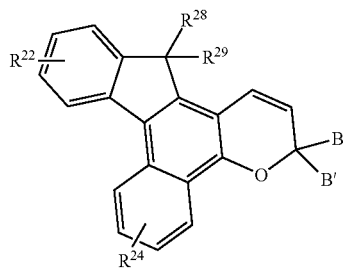

wherein B and B' are optionally substituted aryl and heteroaryl, $R^{22}$, $R^{24}$, $R^{28}$ and $R^{29}$ are independently selected from hydrogen; halogen; $C_1$-$C_3$ alkyl; and the group of formula COW wherein W is $OR^{25}$, $NR^{26}R^{27}$, piperidino or morpholino wherein $R^{25}$ is selected from the group consisting of $C_1$-$C_6$ alkyl, phenyl, ($C_1$-$C_6$ alkyl)phenyl, $C_1$-$C_6$ alkoxyphenyl, phenyl $C_1$-$C_6$ alkyl ($C_1$-$C_6$ alkoxy) phenyl and $C_1$-$C_6$ alkoxy $C_2$-$C_4$ alkyl; $R^{26}$ and $R^{27}$ are each selected from the group consisting of $C_1$-$C_6$ alkyl, $C_5$-$C_7$ cycloalkyl, phenyl, phenyl substituted with one or two groups selected from $C_1$-$C_6$ alkyl and $C_1$-$C_6$ alkoxy; and wherein at least one of the substituents selected from the group of substituents consisting of B and B', $R^{23}$, $R^{24}$, $R^{25}$, $R^{26}$ and $R^{27}$ is the point of attachment of the linker group in the compound of formula II.

16. The photochromic polymer according to claim 14, wherein B and B' are independently selected from the group consisting of aryl optionally substituted with from 1 to 3 substituents, heteroaryl optionally substituted with from 1 to 3 substituents and wherein the substituents present are selected from the group consisting of hydroxy, aryl, chloroaryl ($C_3$-$C_7$) cycloalkylaryl, ($C_3$-$C_7$) cycloalkyl, ($C_3$-$C_7$) cycloalkoxy, aryl ($C_1$-$C_6$) alkyl, aryl ($C_1$-$C_6$) alkoxy, aryloxy, aryloxyalkyl, aryloxy ($C_1$-$C_6$) alkoxy, ($C_1$-$C_6$) alkylaryl, ($C_1$-$C_6$) alkyl, ($C_1$-$C_6$) alkoxyaryl, ($C_1$-$C_6$) alkoxy, amino, N—($C_1$-$C_6$) alkyl piperazino, N-aryl piperazino, indolino, piperidino, aryl pipersillins, morpholino, thiomorpholino and tetrahydro quinolino.

17. A method for preparing a photochromic polymer according to claim 1 by reacting a siloxane oligomer, optionally functionalised with one or more linker groups with a photochromic compound or linker group prereacted with a photochromic compound to provide said photochromic polymer.

18. A method according to claim 17 wherein the photochromic polymer is derived from a siloxane oligomer selected from the group consisting of:

(A) polyunsaturated silicone oligomers selected from compounds of formula XXX, XXXI and XXXII:

XXX

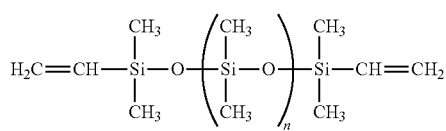

wherein n is from 0 to 80;

XXXI

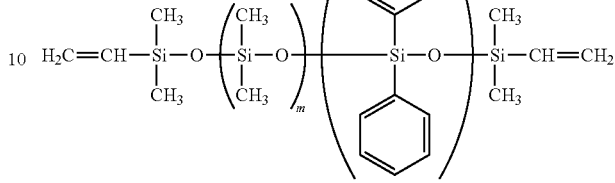

wherein at least one of n and m is at least one and n+m is from 1 to 80;

XXXII

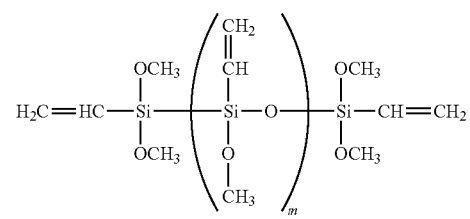

wherein m is from 1 to 80;

(B) reactive hydride compounds of formula XXXIV and XXXV:

XXXIV

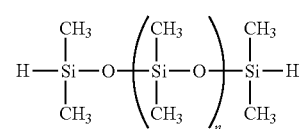

where n is from 0 to 80;

XXXV

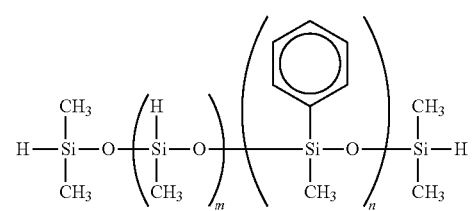

wherein n is at least one and n+m is from 1 to 80;

(C) silanol functionalised siloxane compounds of formula XXXVI, XXXVIII and XXXIX;

XXXVI

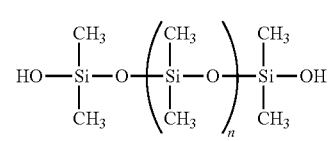

wherein n is from 0 to 80;

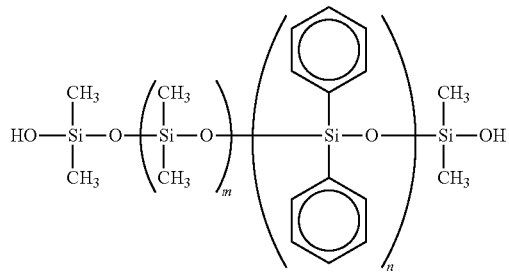

XXXVIII wherein n is at least one and n+m is from 1 to 80;

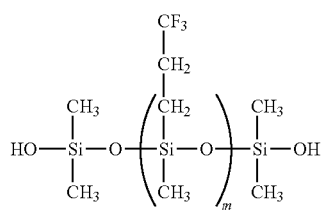

XXXIX wherein m is from 1 to 80;

(D) amine functional group compounds of formula XL, XLIa and XLIb;

XL

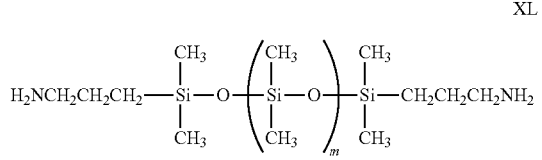

wherein n is from 0 to 80;

XLIa

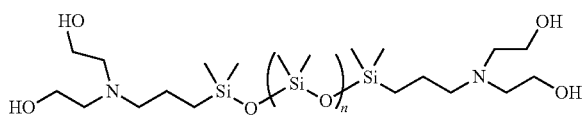

wherein n is from 0 to 80;

XLIb wherein n is from 0 to 80;

(E) epoxide substituted siloxane oligomers of formula XLII:

XLII

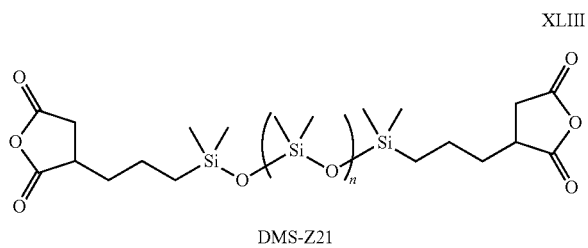

wherein n is from 0 to 80;

(F) anhydride substituted siloxane oligomers and dicarboxylic acid terminated siloxanes selected from succinic anhydride terminated siloxanes of formula XLIII:

XLIII

DMS-Z21 wherein n is from 0 to 80;

(G) carbanol substituted siloxane oligomers of formula XLIIIa and XLIV;

XLIIIa

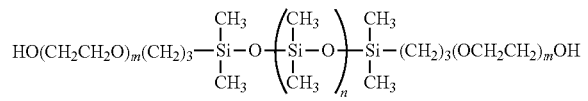

wherein n is from 0 to 80; and each m is independently from 0 to 20;

XLIV

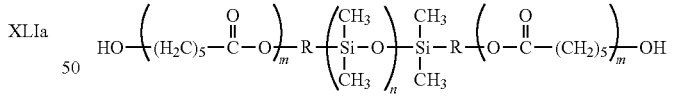

wherein R is independently selected from $C_2$ to $C_6$ alkyl, each m is from 0 to 2 and wherein n is from 1 to 80;

(H) acryloxy($C_1$ to $C_6$ alkyl) and methacryloxy($C_1$ to $C_6$ alkyl) terminated siloxanes such as compounds of formula XLV;

XLV

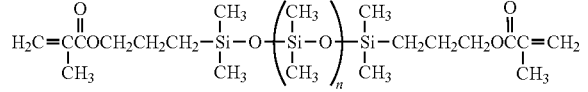

wherein n is from 0 to 80;
(I) acryloxy and methacryloxy terminal groups linked to a siloxane oligomer portion via alkyleneoxyalkyl, polyalkyleneoxyalkyl or substituted alkyleneoxyalkyl of formula XLVI

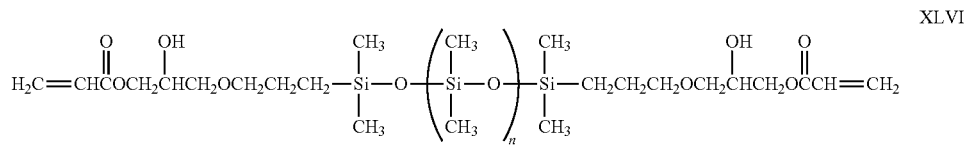

wherein n is from 0 to 80;
(J) the carboxy substituted siloxane compounds of formula, L, LI and LII;

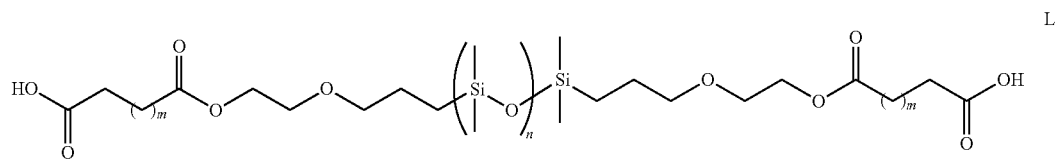

wherein each m is from 0 to 5 and wherein n is from 1 to 80

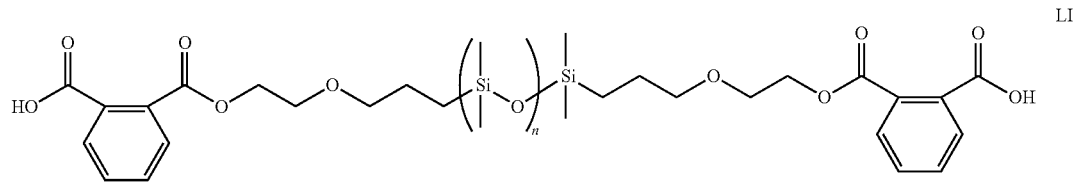

wherein n is from 1 to 80

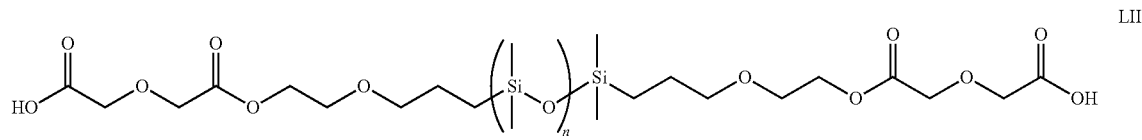

wherein n is from 1 to 80.

19. A composition comprising the photochromic polymer according to claim 1 and a host polymer or polymerizable composition for preparation of a host polymer.

20. A composition according to claim 19 wherein the host polymer comprises homopolymers and copolymers of polyol (allyl carbonate) monomers, homopolymers and copolymers of polyfunctional acrylate monomers, polyacrylates, poly (alkylacrylates), cellulose acetate, cellulose triacetate, cellulose acetate propionate, cellulose acetate butyrate, poly(vinyl acetate), poly(vinylalcohol), poly(vinylchloride), poly(vinylidene chloride), polyurethanes, polycarbonates, poly(ethylene-terephthalate), polystyrene, copoly(styrene-methylmethacrylate), copoly(styrene-acrylonitrile), poly(vinylbutyral), and homopolymers and copolymers of diacylidene pentaerythritol, copolymers with polyol(allylcarbonate) monomers and acrylate monomers.

* * * * *